(12) United States Patent
Fujii et al.

(10) Patent No.: US 7,394,052 B2
(45) Date of Patent: Jul. 1, 2008

(54) PARALLEL PROCESSING LOGIC CIRCUIT FOR SENSOR SIGNAL PROCESSING

(75) Inventors: Koji Fujii, Kanagawa (JP); Satoshi Shigematsu, Kanagawa (JP); Hiroki Morimura, Kanagawa (JP); Mamoru Nakanishi, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1655 days.

(21) Appl. No.: 10/208,527

(22) Filed: Jul. 29, 2002

(65) Prior Publication Data
US 2003/0133621 A1 Jul. 17, 2003

(30) Foreign Application Priority Data

| | | | |
|---|---|---|---|
| Jul. 30, 2001 | (JP) | ............................ | 2001-230483 |
| Dec. 19, 2001 | (JP) | ............................ | 2001-386718 |
| Mar. 6, 2002 | (JP) | ............................ | 2002-060023 |
| Apr. 5, 2002 | (JP) | ............................ | 2002-104448 |

(51) Int. Cl.
*H01L 27/00* (2006.01)
*H04N 5/235* (2006.01)

(52) U.S. Cl. ................................. 250/208.1; 348/222.1
(58) Field of Classification Search ............. 326/37–41, 326/46; 235/454; 250/208.1; 348/222.1, 348/294, 308
See application file for complete search history.

(56) References Cited

U.S. PATENT DOCUMENTS 6,791,611 B2* 9/2004 Yang ........................ 348/302

2006/0033729 A1* 2/2006 Yoshida et al. .............. 345/207
2008/0001070 A1* 1/2008 Nakamura et al. ....... 250/214 R

FOREIGN PATENT DOCUMENTS

| | | |
|---|---|---|
| JP | 60-224319 | 11/1985 |
| JP | 03-272216 | 12/1991 |
| JP | 07-154213 | 6/1995 |

OTHER PUBLICATIONS

Gealow et al., "A Pixel-Parallel Image ProCessor Using Logic Pitch-Matched to Dynamic Memory", IEEE Journal of Solid-State Circuits, vol. 34, No. 6, pp. 831-839, Jun. 1999.
Jung et al., "A Low-Power and High-Performance CMOS Fingerprint Sensing and Encoding Architecture", IEEE Journal of Solid-State Circuits, vol. 34, No. 7, pp. 978-984, Jul. 1999.

(Continued)

*Primary Examiner*—Don P Le
(74) *Attorney, Agent, or Firm*—Blakely, Sokoloff, Taylor & Zafman LLP

(57) ABSTRACT

A parallel processing logic circuit for sensor signal processing includes sensors and processing units. The sensor and the processing unit are integrated in the same pixel and arranged in a matrix. The processing unit contains a logic structure that consists of a register and a combinational logic function to execute pixel-parallel processing, based on binary data for a sensor, other processing units, and itself. The combinational logic function performs only a predetermined logic function and its dual one exclusively, thereby sharing the circuit resource and reducing the size of the processing unit. The register focusing on compactness also contributes to the small unit.

70 Claims, 63 Drawing Sheets

OTHER PUBLICATIONS

Ishikawa et al., "Digital Vision Chips and High-Speed Vision Systems", IEEE Symposium on VLSI Circuits Digest of Technical Papers 2001.

Fang, Wai-Chi et al.; "*VLSI Focal-Plane Array Processor for Morphological Image Processing*"; IEEE; pp. 423-426.

Eklund, Jan-Erik et al.; "*VLSI Implementation of a Focal Plane Image Processor- A Realization of the Near-Sensor Image Processing Concept*"; IEEE; pp. 322-335; Sep. 1996.

Gentile, Antonio et al.; "*Real-Time Image Processing on a Focal Plane SIMD Array*"; Georgia Institute of Technology and University of Puerto Rico in Mayaguez; pp. 400-405; Jan. 1999.

Fossum E. R.; "*Architectures for Focal Plane Imaging Processing*"; Optical Engineering, Soc. of Photo-Optical Instrumentation Engineers; pp. 865-871; Aug. 1989.

\* cited by examiner

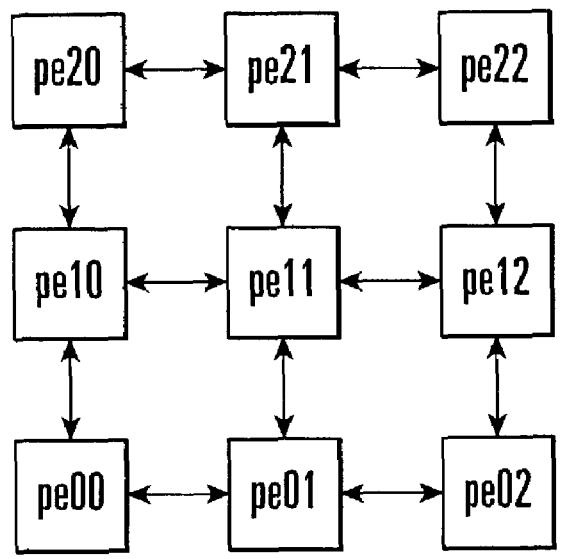
F I G. 5
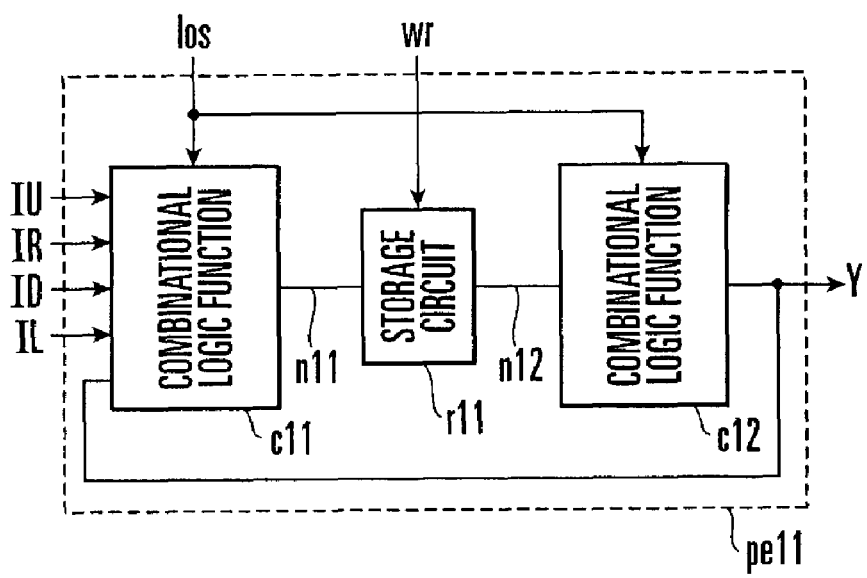
F I G. 6

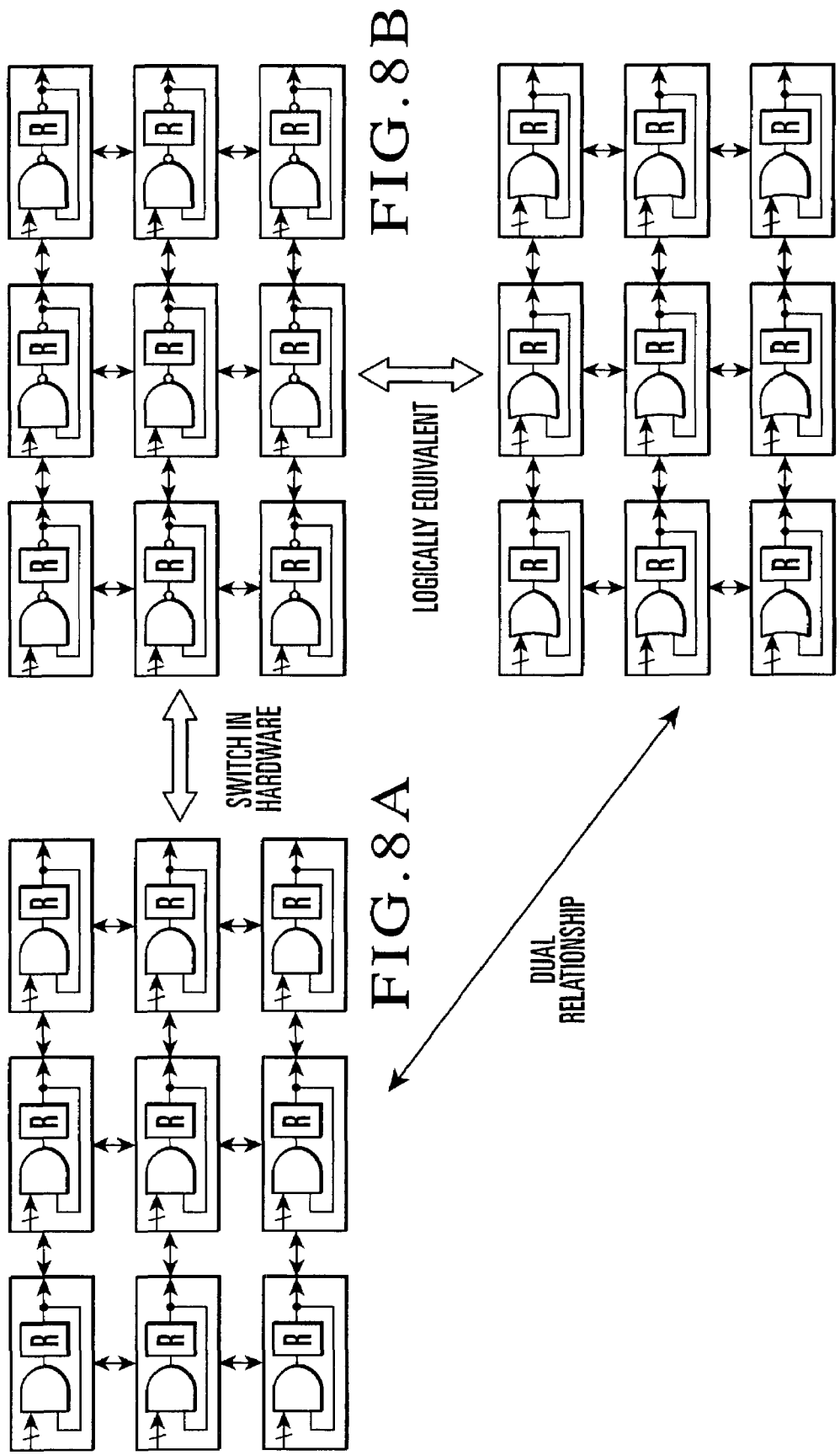

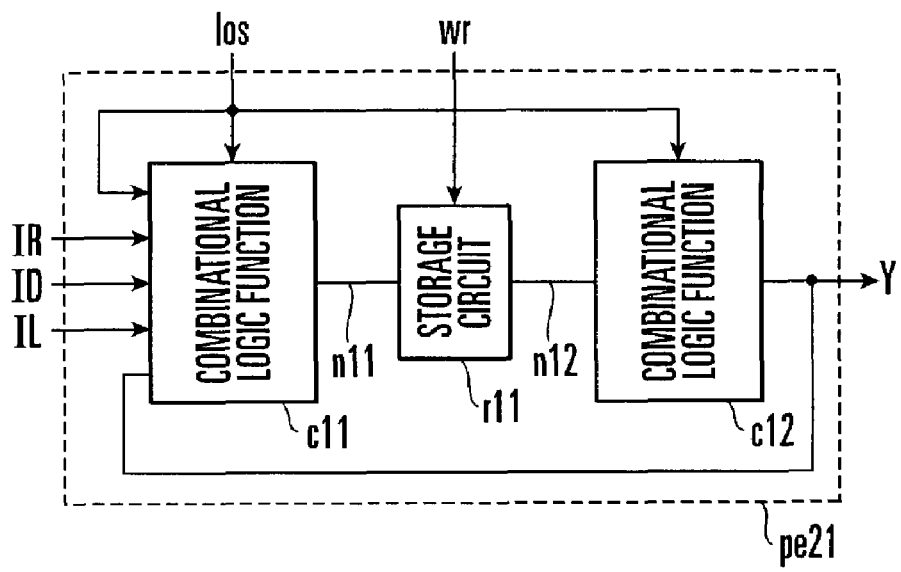
F I G. 9A
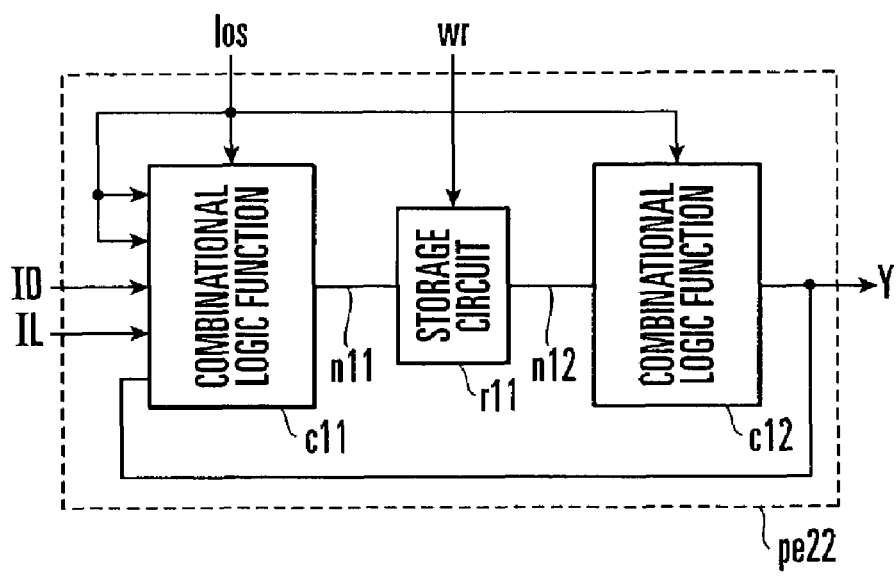
F I G. 9B

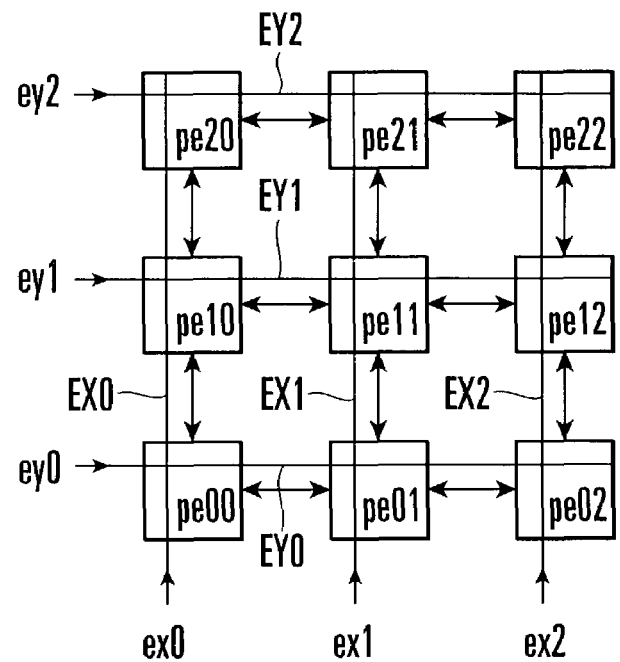
F I G. 41
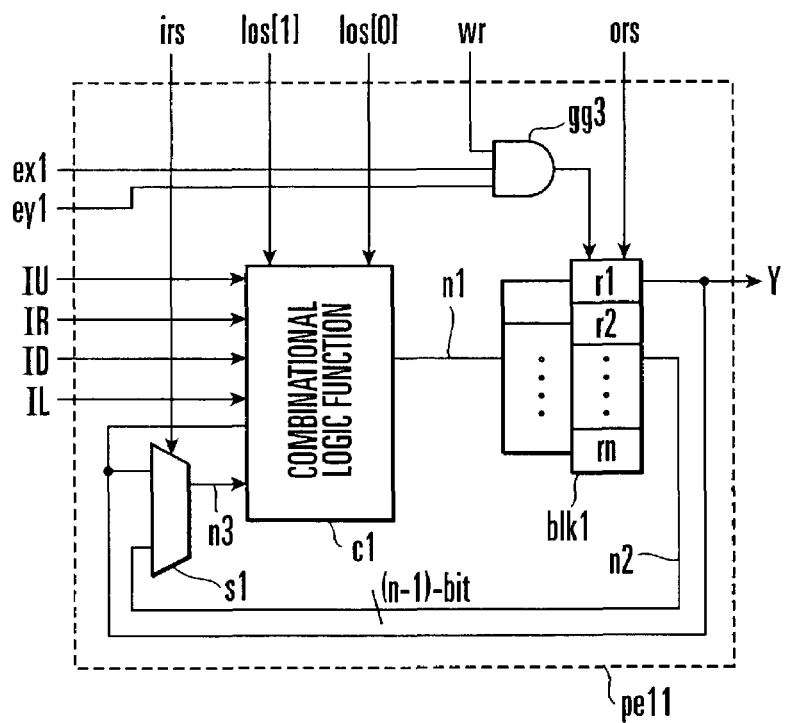
F I G. 42

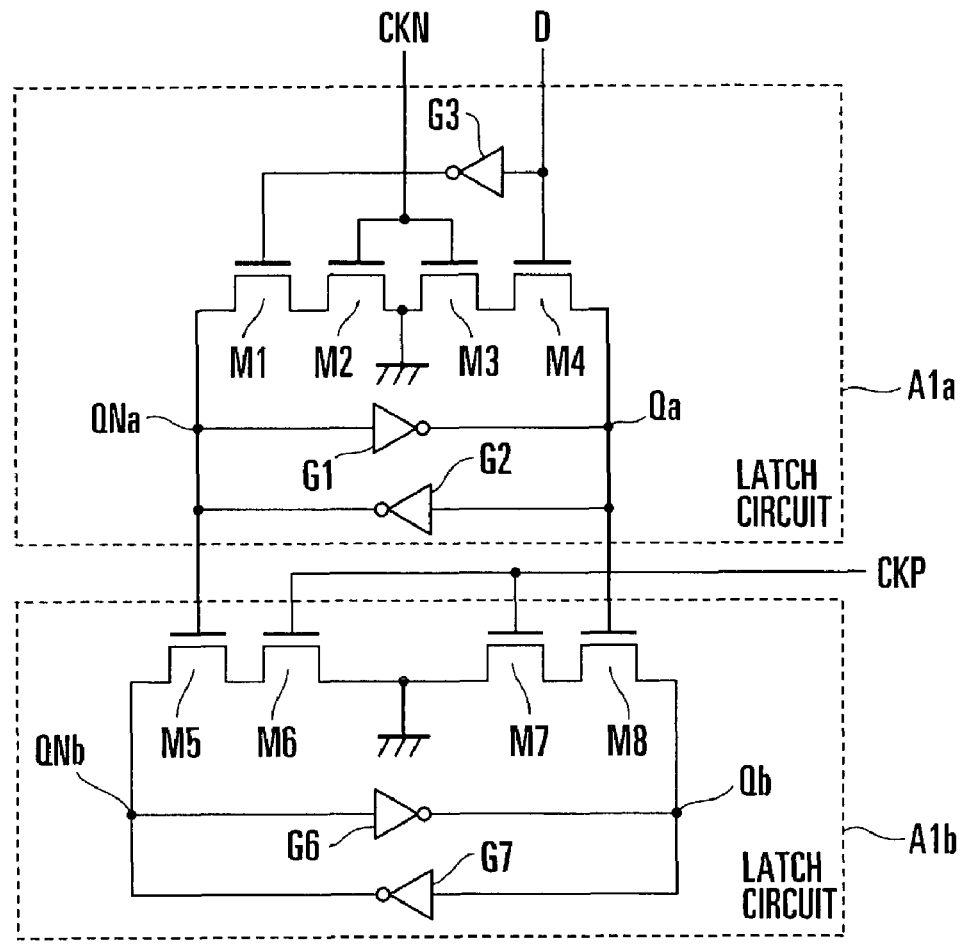
FIG.55
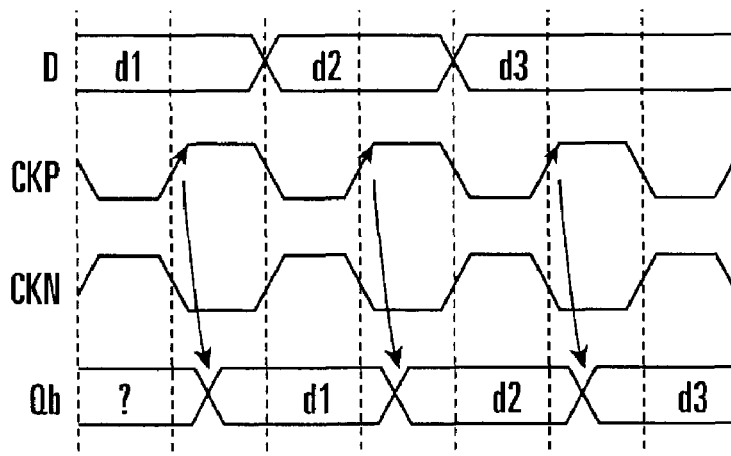
FIG.56A D
FIG.56B CKP
FIG.56C CKN
FIG.56D Qb

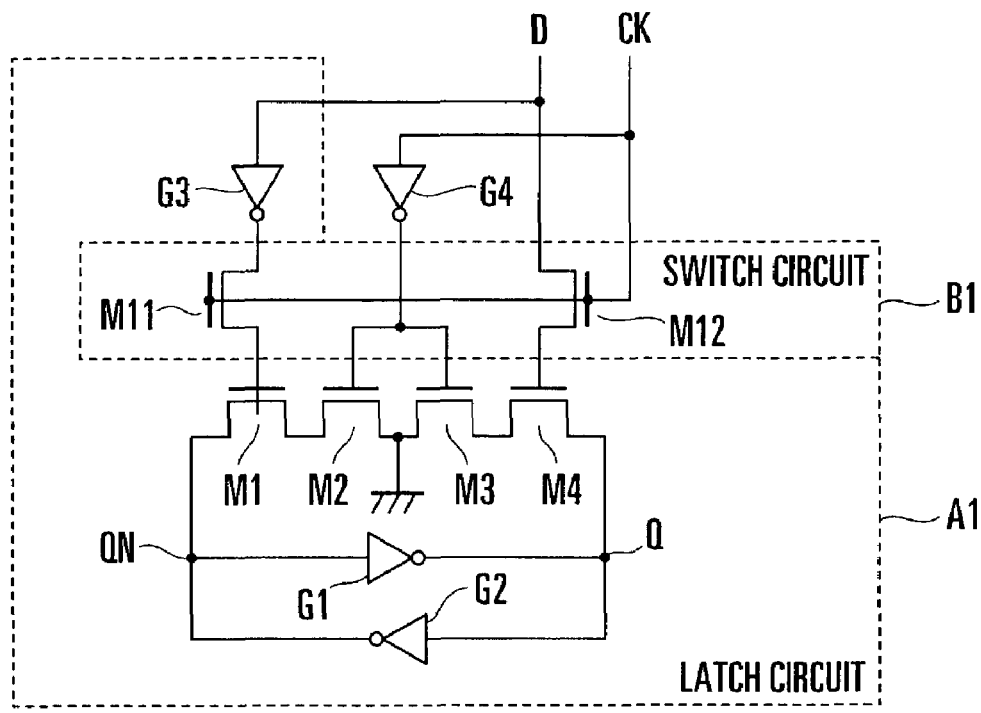
FIG.57
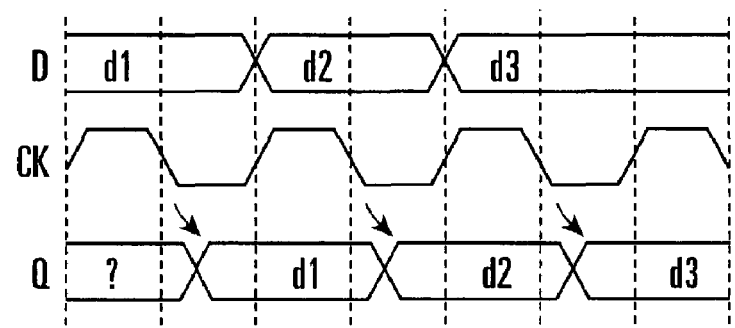
FIG.58A
FIG.58B
FIG.58C

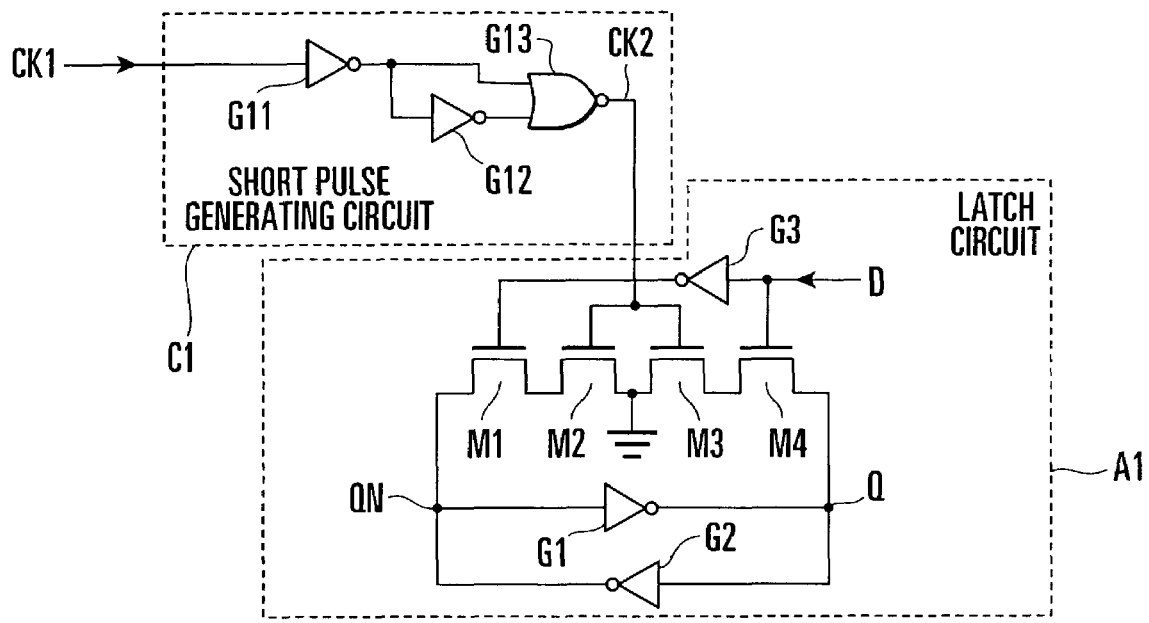
FIG.62
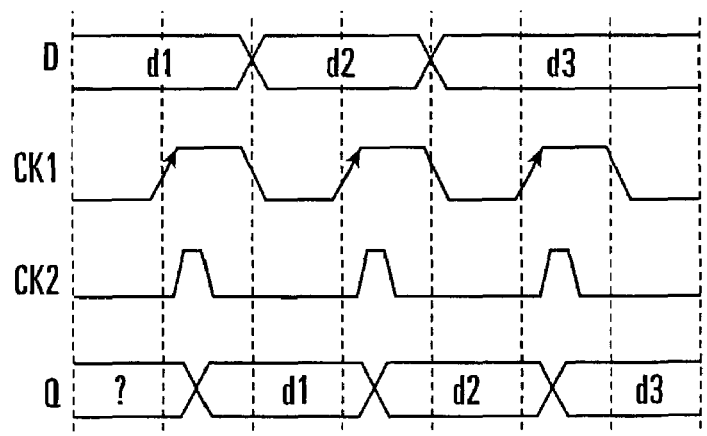
FIG.63A
FIG.63B
FIG.63C
FIG.63D

FIG.66A  D
FIG.66B  CK1
FIG.66C  CKBd
FIG.66D  Q
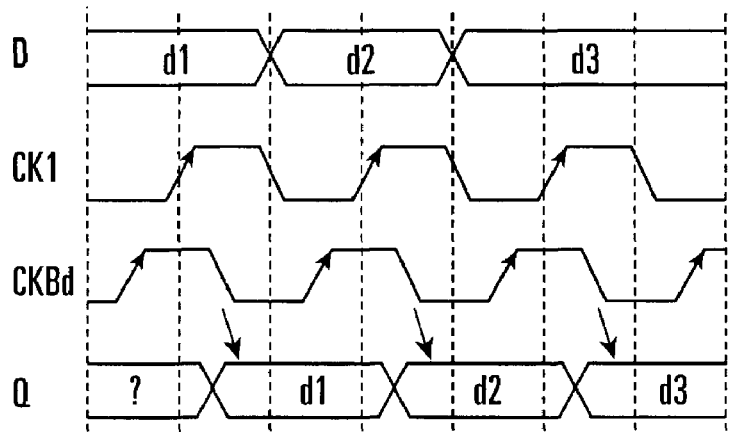
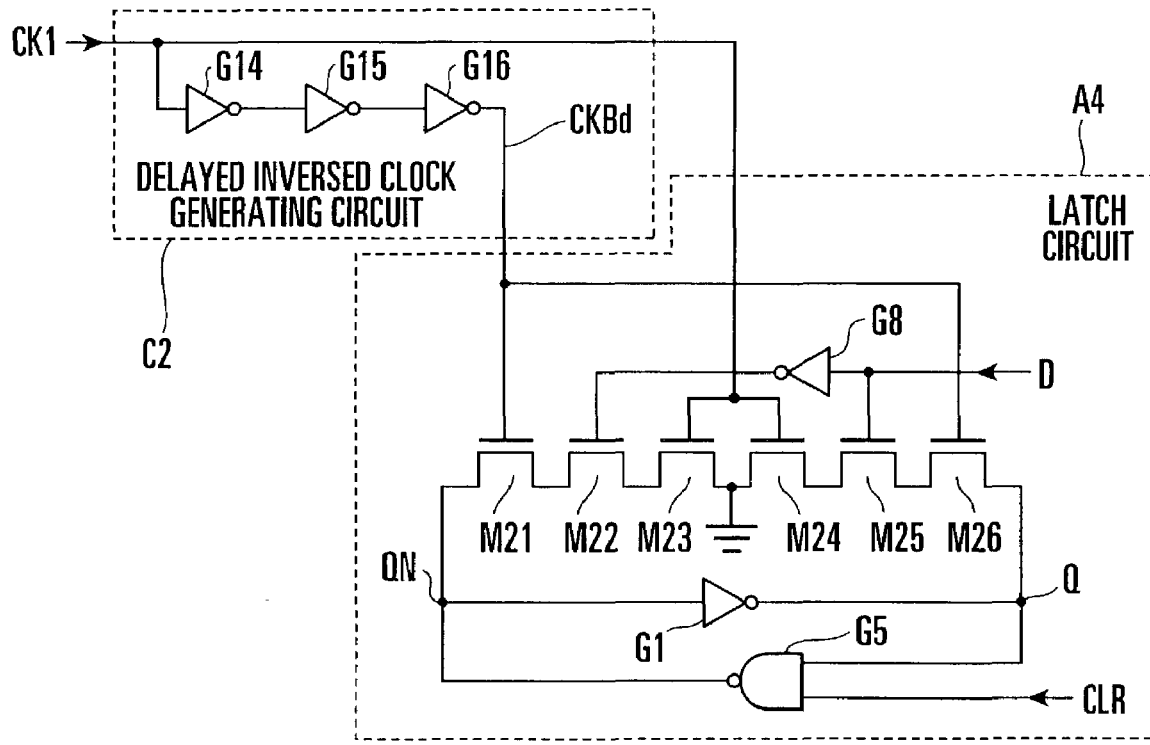
FIG.67

PARALLEL PROCESSING LOGIC CIRCUIT FOR SENSOR SIGNAL PROCESSING

BACKGROUND OF THE INVENTION

The present invention relates to a parallel processing logic circuit for sensor signal processing, which parallelly processes outputs from a plurality of sensors laid out in a rectangular grid using a plurality of processing units corresponding to the sensors.

As shown in FIG. 76A, a system that consists of a pixel array 101 in which a plurality of pixels 110 each having a sensor for detecting light or a three-dimensional pattern on an object surface are laid out in a matrix, a controller 102 for controlling the pixel array 101, and a memory 103 which stores a control program has been proposed. The system reads an image or the surface shape of an object and processes the image.

As an example of the system, a fingerprint identification system matches a fingerprint image acquired by the sensors in the pixel array 101 with a template image stored in the array in advance, thereby authenticating a person. If a deviation from an ideal pattern, such as noise or local intensity variation, is contained in the acquired fingerprint image, the accuracy of matching with the registered image degrades. To prevent this, preprocessing of removing noise or local intensity variation from the acquired image and then matching it with the template image is necessary.

This preprocessing can be executed by two methods: 1) the acquired image is temporarily read out from the pixel array 101 and sequentially processed by a general-purpose microprocessor, and 2) the image is processed in parallel by processing units 110p, each of which is integrated in a pixel 110, as shown in FIG. 76B.

In method 1), it takes a long time to read out image data from the pixel array 101 to sequentially process the data by the external microprocessor. In addition, the power consumption of the microprocessor increases when the operating frequency is raised to accelerate the processing.

To the contrary, method 2) uses parallel processing. For this reason, processing can be executed in short steps. Since the processing speed need not be increased by raising the operation frequency, unlike method 1), power consumption does not increase. In addition, since the sampled fingerprint image need not be read out from the pixel array 101, any leakage of personal information can be prevented, and the privacy is secured.

When method 2) is employed, a general-purpose microprocessor has conventionally been used as the processing unit 110p integrated in each pixel 110. This microprocessor has a logic operation block with multiple functions and a storage circuit having a sufficient capacity. So, various image processing are possible. However, it is difficult to increase the resolution of image processing since the microprocessor occupies a large area because of the high functionality. Especially, when the feature length of an image pattern such as a fingerprint is fixed, the pixel size must be equal to or less than a predetermined value (about 50 μm or less) to obtain a resolution that reflects the feature length. In the conventional scheme, the size cannot be achieved.

SUMMARY OF THE INVENTION

It is therefore a main object of the present invention to reduce the size of each pixel in a pixel array.

It is another object of the present invention to increase the resolution of image processing in the pixel array.

Morphological processing is useful for preprocessing of removing noise or local variation in intensity and contrast in an image. The morphological processing is executed based on some primitive combinational functions. Some of these functions are dual and correspond to the morphological processings, which make an opposite effect on the image. In the present invention, with an emphasis on a fact that major morphological processing is executed with a small number of these dual logic functions, the processing unit is designed to execute the limited and small number of combinational functions and is integrated in small area. That is, according to an aspect of the present invention, there is provided a parallel processing logic circuit that processes sensor signal, comprising sensors laid out in a matrix, and a processing unit which corresponds to each sensor and executes logic operation on the basis of binary data from each sensor, wherein the processing unit comprises a circuit for receiving the binary data output from the sensor, binary data output from the processing unit, and binary data output from another processing unit, exclusively executing only predetermined combinational logic operation and combinational logic operation as a dual logic function of the predetermined combinational logic operation, and outputting binary data as an execution result to another processing unit.

BRIEF DESCRIPTION OF THE DRAWINGS

FIG. 5 is a block diagram showing the overall arrangement of a parallel processing logic circuit according to the second embodiment;

FIG. 6 is a block diagram showing the configuration of a processing unit pe11 shown in FIG. 5;

FIGS. 8A to 8C are schematic diagram for explaining logic switching in the parallel processing logic circuit shown in FIG. 5;

FIG. 9A is a block diagram showing the configuration of a processing unit pe21 at a matrix edge;

FIG. 9B is a block diagram showing the configuration of a processing unit pe22 at a matrix corner;

FIG. 41 is a block diagram showing the overall arrangement of a parallel processing logic circuit according to the 13th embodiment;

FIG. 42 is a block diagrams showing the configuration of a processing unit pe11 shown in FIG. 41;

FIG. 55 is a circuit diagram of a flip-flop circuit using a RAM-type latch circuit as the 18th embodiment;

FIGS. 56A to 56D are timing charts showing the operation of the flip-flop circuit shown in FIG. 55;

FIG. 57 is a circuit diagram of a flip-flop circuit using a RAM-type latch circuit as the 19th embodiment;

FIGS. 58A to 58C are timing charts showing the operation of the flip-flop circuit shown in FIG. 57;

FIG. 62 is a circuit diagram of a flip-flop circuit using a RAM-type latch circuit as the 23rd embodiment of the present invention;

FIGS. 63A to 63D are timing charts showing the operation of the flip-flop circuit shown in FIG. 62;

FIGS. 66A to 66D are timing charts showing the operation of the flip-flop circuit shown in FIG. 65;

FIG. 67 is a circuit diagram of a flip-flop circuit using a RAM-type latch circuit as the 26th embodiment of the present invention;

DESCRIPTION OF THE PREFERRED EMBODIMENTS

Figure 1A:
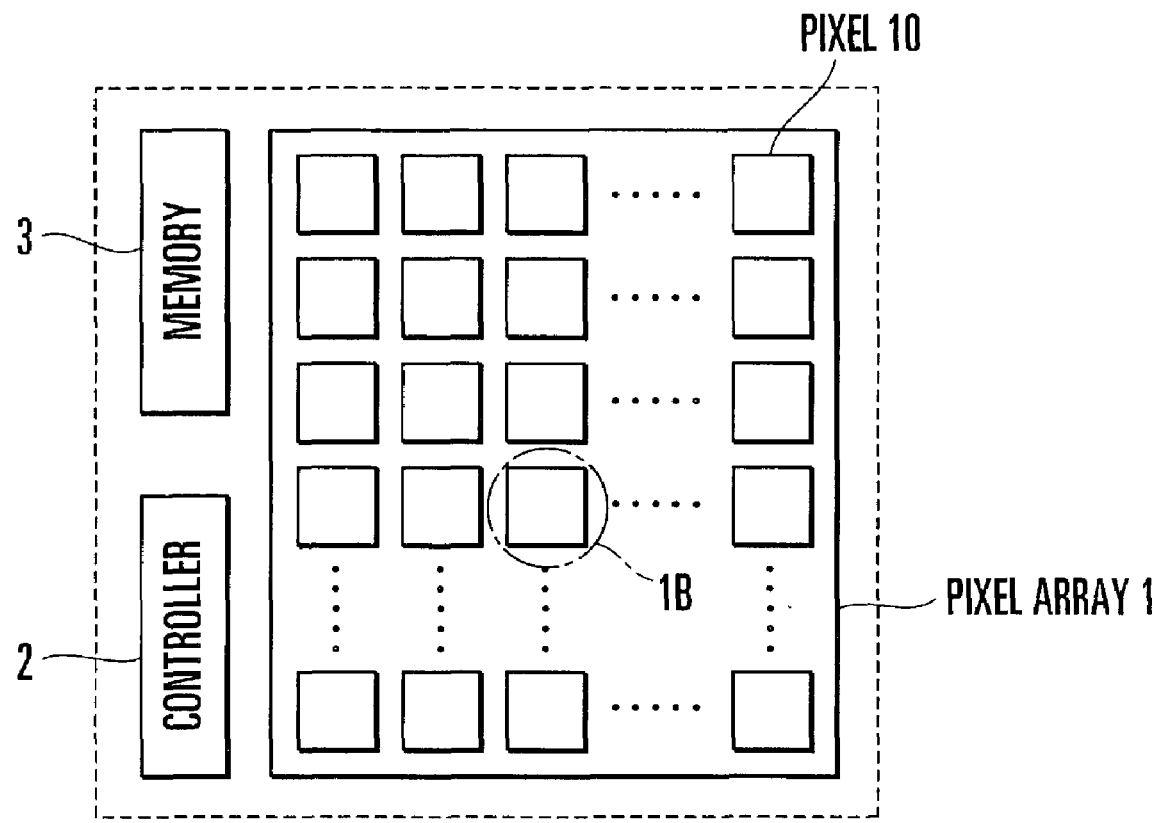
FIG. 1A is a block diagram showing the overall arrangement of a system to which the present invention is applied.

A parallel processing logic circuit according to the present invention is applied to a system which identifies the surface shape of an object or an image, like a fingerprint authentication system shown in FIG. 1A. This system has a pixel array 1 in which a plurality of pixels 10 are laid out in a matrix, a controller 2 for controlling the pixel array 1, and a memory 3 which stores a control program and some fingerprint images.

Figure 1B:
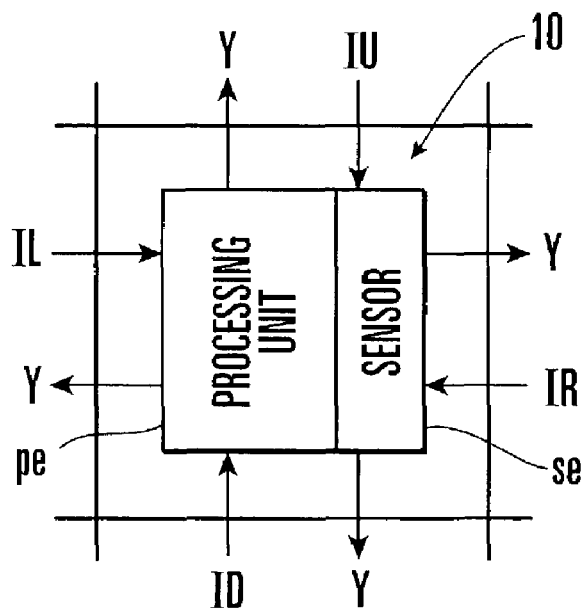
FIG. 1B is a block diagram showing the structure of a pixel indicted by a dotted circle in FIG. 1A.

As shown in FIG. 1B, each pixel 10 has a sensor se and processing unit pe. The sensor se detects the three-dimensional pattern on an object surface or light and outputs the detection result to the processing unit pe as binary data. The processing unit pe receives the binary data output from the sensor se and binary data IU, IR, ID, and IL output from neighboring pixels and executes predetermined combinational logic operation. The processing unit pe stores the execution result in a storage circuit in the processing unit pe as binary data Y and outputs the binary data Y to the neighboring pixels.

The processing units pe of the pixels 10 execute logic operation in parallel. These processing units pe construct a parallel processing logic circuit. The embodiments of the present invention will be described below in detail.

First Embodiment

In the first embodiment of the present invention, in a processing unit which constructs a parallel processing logic circuit, the functions of a combinational logic function are limited to an AND gate and an OR gate as a dual logic function of the AND gate.

Figure 2:
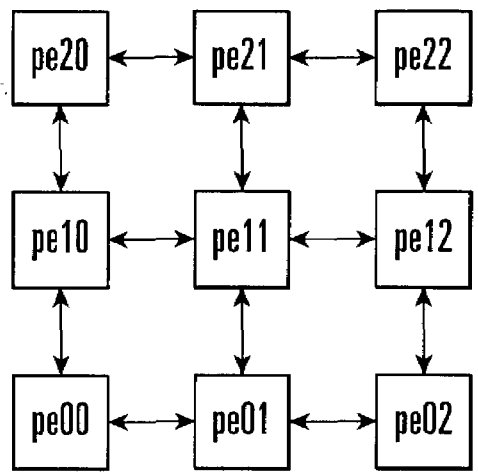
FIG. 2 is a block diagram showing the overall arrangement of a parallel processing logic circuit according to the first embodiment of the present invention.

FIG. 2 shows the overall arrangement of a parallel processing logic circuit according to the first embodiment. For the descriptive convenience, this parallel processing logic circuit consists of nine processing units peij (i, j=0, 1, 2) laid out in a matrix. The number of processing units peij laid out in a matrix is not limited to nine, as a matter of course.

Interconnections are formed between neighboring processing units to transfer data. Referring to FIG. 2, neighboring processing units peij whose i or j equal to each other can transmit/receive data. However, the present invention is not limited to this.

Figure 3A:
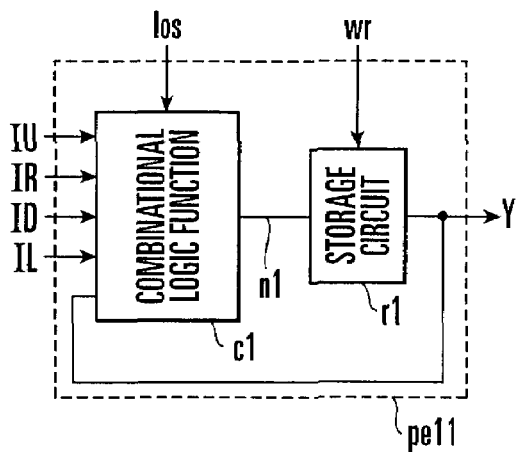
FIG. 3A is a block diagram showing the configuration of a processing unit pe11 shown in FIG. 2.

FIG. 3A shows the arrangement of a processing unit pe11 shown in FIG. 2. The processing unit pe11 is formed from a combinational logic function c1 for executing various kinds of processing operations and a storage circuit r1 for storing data processed by the combinational logic function c1. An output signal Y from the storage circuit r1 is input to combinational logic functions in four neighboring processing units pe01, pe10, pe12, and pe21 around the processing unit pe11. On the other hand, the combinational logic function c1 receives output signals (binary data) ID, IL, IR, and IU from the storage circuits in the four neighboring processing units pe01, pe10, pe12, and pe21 and the output signal (binary data) Y from the storage circuit r1 of its own.

Figure 3B:
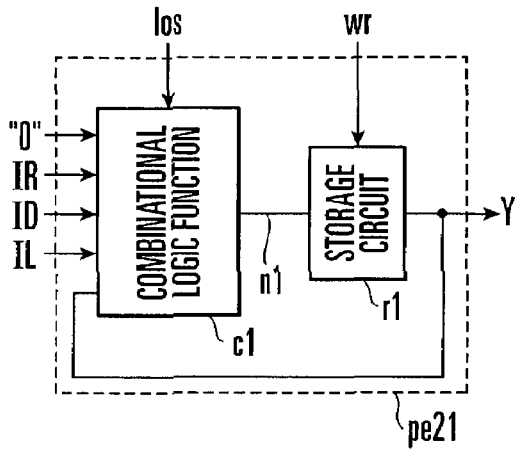
FIG. 3B is a block diagram showing the configuration of a processing unit pe21 at a matrix edge.

FIG. 3B shows the configuration of the processing unit pe21 at a matrix edge. The processing unit pe21 receives logic value "0" as an input signal from an upper processing unit that is not present.

Figure 3C:
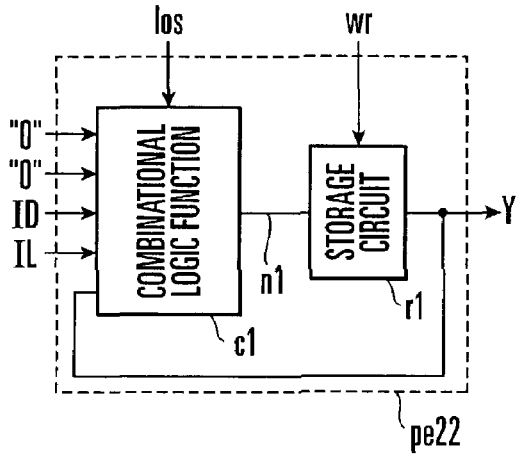
FIG. 3C is a block diagram showing the configuration of a processing unit pe22 at a matrix corner.

FIG. 3C shows the configuration of a processing unit pe22 at a matrix corner. The processing unit pe22 receives logic value "0" as input signals from upper and right processing units that are not present.

In a similar way, the remaining processing units at matrix edges and corners receive logic value "0" as input signals from neighboring processing units that are not present.

Figure 4:
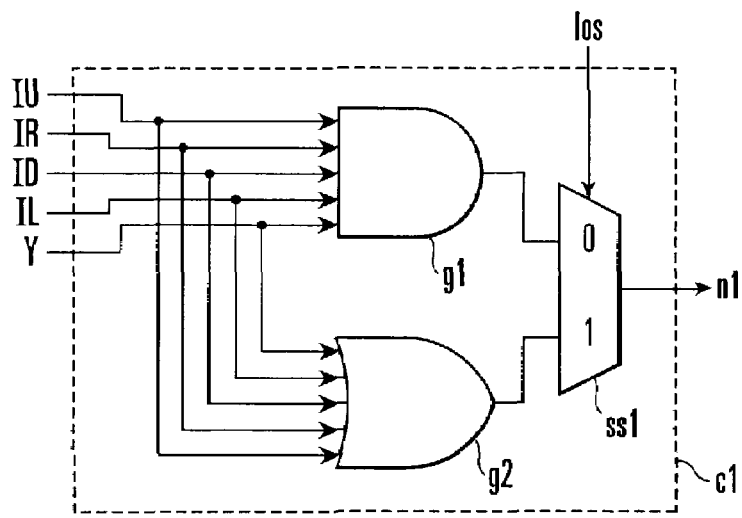
FIG. 4 is a circuit diagram of a combinational logic function in the processing unit pe11 shown in FIG. 3A.

FIG. 4 shows the combinational logic function c1 in the processing unit pe11 shown in FIG. 3A. This combinational logic function c1 is formed from a 5-input AND gate (first logic circuit) g1, 5-input OR gate (second logic circuit) g2, and multiplexer (control circuit) ss1. The input signals ID, IL, IR, IU, and Y are commonly input to the AND gate g1 and OR gate g2. The outputs from the logic gates g1 and g2 are connected to the inputs of the multiplexer. One of the outputs from the logic gates g1 and g2 is selected by a control signal los commonly distributed from a controller 2 shown in FIG. 1 to the processing units peij and output to the storage circuit r1 as an execution result n1 of the combinational logic function c1. The storage circuit r1 stores the execution result n1 of the combinational logic function c1.

Table 1 shows logic functions implemented in the combinational logic function c1 together with the logic values of the control signal los.

TABLE 1

| los | Logic Function c1 |
|-----|-------------------|
| 0   | n1 = IU * IR * ID * IL * Y |
| 1   | n1 = IU + IR + ID + IL + Y |

Morphological processing is an example of image processing. In this processing, binary data "0" or "1" is set in each of pixels 10 laid out in a matrix. Logic operation based on the data of neighboring pixels is performed in each pixel 10, thereby performing dilation or erosion of an area of pixel data "1". The dilation operation can be executed by the OR gate g2 shown in FIG. 4. More specifically, when the pixel data of the central pixel 10 is "1", the data of neighboring pixels are changed to "1" by the OR operation, thereby expanding the "1" data by one pixel. Conversely, the erosion operation can be performed by the AND gate g1 shown in FIG. 4. More specifically, when even one pixel having "0" data is present around the central the pixel data of the central pixel 10 is changed to "0", thereby contracting the number of pixels of one data.

In the field of image processing, logic operation assigned to predetermined image processing is often a dual logic function of logic operation assigned to image processing that gives an opposite effect, like expansion processing and contraction processing. Hence, when the combinational logic functions, which are a dual one of each other, are exclusively executed by each processing unit pe, both image processing operations can be efficiently performed in a single execution time. In addition, when each processing unit pe is designed to execute only two combinational logic functions, which are a dual one of each other, the circuit scale and size of each processing unit pe can be reduced. Consequently, more pixels are integrated per unit area and the resolution of image processing is raised. In addition, the increased resolution tolerates simple image processing, which enables the system to operate at a low operating frequency, thereby reducing the power consumption.

Second Embodiment

In the second embodiment of the present invention, in a processing unit which constructs a parallel processing logic circuit, the implemented combinational logic functions are limited to an AND gate and an OR gate, which are a dual one of each other.

FIG. 5 shows the overall arrangement of a parallel processing logic circuit according to the second embodiment. For the descriptive convenience, this parallel processing logic circuit consists of nine processing units peij (i, j=0, 1, 2) laid out in a matrix. Interconnections are formed between neighboring processing units to transfer data. As in the parallel processing logic circuit shown in FIG. 2, the number of processing units peij and connection relationship between them are not limited to those shown in FIG. 5.

FIG. 6 shows the block diagram of a processing unit pe11 shown in FIG. 5. The processing unit pe11 is comprised of combinational logic functions (first and second logic functions) c11 and c12 for executing various kinds of logic operations and a storage circuit r11 for storing data executed by the combinational logic function c11. An output signal n12 from the storage circuit r11 is input to a combinational logic function c12 and the output Y is delivered to the four neighboring processing units pe01, pe10, pe12, and pe21. On the other hand, the combinational logic function c11 receives output signals (binary data) ID, IL, IR, and IU from the four neighboring processing units pe01, pe10, pe12, and pe21 and the output signal Y (binary data) of its own.

Figure 7A:
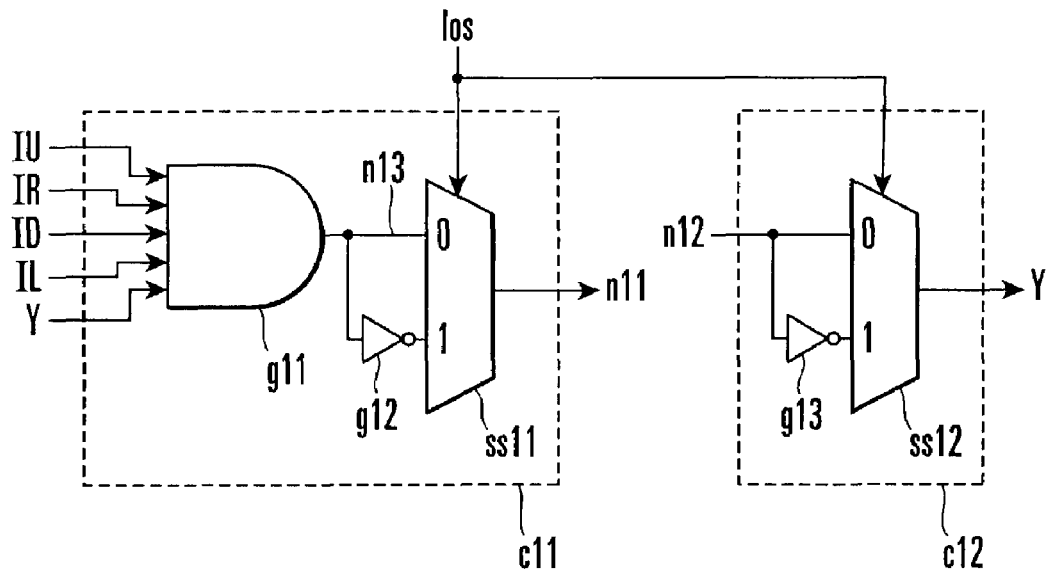
FIGS. 7A and 7B are circuit diagrams showing the configuration of combinational logic functions in the processing unit pe11 shown in FIG. 6.

FIG. 7A shows the configurations of the combinational logic functions c11 and c12 in the processing unit pe11 shown in FIG. 6. The combinational logic function c11 consists of a 5-input AND gate g11, a selector ss11, and an inverter g12. The combinational logic function c12 consists of a selector ss12 and an inverter g13. In the combinational logic function c11, the input signals ID, IL, IR, IU, and Y are input to the AND gate g11. An output signal n13 from the AND gate g11 is input to a circuit that changes the polarity of the input. The circuit consists of the inverter g12 and the selector ss11. An output signal n11 from the circuit is set to the positive or negative polarity of the output signal n13 in accordance with a control signal los commonly distributed from a controller (control means) 2 shown in FIG. 1A to the processing units peij. In the combinational logic function c12, the output signal Y from a circuit that consists of an inverter g13 and a selector ss12 and that changes the polarity of the output signal n12 from the storage circuit r11 in accordance with the control signal los.

Figure 7B:
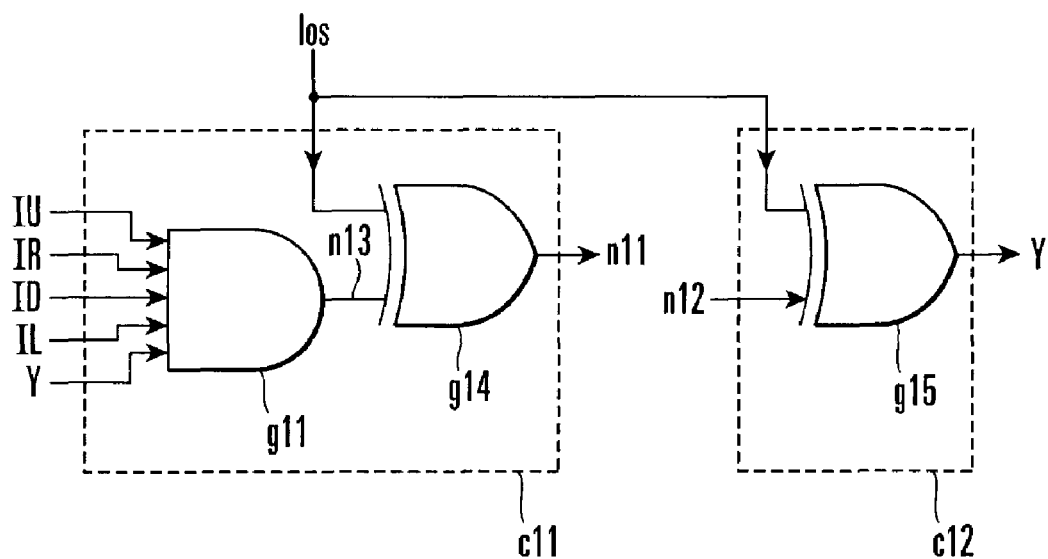

FIG. 7B shows another configurations of the combinational logic functions c11 and c12 in the processing unit pe11 shown in FIG. 6. For a 2-input exclusive OR (EXOR) gate, when one input is set to 0 or 1, the positive polarity or negative polarity of the other input can be obtained. For this reason, the circuit that consists of an inverter and a selector and that changes the polarity of one of the input as shown in FIG. 7A can be replaced with one EXOR gate. Hence, the combinational logic function c11 can be comprised of the 5-input AND gate g11 and two-input EXOR gate g14. The combinational logic function c12 can be comprised of a 2-input EXOR gate g15.

In this case, the input signals ID, IL, IR, IU, and Y are input to the AND gate g11. The output signal n13 from the AND gate g11 is input to the EXOR gate g14. The output signal n11 from the EXOR gate g14 is set to the positive or negative polarity of the signal n13 in accordance with the control signal los. The output signal Y from the EXOR gate g15 is set to the positive or negative polarity of the output signal n12 from the storage circuit r11 in accordance with the control signal los.

Table 2 shows logic functions executed in the circuits shown in FIGS. 7A and 7B together with the logic values of the control signal los.

TABLE 2

| los | Logic Function c11 | Logic Function c12 |
|-----|--------------------|--------------------|
| 0   | n11 = IU * IR * ID * IL * Y | n12 = Y |
| 1   | n11 = $\overline{\text{IU} * \text{IR} * \text{ID} * \text{IL} * \text{Y}}$ | n12 = $\overline{\text{Y}}$ |

FIGS. 8A to 8C explain a change of logic functions executed in the parallel processing logic circuit shown in FIG. 5. FIG. 8A shows a state wherein in each processing unit peij, the positive logic of the output from the AND gate g11 is connected to the input to the storage circuit r11 of its own, and the positive polarity of the output from the storage circuit r11 of its own is connected to the inputs of the neighboring processing units. As shown in FIG. 8B, in each processing unit peij, when the negative polarity of the output from the AND gate g11 is connected to the input to the storage circuit r11 of its own, and the negative polarity of the output from the storage circuit r11 of its own is connected to the inputs of the neighboring processing units, consequently, the logic function implemented between the storage circuits r11 of the processing units peij is changed from an AND to an OR gate, as shown in FIG. 8C.

FIGS. 9A and 9B show the configurations of processing units pe21 and pe22 at a matrix edge and matrix corner (to be simply referred to as a matrix edge hereinafter) shown in FIG. 5. In the processing units pe21 and pe22, to input logic value "0" as an input signal from a neighboring processing unit that is not present, the control signal los for the combinational logic functions c11 and c12 is given as an input signal from an absent processing unit. With this configuration, when los=0, logic value "0" is given as an input from an absent processing unit. On the other hand, when los=1, logic value "1" is given. The logic value "1" is given because in this case, the binary data stored in the processing unit is delivered to the neighboring units as the negative polarity.

In the parallel processing logic circuit shown in FIGS. 2 to 4, the two logic gates g1 and g2, which are a dual one of each other, are constructed in advance, and one of their outputs is selected and connected to the output of the processing unit. In the parallel processing logic circuit shown in FIGS. 5 to 9, the same function as described above can be realized by changing the polarity of the input and output of the constructed one logic gate. Since the necessary circuit scale is small, and the input load capacitance of a neighboring processing unit decreases, the processing unit can have a small area, low power consumption, and high processing speed.

Third Embodiment

In the third embodiment of the present invention, a plurality of storage circuits can be used in a processing unit which constructs a parallel processing logic circuit.

Figure 10:
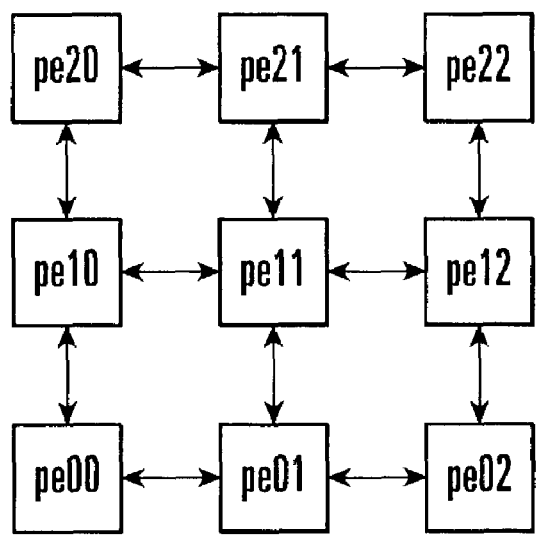
FIG. 10 is a block diagram showing the overall arrangement of a parallel processing logic circuit according to the third embodiment.

FIG. 10 shows the overall arrangement of a parallel processing logic circuit according to the third embodiment. For the descriptive convenience, this parallel processing logic circuit consists of nine processing units peij (i, j=0, 1, 2) laid out in a matrix. Interconnections are formed between neighboring processing units to transfer data. As in the parallel processing logic circuit shown in FIG. 2, the number of processing units peij and connection relationship between them are not limited to those shown in FIG. 10.

Figure 11:
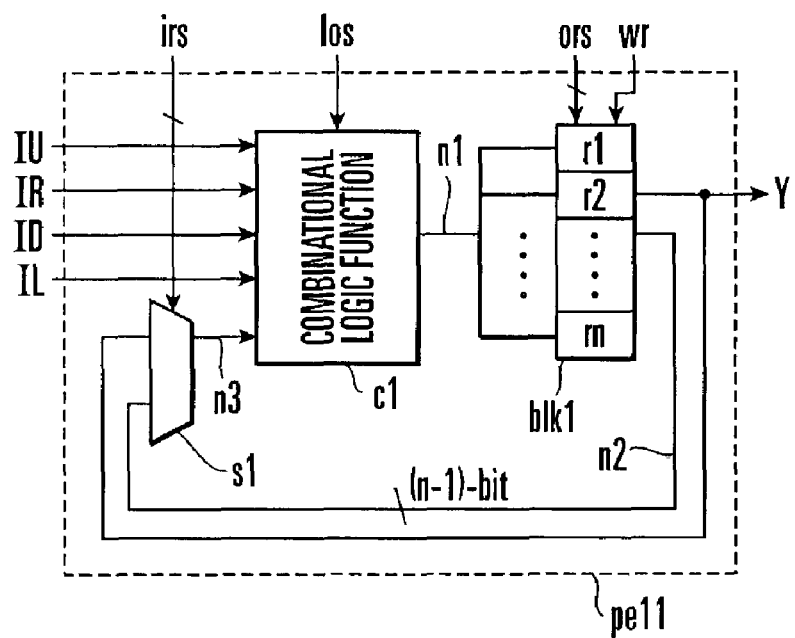
FIG. 11 is a block diagram showing the configuration of a processing unit pe11 shown in FIG. 10.

FIG. 11 shows the configuration of a processing unit pe11 shown in FIG. 10. The processing unit pe11 consists of a combinational logic function c1, a selector s1 serving as the second selection circuit, and a circuit block blk1 formed from storage circuits and selection circuits.

Figure 12:
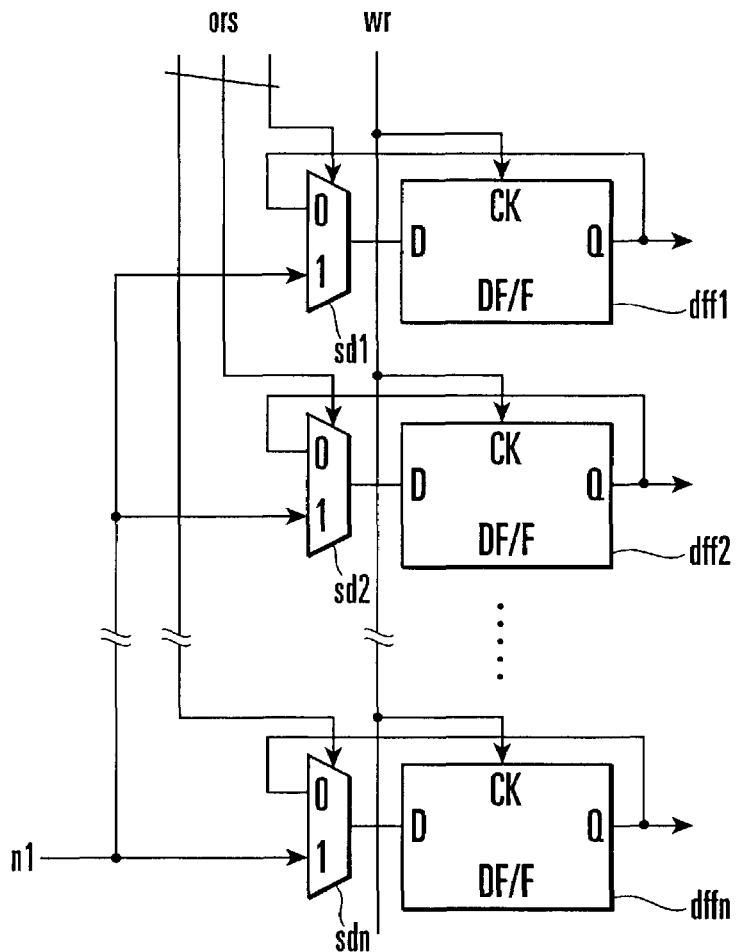
FIG. 12 is a circuit diagram showing the configuration of a circuit block blk1.

FIG. 12 shows the configuration of the circuit block blk1. The circuit block blk1 consists of D-flip-flops dff1, dff2, . . . , dffn which construct n storage circuits, and selectors sd1, sd2, . . . , sdn which construct the first selection circuit. An operation result n1 of the combinational logic function c1 is commonly supplied to the D-flip-flops dff1 to dffn through the selectors sd1 to sdn. Only a D-flip-flop selected by a control signal ors receives the data from the combinational logic function c1 and stores the data at a positive edge of a write signal wr. On the other hand, D-flip-flops which are not selected by the control signal ors store again the current data.

As shown in FIG. 11, the output signal from one storage circuit r1 in the circuit block blk1 is output to four neighboring processing units pe01, pe10, pe12, and pe21 as a signal Y.

This signal Y and output signals n2 (illustrated as a multi-bit signal) from (n−1) storage circuits r2 to rn in the circuit block blk1 are connected to the inputs of the selector s1. Only a signal selected by a control signal irs is input to the combinational logic function c1 as a signal n3 through the selector s1. The number of selected signals is not limited to 1 and may be 0, or a plurality of signals may be selected. Output signals ID, IL, IR, and IU from the four neighboring processing units pe01, pe10, pe12, and pe21 are input to the combinational logic function c1.

Figure 13:
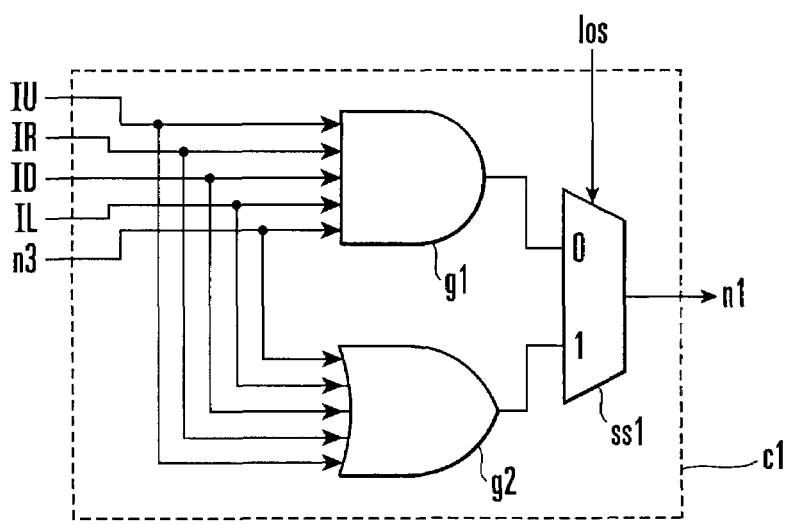
FIG. 13 is a circuit diagram of a combinational logic function in the processing unit pe11 shown in FIG. 11.

FIG. 13 shows the combinational logic function c1 in the processing unit pe11 shown in FIG. 11. This combinational logic function c1 consists of a 5-input AND gate g1, 5-input OR gate g2, and a selector ss1. The logic function executed in the combinational logic function c1 is changed between the AND gate and the OR gate by a control signal los delivered to the selector ss1. The output signal n1 from the combinational logic function c1 is input to the circuit block blk1, and the data is stored in some storage circuits selected by the control signal ors.

Figure 14A:
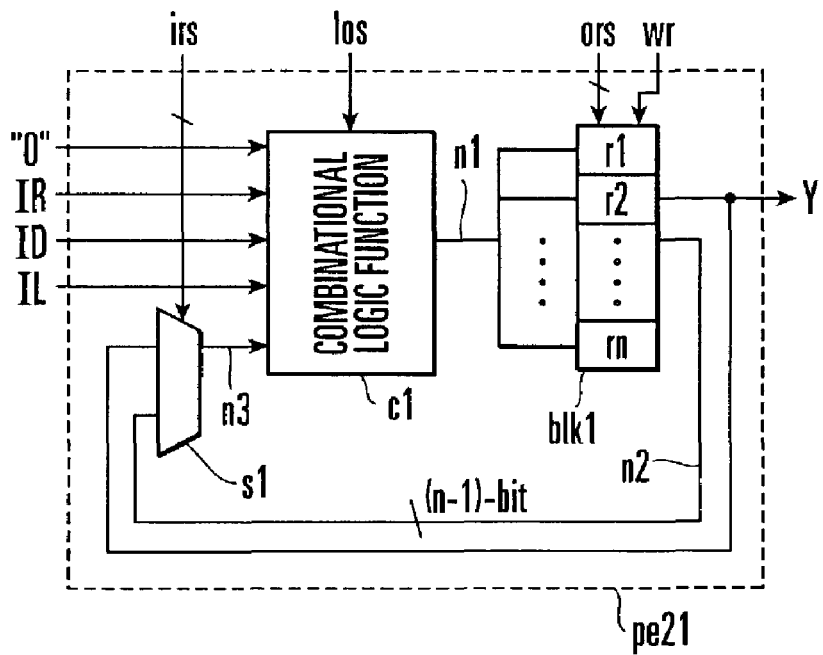
FIG. 14A is a block diagram showing the configuration of a processing unit pe21 at a matrix edge.
Figure 14B:
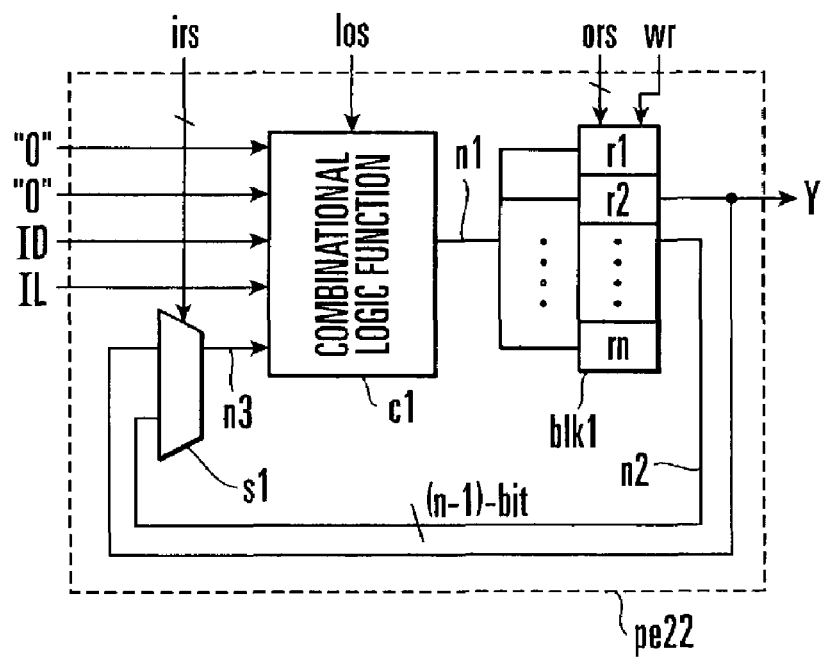
FIG. 14B is a block diagram showing the configuration of a processing unit pe22 at a matrix corner.

FIGS. 14A and 14B show the configurations of the processing units pe21 and pe22 at a matrix edge and a corner. In the processing units pe21 and pe22, logic value "0" is input as an input signal from an absent neighboring processing unit. This also applies to the remaining processing units at other matrix edge and corner.

The parallel processing logic circuit shown in FIGS. 10 to 14 can obtain the following advantage in addition to the advantage of the parallel processing logic circuit shown in FIGS. 2 to 4. That is, in the processing unit peij which constructs the parallel processing logic circuit, a plurality of intermediate execution results can be stored using a plurality of storage circuits. Hence, the operation function can be extended.

The control signals los, ors, and irs and the write signal wr are distributed from a controller 2 shown in FIG. 1A. The same reference numerals as in FIGS. 2 to 4 denote the same or corresponding parts in FIGS. 10 to 14B.

Fourth Embodiment

In the fourth embodiment of the present invention, a plurality of storage circuits can be used in a processing unit which constructs a parallel processing logic circuit.

Figure 15:
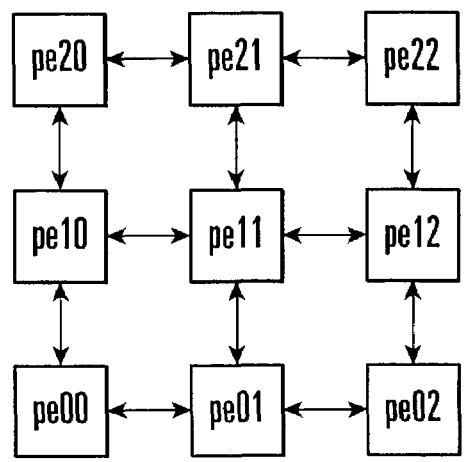
FIG. 15 is a block diagram showing the overall arrangement of a parallel processing logic circuit according to the fourth embodiment.

FIG. 15 shows the overall arrangement of a parallel processing logic circuit according to the fourth embodiment. For the descriptive convenience, this parallel processing logic circuit consists of nine processing units peij (i, j=0, 1, 2) laid out in a matrix. Interconnections are formed between neighboring processing units to transfer data. As in the parallel processing logic circuit shown in FIG. 5, the number of processing units peij and connection relationship between them are not limited to those shown in FIG. 15.

Figure 16:
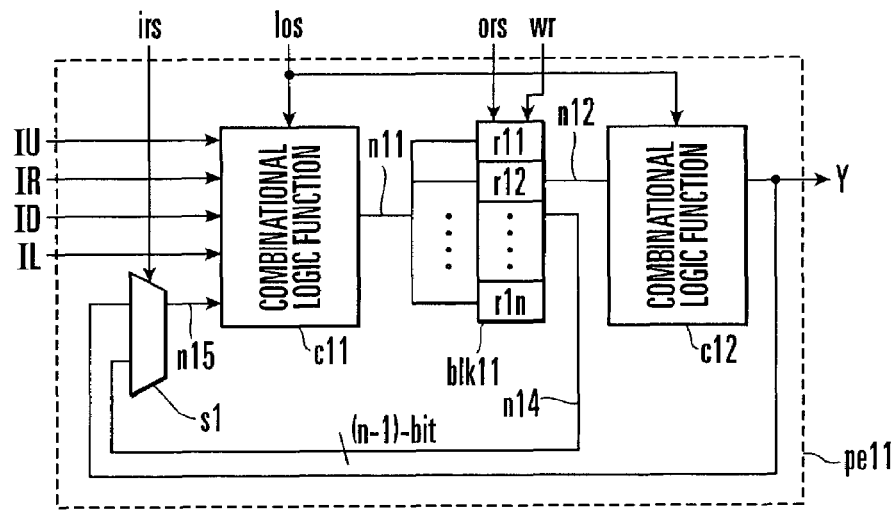
FIG. 16 is a block diagram showing the configuration of a processing unit pe11 shown in FIG. 15.

FIG. 16 shows the configuration of a processing unit pe11 shown in FIG. 15. The processing unit pe11 consists of combinational logic functions c11 and c12, a selector s1 serving as the second selection circuit, and a circuit block blk11 made of storage circuits and selectors.

The configuration and operation of the circuit block blk11 are the same as in FIG. 12. That is, the circuit block blk11 consists of D-flip-flops dff1 to dffn which construct n storage circuits, and selectors sd1 to sdn which construct the first selection circuit. Only a D-flip-flop selected by a control signal ors receives and stores an execution result n11 from the combinational logic function c11. The remaining D-flip-flops store again current data.

As shown in FIG. 16, an output signal n12 from one storage circuit r11 in the circuit block blk11 is processed by the combinational logic function c12 and output to four neighboring processing units pe01, pe10, pe12, and pe21 as a signal Y. This signal Y and output signals n14 (illustrated as a multi-bit signal) from (n−1) storage circuits r12 to r1n in the circuit block blk11 are delivered to the selector s1. Only a signal selected by a control signal irs is input to the combinational logic function c11 as a signal n15. The number of selected signals is not limited to 1 and may be 0, or a plurality of signals may be selected. Output signals ID, IL, IR, and IU from the four neighboring processing units pe01, pe10, pe12, and pe21 are input to the combinational logic function c11.

Figure 17:
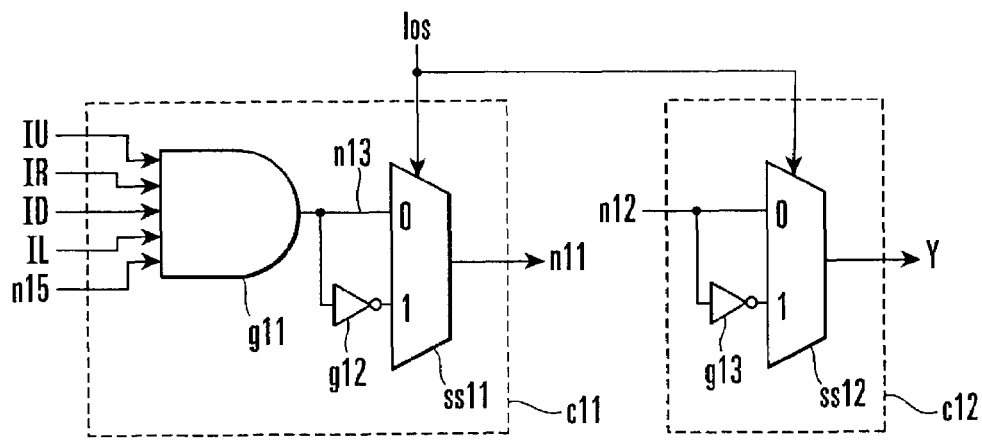
FIG. 17 is a circuit diagram of a combinational logic function in the processing unit pe11 shown in FIG. 16.

FIG. 17 shows the configurations of the combinational logic functions c11 and c12 in the processing unit pe11 shown in FIG. 16. The combinational logic function c11 consists of a 5-input AND gate g1, a selector ss11, and an inverter g12. The combinational logic function c12 consists of a selector ss12, and an inverter g13. The selector ss11 and inverter g12 or the selector ss12 and inverter g13 constructs a circuit that changes the polarity of the output n11 between the positive and negative polarity of the signal n13 according to the control signal los. By combining the circuit and 5-input AND gate g11, the logic function realized between the storage circuits of the processing unit peij can be switched between the AND gate and the OR gate. The combinational logic functions c11 and c12 may be constructed using EXOR gates, as in FIG. 7B.

The output signal n11 from the combinational logic function c11 is input to the circuit block blk11, and the data is stored in some storage circuits selected by the control signal ors.

Figure 18A:
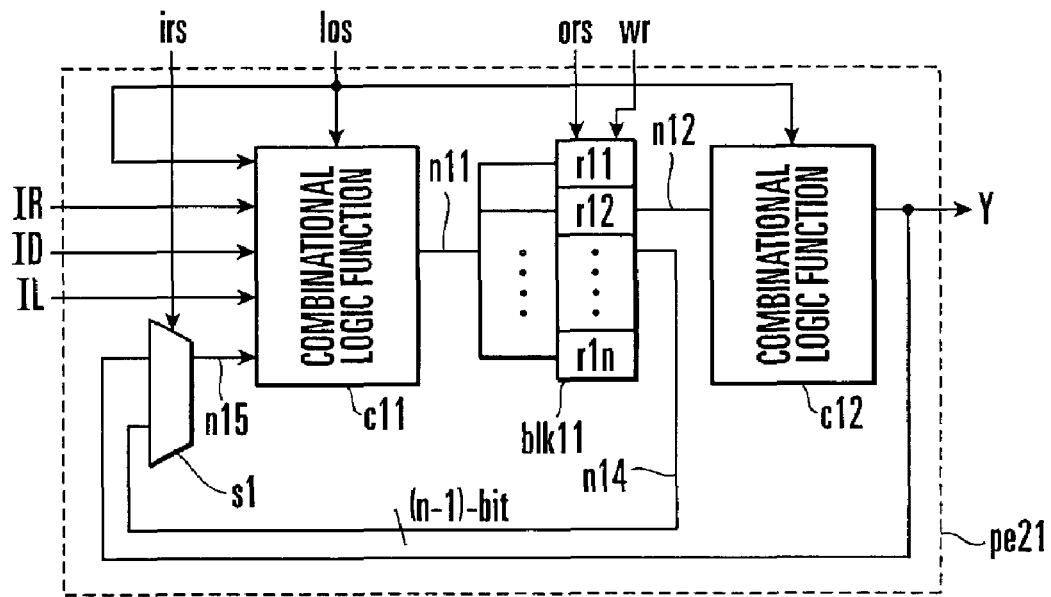
FIG. 18A is a block diagram showing the configuration of a processing unit pe21 at a matrix edge.
Figure 18B:
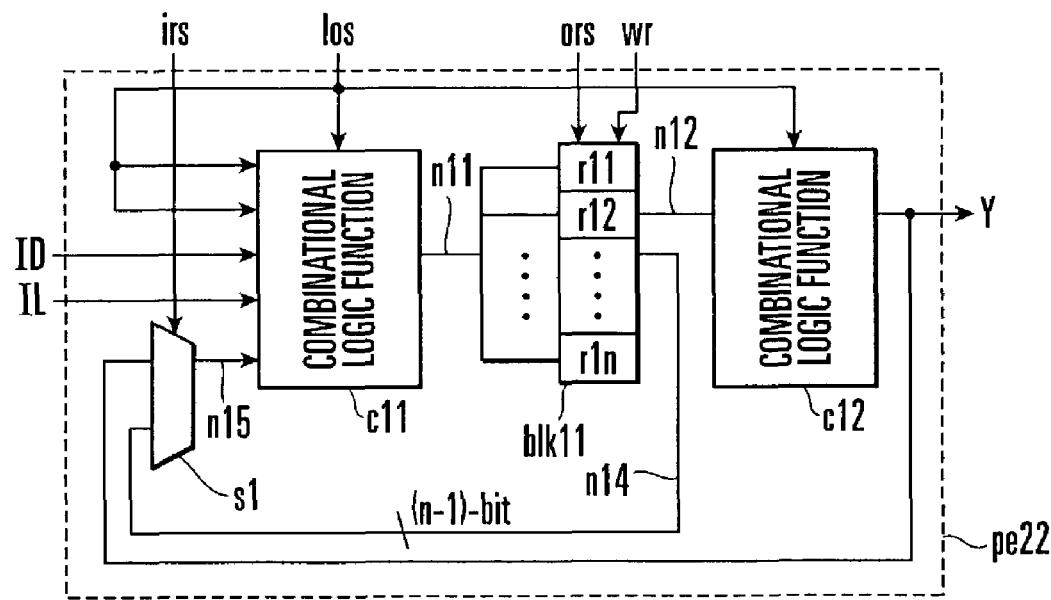
FIG. 18B is a block diagram showing the configuration of a processing unit pe22 at a matrix corner.

As shown in FIGS. 18A and 18B, in the processing units pe21 and pe22 at a matrix edge and a corner, the control signal los of the combinational logic functions c11 and c12 is connected to inputs of the combinational logic function c11 as an input signal from a disconnected side of a neighboring processing unit. With this configuration, the logic value "0" can be input as the input signal from a disconnected side of a neighboring processing unit. This also applies to the remaining processing units at a matrix edge and a corner.

In the parallel processing logic circuit shown in FIGS. 15 to 18, since a plurality of intermediate execution results can be stored using a plurality of storage circuits, the executable function can be extended. In addition, the logic gate in the processing unit is shared between the case of executing the 5-input AND or the 5-input OR. So, the size of the processing unit can be reduced. Furthermore, the sharing contributes to the reduction of the load capacitance at the input of a neighboring processing unit. Hence, the processing unit can have low power consumption and high operation speed.

The same reference numerals as in FIGS. 5 to 9B denote the same or corresponding parts in FIGS. 15 to 18B.

Fifth Embodiment

In the fifth embodiment of the present invention, a processing unit pe can receive binary data output from a sensor se in each pixel 10 of a pixel array 1 shown in FIG. 1.

Figure 19:
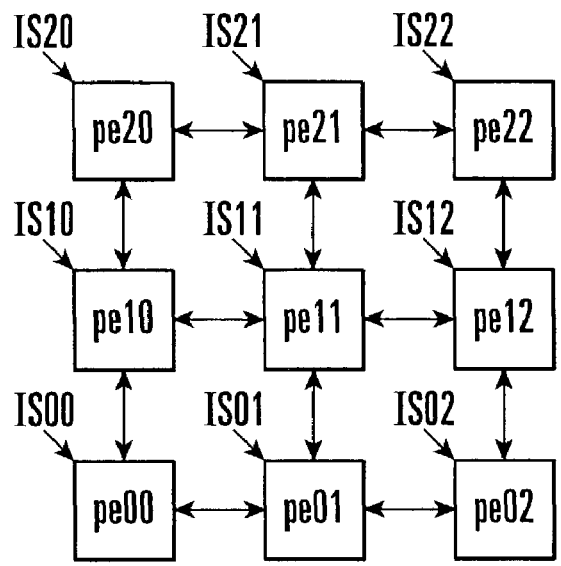
FIG. 19 is a block diagram showing the overall arrangement of a parallel processing logic circuit according to the fifth embodiment.

FIG. 19 shows the overall arrangement of a parallel processing logic circuit according to the fifth embodiment. For the descriptive convenience, this parallel processing logic circuit consists of nine processing units peij (i, j=0, 1, 2) laid out in a matrix. Interconnections are formed between neighboring processing units to transfer data. As in the parallel processing logic circuit shown in FIG. 2, the number of processing units peij and connection relationship between them are not limited to those shown in FIG. 19.

Each processing unit peij has an external data input terminal. This external data input terminal is connected to the output terminal of a sensor seij in the same pixel 10 as that for the processing unit peij. Hence, an output signal ISij (i, j=0, 1, 2) from the sensor seij is delivered to the processing unit peij from the external data input terminal.

Figure 20A:
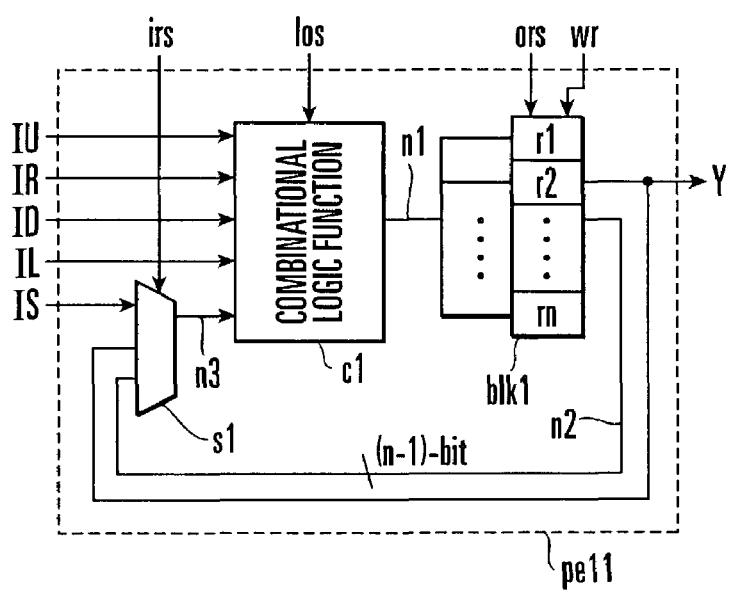
FIGS. 20A to 20C are block diagrams showing the configuration of a processing unit shown in FIG. 19.

FIG. 20A shows the configuration of a processing unit pe11 shown in FIG. 19. The processing unit pe11 consists of a combinational logic function c1, a selector s1 serving as the second selection circuit, and a circuit block blk1 made of storage circuits and selectors.

The configuration and operation of the circuit block blk1 are the same as in FIG. 12. That is, the circuit block blk1 consists of D-flip-flops dff1 to dffn which construct n storage circuits, and selectors sd1 to sdn which construct the first selection circuit. Only a D-flip-flop selected by a control signal ors receives and stores an execution result n1 from the combinational logic function c1. The remaining D-flip-flops store again current data.

As shown in FIG. 20A, the output signal from one storage circuit r1 in the circuit block blk1 is delivered to four neighboring processing units pe01, pe10, pe12, and pe21 as a signal Y.

This signal Y and output signals n2 (illustrated as a multi-bit signal) from (n−1) storage circuits r2 to rn in the circuit block blk1 are connected to the input of the selector s1. An output signal IS11 from a sensor se11 is also connected to the input of the selector s1. Of these signals, only a signal selected by a control signal irs is input to the combinational logic function c1 as a signal n3. Input signals ID, IL, IR, and IU from the four neighboring processing units pe01, pe10, pe12, and pe21 are connected to the inputs of the combinational logic function c1.

The combinational logic function c1 has the configuration shown in FIG. 13. The logic function executed in the combinational logic function c1 can be changed between the AND gate and the OR gate by a control signal los delivered to the selector ss1. The output signal n1 from the combinational logic function c1 is input to the circuit block blk1, and the data is stored in one or a plurality of storage circuits in the n storage circuits r1 to rn, which are selected by the control signal ors.

Figure 20B:
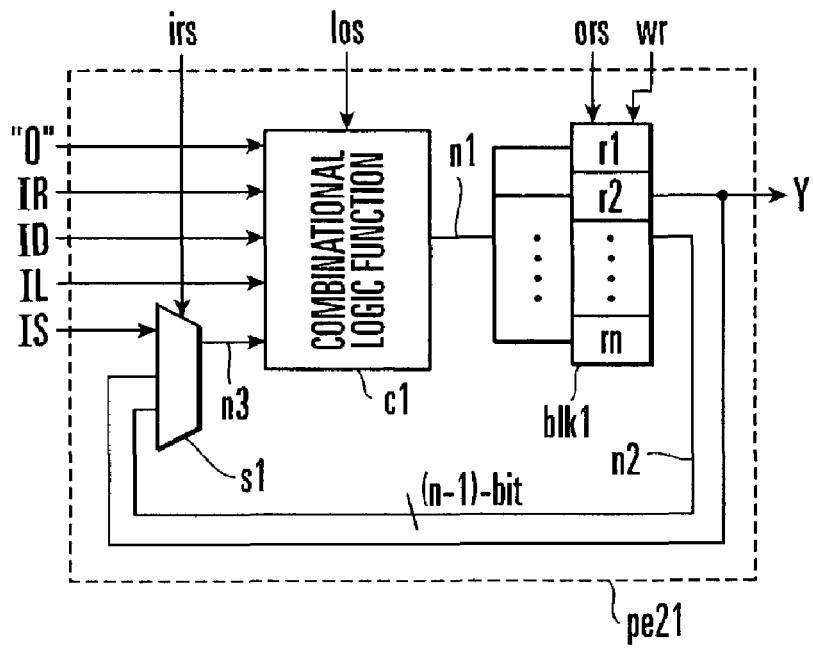
Figure 20C:
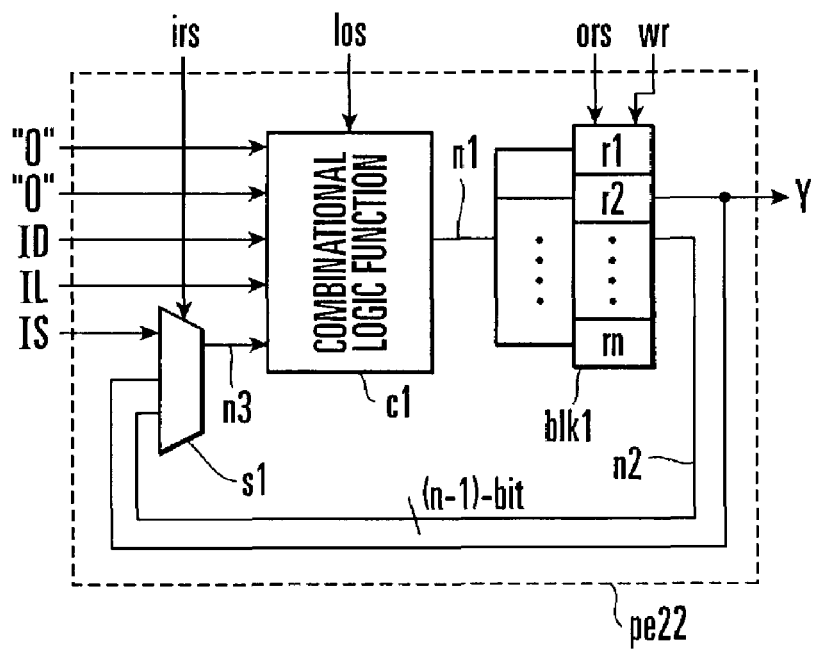

FIGS. 20B and 20C show the configurations of the processing units pe21 and pe22 at a matrix edge and a corner shown in FIG. 19. In the processing units pe21 and pe22, logic value "0" is input as an input signal from a disconnected side of a neighboring processing unit. This also applies to the remaining processing units at other matrix edge and corner.

The parallel processing logic circuit shown in FIGS. 19 to 20C can obtain the following advantage in addition to the advantage of the parallel processing logic circuit shown in FIGS. 2 to 4. That is, in each pixel 10 of the pixel array 1, the output signal ISij from the sensors seij is received in parallel by the combinational logic function c1 of the processing unit peij. In addition, the received signal ISij can be directly processed on the pixel array 1. For these reasons, high-speed image processing can be obtained. Additionally, in each processing unit peij, a plurality of intermediate operation results can be stored using a plurality of storage circuits. Hence, the executable function can be extended.

The same reference numerals as in FIGS. 2 to 4 and FIGS. 10 to 14B denote the same or corresponding parts in FIGS. 19 to 20C.

Sixth Embodiment

In the sixth embodiment of the present invention, a processing unit pe can receive binary data output from a sensor se in each pixel 10 of a pixel array 1 shown in FIG. 1.

Figure 21:
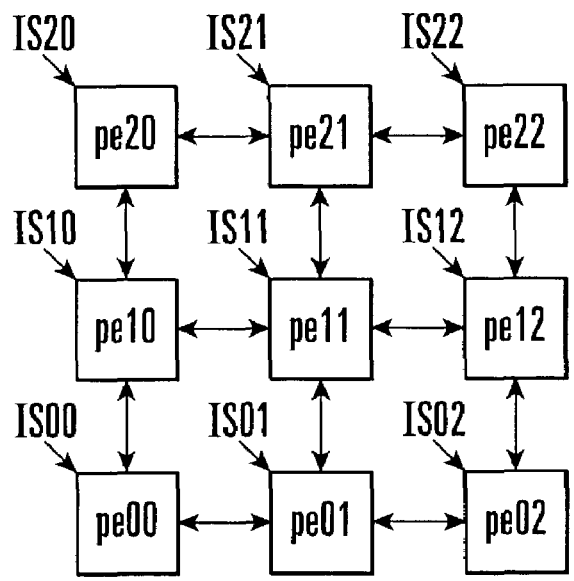
FIG. 21 is a block diagram showing the overall arrangement of a parallel processing logic circuit according to the sixth embodiment.

FIG. 21 shows the overall arrangement of a parallel processing logic circuit according to the sixth embodiment. For the descriptive convenience, this parallel processing logic circuit consists of nine processing units peij (i, j=0, 1, 2) laid out in a matrix. Interconnections are formed between neighboring processing units to transfer data. As in the parallel processing logic circuit shown in FIG. 2, the number of processing units peij and connection relationship between them are not limited to those shown in FIG. 21.

Each processing unit peij has an external data input terminal. This external data input terminal is connected to the output terminal of a sensor seij in the same pixel 10 as that for the processing unit peij. Hence, an output signal ISij (i, j=0, 1, 2) from the sensor seij is delivered to the processing unit peij from the external data input terminal.

Figure 22A:
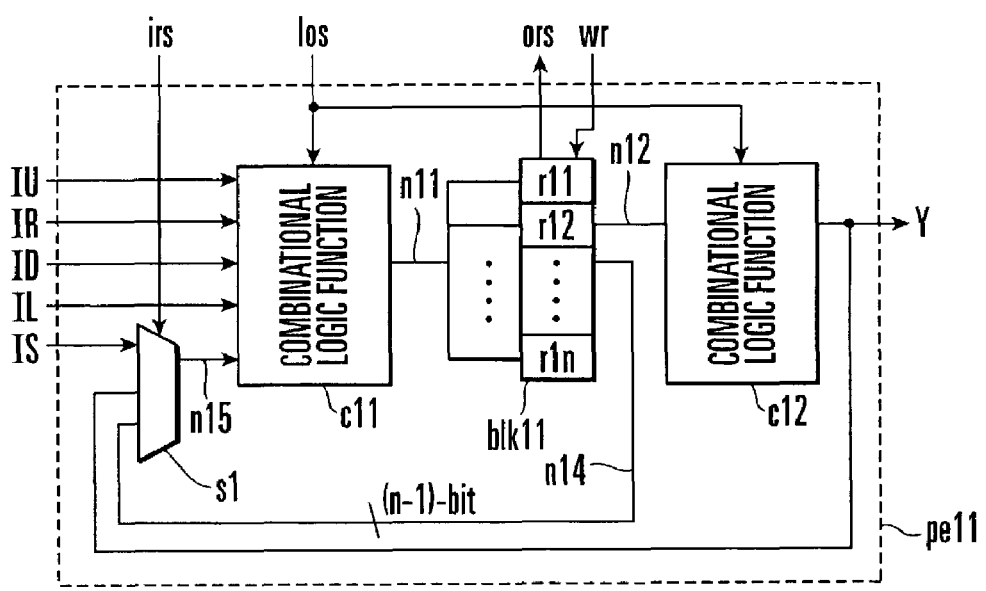
FIGS. 22A to 22C are block diagrams showing the configuration of a processing unit shown in FIG. 21.

FIG. 22A shows the configuration of a processing unit pe11 shown in FIG. 21. The processing unit pe11 consists of combinational logic functions c11 and c12, a selector s1 serving as the second selection circuit, and a circuit block blk11 made of storage circuits and selectors.

The configuration and operation of the circuit block blk11 are the same as in FIG. 12. That is, the circuit block blk11 consists of D-flip-flops dff1 to dffn which construct n storage circuits, and selectors sd1 to sdn which construct the first selection circuit. Only a D-flip-flop selected by a control signal ors receives an execution result n11 from the combinational logic function c11. The remaining D-flip-flops store again current data.

As shown in FIG. 22A, an output signal n12 from one storage circuit r11 in the circuit block blk11 is processed into a signal Y by the combinational logic function c12 and output to four neighboring processing units pe01, pe10, pe12, and pe21.

This signal Y and output signals n14 (illustrated as a multibit signal) from (n−1) storage circuits r12 to r1n in the circuit block blk11 are connected to the inputs of the selector s1. An output signal IS11 from a sensor se11 is also connected to the inputs of the selector s1. Of these signals, only a signal selected by a control signal irs is input to the combinational logic function c11 as a signal n15. Input signals ID, IL, IR, and IU from the four neighboring processing units pe01, pe10, pe12, and pe21 are connected to the inputs of the combinational logic function c11.

The combinational logic functions c11 and c12 have the configurations shown in FIG. 17. The logic function realized between the storage circuits of the processing unit peij can be changed between the AND gate and the OR gate by a control signal los delivered to the selection circuits ss11 and ss12. The combinational logic functions c11 and c12 may be made of EXOR gates, as in FIG. 7B.

An output signal n11 from the combinational logic function c11 is input to the circuit block blk11, and the data are stored in one or a plurality of storage circuits in the n storage circuits r1 to rn, which are selected by the control signal ors.

Figure 22B:
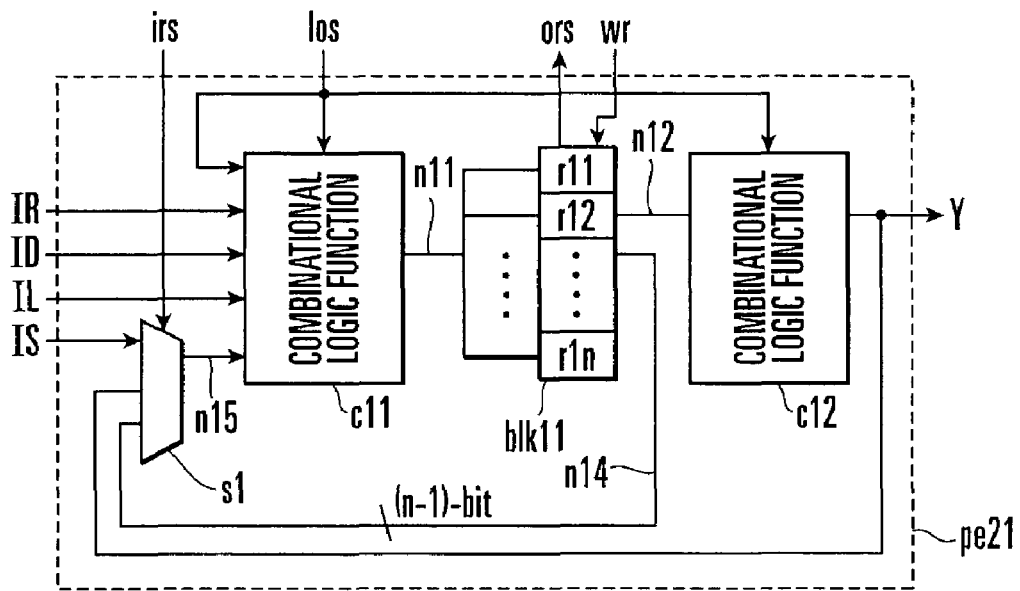
Figure 22C:
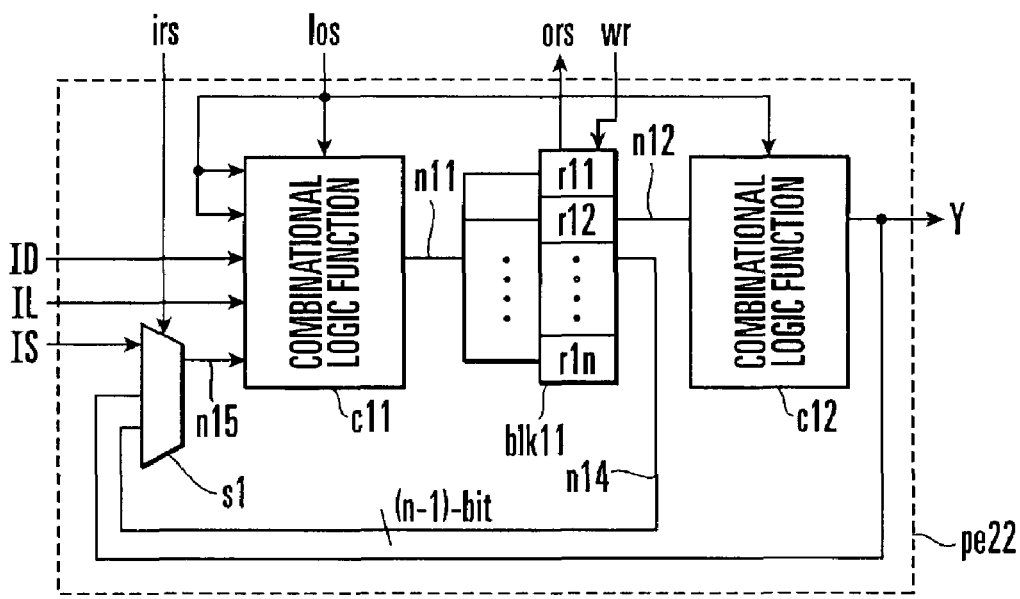

As shown in FIGS. 22B and 22C, in the processing units pe21 and pe22 at a matrix edge and a corner shown in FIG. 21, the control signal los of the combinational logic functions c11 and c12 is supplied as an input signal from a disconnected side of a neighboring processing unit at the matrix edge and the corner. With this configuration, the logic value "0" can be given as the input signal from a disconnected side of a neighboring processing unit. This also applies to the remaining processing units at a matrix edge and a corner.

According to the parallel processing logic circuit shown in FIGS. 21 to 22C, in each pixel 10 of the pixel array 1, the output signal ISij from the sensors seij is received in parallel by the combinational logic function c11 of the processing unit peij. In addition, the received signal ISij can be directly processed on the pixel array 1. For these reasons, high-speed image processing can be obtained. Additionally, in each processing unit peij, a plurality of intermediate execution results can be stored in a plurality of storage circuits. Hence, the executable function can be extended. In addition, the logic gate in the processing unit is shared between the case of executing the 5-input AND or the 5-input OR. So, the size of the processing unit can be reduced. Furthermore, the sharing contributes to the reduction of the load capacitance at the input of a neighboring processing unit. Hence, the processing unit can have low power consumption and high operation speed.

The same reference numerals as in FIGS. 5 to 9B and FIGS. 15 to 18B denote the same or corresponding parts in FIGS. 21 to 22C.

Seventh Embodiment

In the seventh embodiment of the present invention, logic function of two binary data stored in some storage circuits can be performed in a processing unit of a parallel processing logic circuit.

Figure 23:
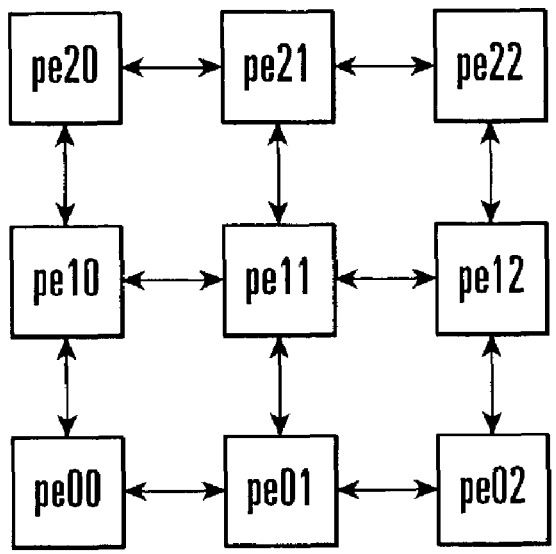
FIG. 23 is a block diagram showing the overall arrangement of a parallel processing logic circuit according to the seventh embodiment of the present invention.

FIG. 23 shows the overall arrangement of a parallel processing logic circuit according to the seventh embodiment. For the descriptive convenience, this parallel processing logic circuit consists of nine processing units peij (i, j=0, 1, 2) laid out in a matrix. Interconnections are formed between neighboring processing units to transfer data. As in the parallel processing logic circuit shown in FIG. 2, the number of processing units peij and connection relationship between them are not limited to those shown in FIG. 23.

Figure 24:
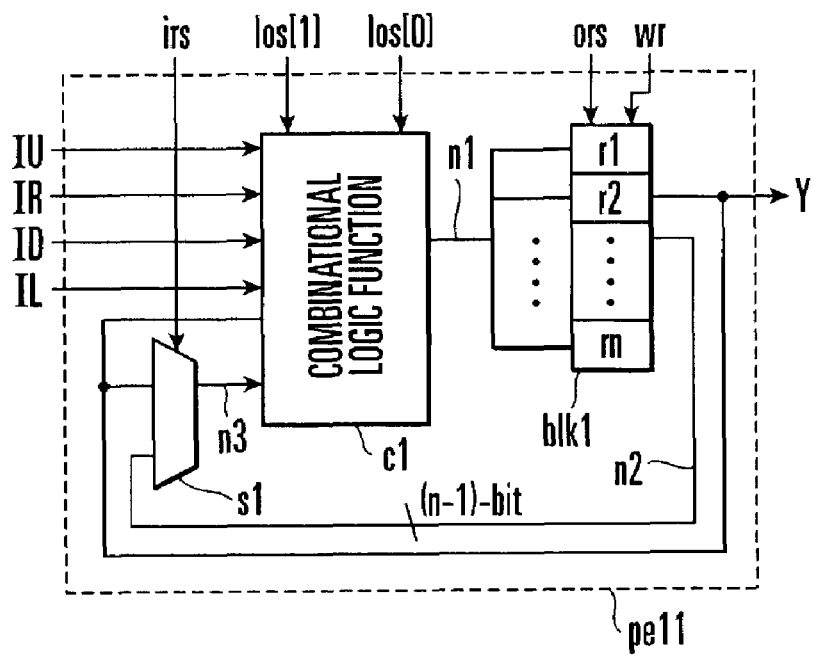
FIG. 24 is a block diagram showing the configuration of a processing unit pe11 shown in FIG. 23.

FIG. 24 shows the configuration of a processing unit pe11 shown in FIG. 19. The processing unit pe11 consists of a combinational logic function c1, a selector s1 serving as the second selection circuit, and a circuit block blk1 made of storage circuits and selectors.

The configuration and operation of the circuit block blk1 are the same as in FIG. 12. That is, the circuit block blk1 consists of D-flip-flops dff1 to dffn which construct n storage circuits, and selectors sd1 to sdn which construct the first selection circuit. Only a D-flip-flop selected by a control signal ors receives an execution result n1 from the combinational logic function c1. The remaining D-flip-flops store again current data.

As shown in FIG. 24, the output signal from one storage circuit r1 in the circuit block blk1 is delivered to four neighboring processing units pe01, pe10, pe12, and pe21 as a signal Y.

This signal Y and output signals n2 (illustrated as a multibit signal) from (n−1) storage circuits r2 to rn in the circuit block blk1 are connected to the inputs of the selector s1. Only a signal selected by a control signal irs is input to the combinational logic function c1 as a signal n3. Input signals ID, IL, IR, and IU from the four neighboring processing units pe01, pe10, pe12, and pe21 and the output signal Y from the processing unit are input to the combinational logic function c1.

Figure 25:
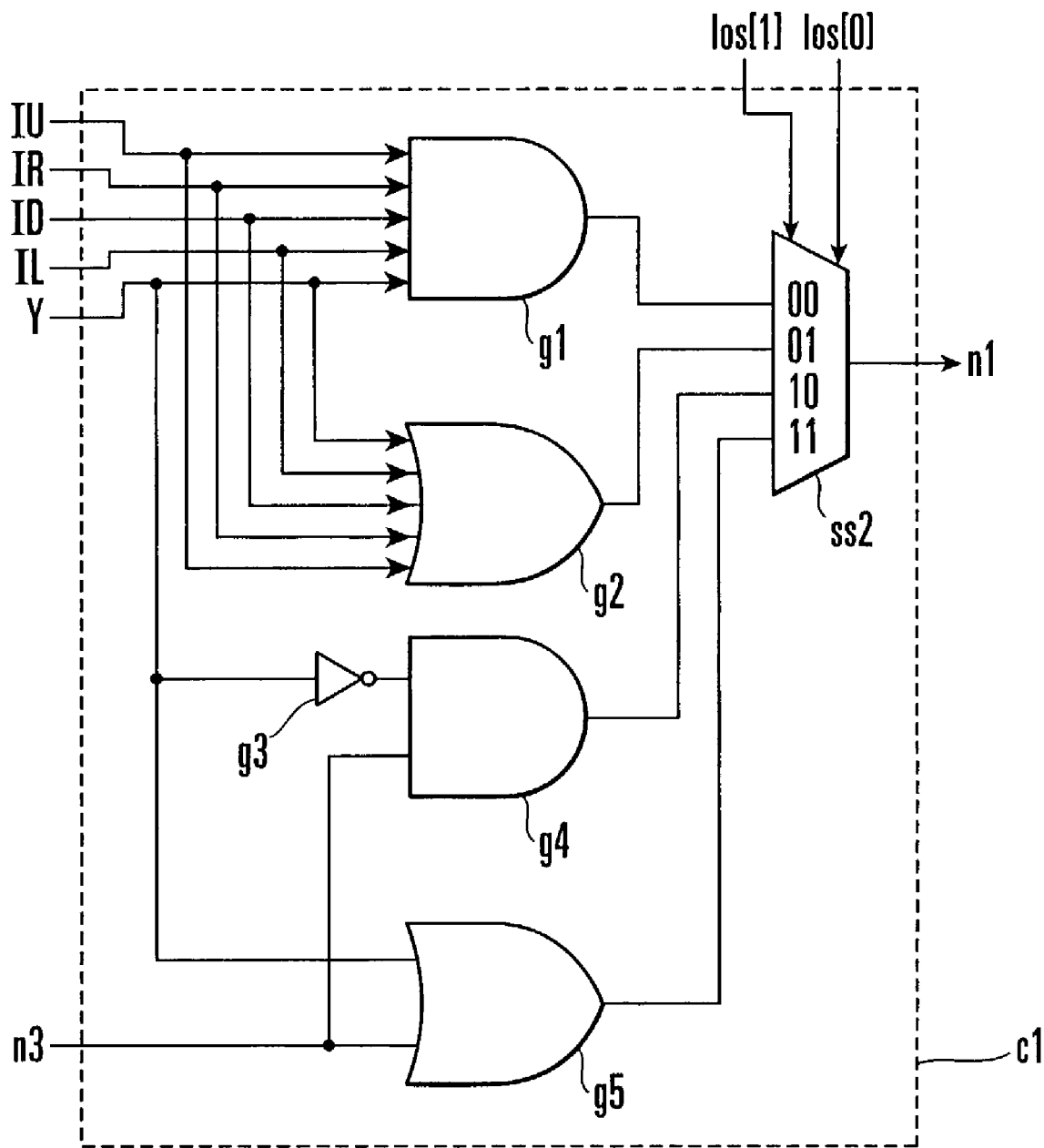
FIG. 25 is a circuit diagram of a combinational logic function in the processing unit pe11 shown in FIG. 24.

FIG. 25 shows the combinational logic function c1 in the processing unit pe11 shown in FIG. 24. The combinational logic function c1 consists of a 5-input AND gate g1, 5-input OR gate g2, 2-input AND gate g4, 2-input OR gate g5, inverter g3, and a selector ss2. The input signals ID, IL, IR, and IU from the four neighboring processing units pe01, pe10, pe12, and pe21 and the output signal Y from the processing unit pe11 itself are commonly input to the 5-input AND gate g1 and 5-input OR gate g2. The signal n3 from the selector s1 and the signal Y through the inverter g3 are input to the 2-input AND gate g4. The signal n3 from the selector s1 and the signal Y are input to the 2-input OR gate g5. The output signals from the logic gates g1, g2, g4, and g5 are input to the selector ss2. One of the output signals from the logic gates g1, g2, g4, and g5 is selected by a control signal los[1] and los[0] commonly distributed from a controller 2 shown in FIG. 1 to the processing units peij, and the selected signal n1 is output to the circuit block blk1 as the execution result of the combinational logic function c1. The selected signal n1 is stored in some of the n storage circuits r1 to rn, which are selected by the control signal ors.

Table 3 shows the logic functions executed in the combinational logic function c1 and the corresponding control signal los[1-0].

TABLE 3

| los[1-0] | Logic Function c1 |
|---|---|
| 00 | n1 = IU * IR * ID * IL * Y |
| 01 | n1 = IU + IR + ID + IL + Y |
| 10 | n1 = n3 * $\overline{Y}$ |
| 11 | n1 = n3 + Y |

As described above, in the processing unit pe11 shown in FIG. 24, logic operation is executed between the output signal Y from one storage circuit r1 in the circuit block blk1 and the signal n3 selected from the output signals from the n storage circuits r1 to rn. Two logic functions of total two binary data are newly implemented. One is the AND of n3 the inverse of Y. The other is the OR of n3 and Y. With these two logic functions, the selector logic can be efficiently implemented.

Figure 26A:
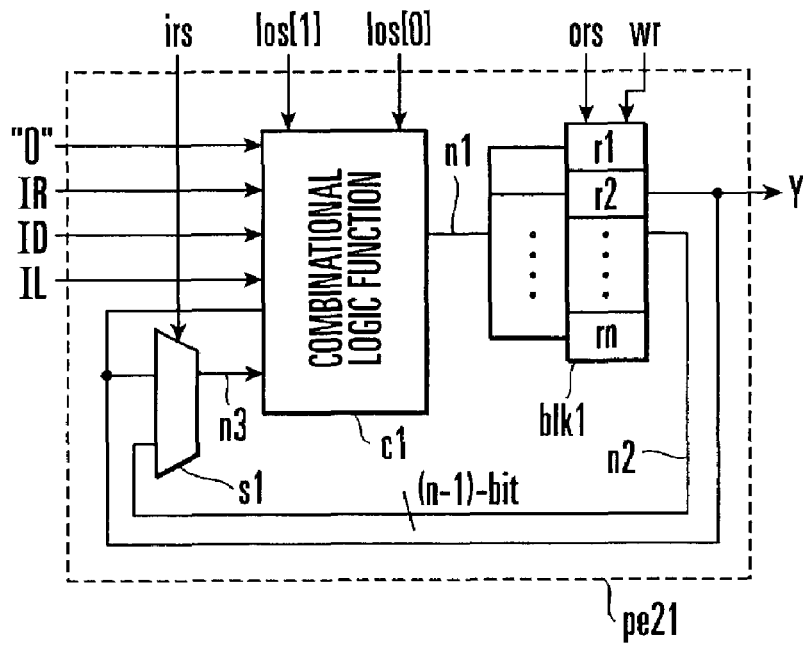
FIG. 26A is a block diagram showing the configuration of a processing unit pe21 at a matrix edge.
Figure 26B:
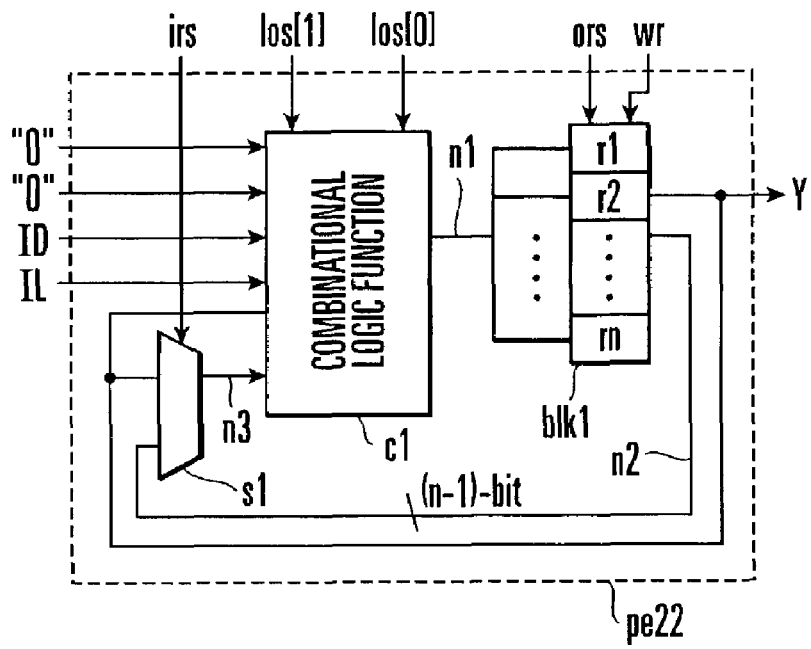
FIG. 26B is a block diagram showing the configuration of a processing unit pe22 at a matrix corner.

FIGS. 26A and 26B show the configurations of processing units pe21 and pe22 at a matrix edge and a corner shown in FIG. 23. In the processing units pe21 and pe22, logic value "0" is given as an input signal from a disconnected side of a neighboring processing unit. This also applies to the remaining processing units at a matrix edge and a corner.

The parallel processing logic circuit shown in FIGS. 23 to 26B can obtain the following advantage in addition to the advantage of the parallel processing logic circuit shown in FIGS. 2 to 4. A product-of-sum logic of the plurality of storage data is easily implemented with a serial execution of the new AND and OR logic functions. Therefore, the image processing executed in the parallel logic circuit can be further extended.

The same reference numerals as in FIGS. 2 to 4 and FIG. 13 denote the same or corresponding parts in FIGS. 23 to 26B.

Eighth Embodiment

In the eighth embodiment of the present invention, logic function of two binary data stored in some storage circuits can be performed in a processing unit of a parallel processing logic circuit.

Figure 27:
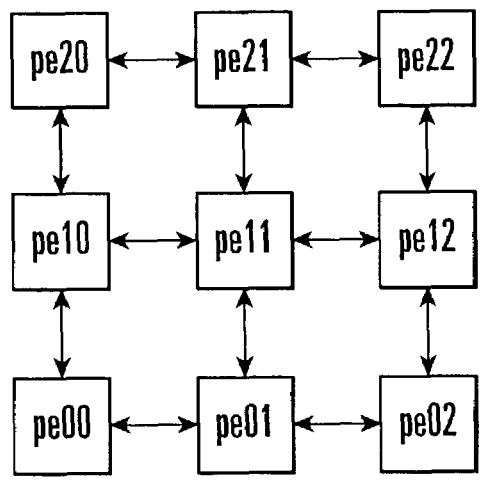
FIG. 27 is a block diagram showing the overall arrangement of a parallel processing logic circuit according to the eighth embodiment.

FIG. 27 shows the overall arrangement of a parallel processing logic circuit according to this embodiment. For the descriptive convenience, this parallel processing logic circuit consists of nine processing units peij (i, j=0, 1, 2) laid out in a matrix. Interconnections are formed between neighboring processing units to transfer data. As in the parallel processing logic circuit shown in FIG. 5, the number of processing units peij and connection relationship between them are not limited to those shown in FIG. 27.

Figure 28:
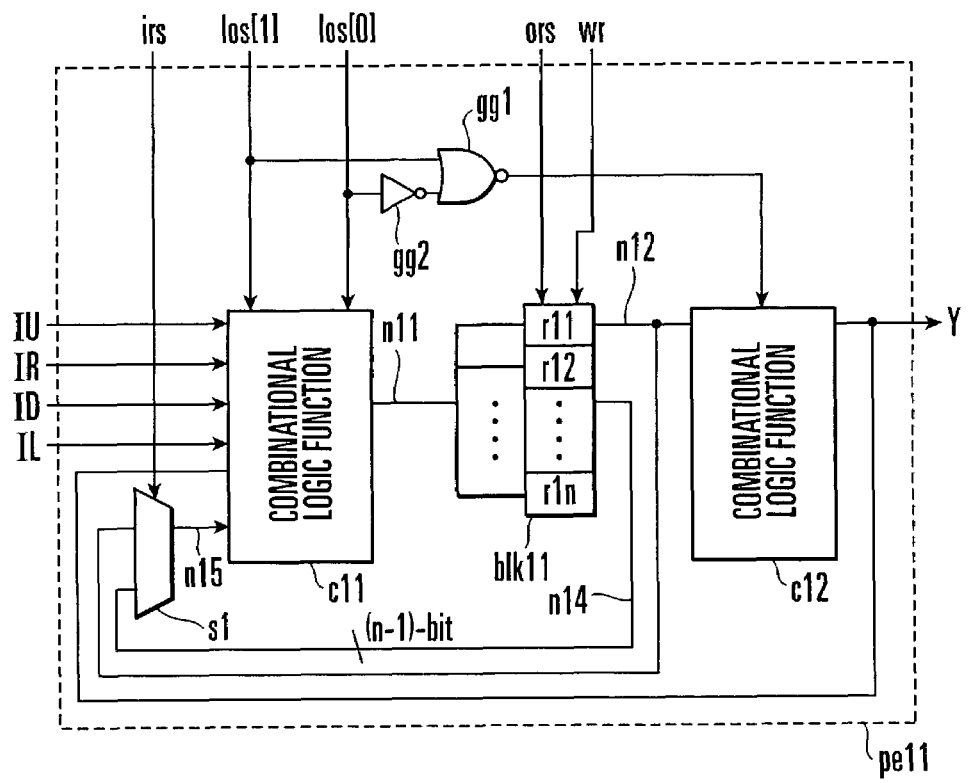
FIG. 28 is a block diagram showing the configuration of a processing unit pe11 shown in FIG. 27.

FIG. 28 shows the configuration of a processing unit pe11 shown in FIG. 27. The processing unit pe11 consists of combinational logic functions c11 and c12, a selector s1 serving as the second selection circuit, a circuit block blk11 made of storage circuits and selectors, a NOR gate gg1, and an inverter gg2.

The configuration and operation of the circuit block blk1 are the same as in FIG. 12. That is, the circuit block blk11 consists of D-flip-flops dff1 to dffn which construct n storage circuits, and selectors sd1 to sdn which construct the first selection circuit. Only a D-flip-flop selected by a control signal ors receives an execution result ni1 from the combinational logic function c11. The remaining D-flip-flops store again current data.

As shown in FIG. 28, an output signal n12 from one storage circuit r11 in the circuit block blk11 is processed into the signal Y by the combinational logic function c12 and delivered to four neighboring processing units pe01, pe10, pe12, and pe21. The output signal n12 from the storage circuit r11 and the output signal n14 (illustrated as a multi-bit signal) from (n−1) storage circuits r12 to r1n in the circuit block blk11 are connected to the input of the selector s1. Only a signal selected by a control signal irs is input to the combinational logic function c11 as a signal n15. Input signals ID, IL, IR, and IU from the four neighboring processing units pe01, pe10, pe12, and pe21 and the output signal Y from the processing unit pe11 are input to the combinational logic function c11.

Figure 29:
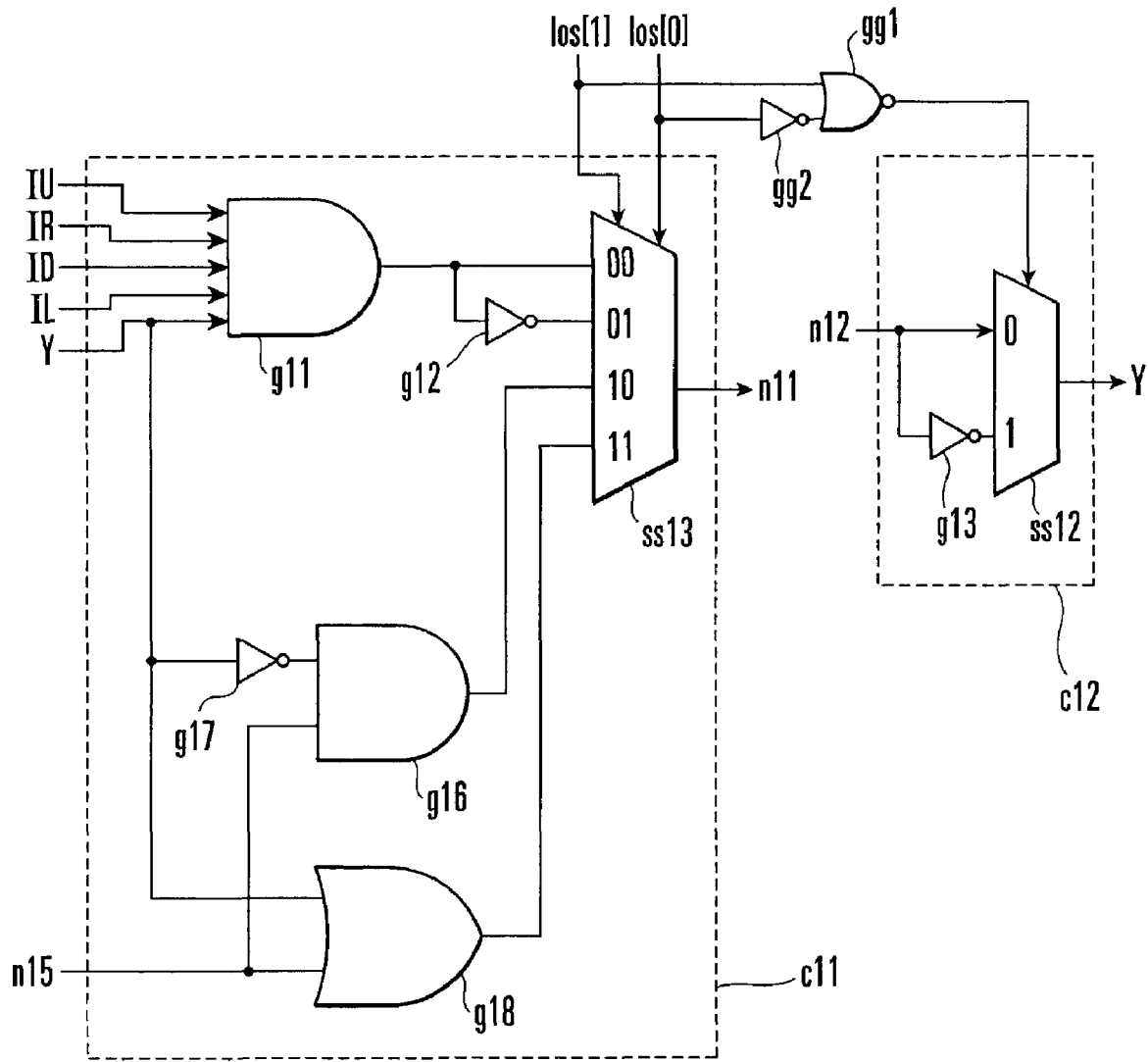
FIG. 29 is a circuit diagram of a combinational logic function in the processing unit pe11 shown in FIG. 28.

FIG. 29 shows the configurations of the combinational logic functions c11 and c12 in the processing unit pe11 shown in FIG. 28. The combinational logic function c11 consists of a 5-input AND gate g11, 5-input AND gate g16, 2-input OR gate g18, inverters g12 and g17, and a selector ss13. The combinational logic function c12 consists of an inverter g13 and selector ss12.

In the combinational logic function c11, input signals ID, IL, IR, and IU from the four neighboring processing units pe01, pe10, pe12 and pe21 and the output signal Y from the processing unit pe11 itself are input to the 5-input AND gate g11. A signal n15 from the selector s1 and the signal Y through the inverter g17 are input to the 2-input AND gate g16. The signal n15 from the selector s1 and the signal Y are input to the 2-input OR gate g18. The output signals from the logic gates g11, g16, and g18 and the inverse of the output signal of the 5-input AND gate g11 are input to the selection circuit ss13. The selector ss13 is controlled by a control signal los[1] and los[0] and outputs a signal selected from the input signals as the operation result n11 of the combinational logic function c11. The execution result n11 is input to the circuit block blk11 and stored in one or a plurality of storage circuits selected from the n storage circuits r11 to r1n by the control signal ors.

On the other hand, in the combinational logic function c12, the output signal n12 from one storage circuit r11 in the circuit block blk11 and the inverse of the output signal n12 through the inverter g13 are input to the selector ss12. The selector ss12 is controlled by a signal obtained by decoding the control signals los[1] and los[0], and the selector outputs the selected signal as the signal Y. The decoding is done by the NOR gate gg1 and the inverter gg2.

When the circuit configurations of the combinational logic functions c11 and c12 are used, the four kinds of combinational logic functions shown in Table 4 below can be performed by specifying the control signal los[1-0].

TABLE 4

| los[1-0] | Logic Function c11 | Logic Function c12 |
|---|---|---|
| 00 | n11 = IU * IR * ID * IL * Y | Y = n12 |
| 01 | n11 = $\overline{IU * IR * ID * IL * Y}$ | Y = $\overline{n12}$ |
| 10 | n11 = n15 * $\overline{Y}$ | Y = n12 |
| 11 | n11 = n15 + Y | Y = n12 |

In the combinational logic functions c11 and c12, the selector ss13 and an inverter g12 or the selector ss12 and inverter g13 work as a circuit that changes the polarity of one of the inputs and delivers the result. By combining the circuit and 5-input AND gate g11, the logic function realized between the storage circuits of the processing unit peij can be changed between the AND gate and the OR gate.

In addition, in the processing unit pe11, two kinds of logic functions of local storage data can be executed. One is the AND of n15 and the inverse of Y. The other is the OR of n15 and Y. The n15 is a signal obtained through the selector s1 from the stored data in registers r12 to rn. The Y is obtained through the combinational function c12 from the stored data in the register r11.

Figure 30A:
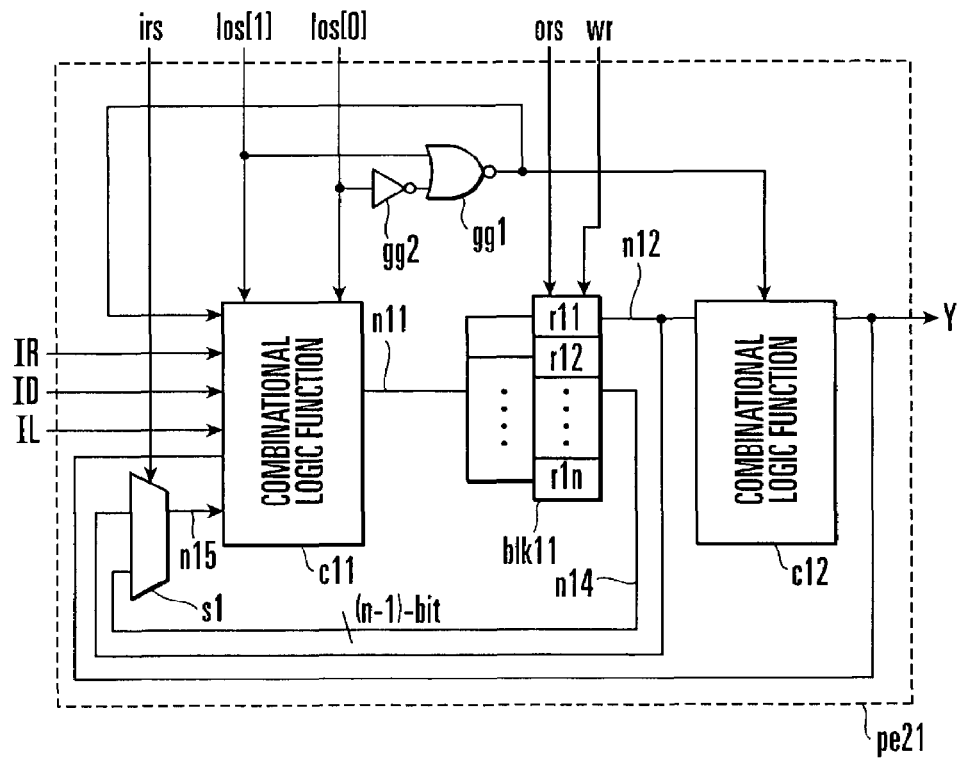
FIG. 30A is a block diagram showing the configuration of a processing unit pe21 at a matrix edge.
Figure 30B:
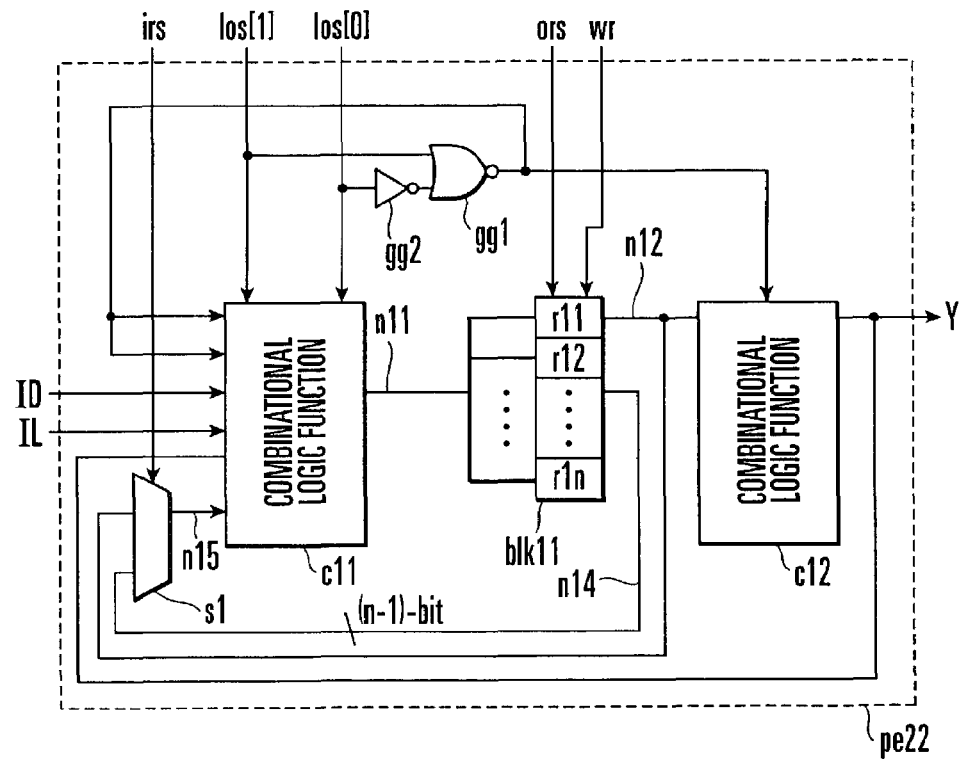
FIG. 30B is a block diagram showing the configuration of a processing unit pe22 at a matrix corner.

FIGS. 30A and 30B show the configurations of processing units pe21 and pe22 at a matrix edge and a corner shown in FIG. 27. In the processing units pe21 and pe22, to always input logic value "0" as the input signal from a disconnected side of a neighboring processing unit in the four kinds of logic functions realized, a signal obtained by decoding of the control signal los[1] or los[0] is given instead. That is, only when los[1-0]=(10), logic value "1" is given as absent data. Otherwise, the logic value "0" is given. This also applies to the remaining processing units at other matrix edge and corner.

In the parallel processing logic circuit shown in FIGS. 27 to 30B, in the processing unit peij which constructs the parallel processing logic circuit, since a plurality of intermediate execution results can be stored using a plurality of storage circuits, the executable function can be extended. A product-of-sum logic of the plurality of storage data is easily implemented with a serial execution of the above-mentioned AND and OR function of the local storage data. Furthermore, the logic gate in the processing unit is shared between the cases of executing the 5-input AND or the 5-input OR. Therefore, the size of the processing unit can be reduced and the load capacitance at the input of a neighboring processing unit can be reduced. Hence, the processing unit can have low power consumption and high operation speed.

The same reference numerals as in FIGS. 5 to 9B and FIGS. 15 to 18B denote the same or corresponding parts in FIGS. 27 to 30B.

Ninth Embodiment

In the ninth embodiment of the present invention, a processing unit pe can receive binary data output from a sensor se in each pixel 10 of a pixel array 1 shown in FIG. 1. In addition, a logic function of the local two storage data can be performed in the processing unit.

Figure 31:
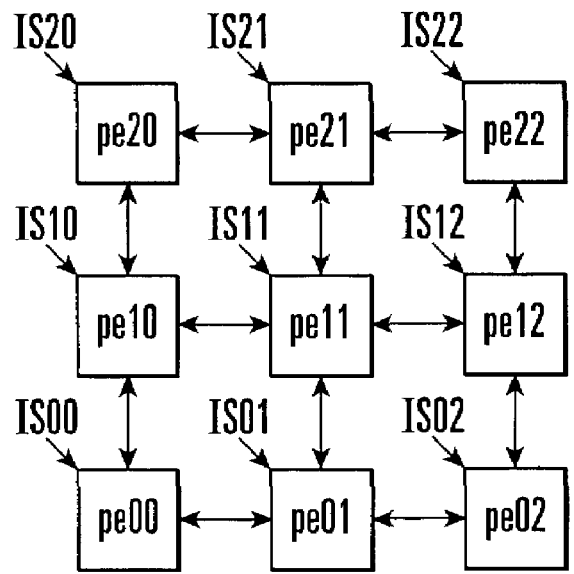
FIG. 31 is a block diagram showing the overall arrangement of a parallel processing logic circuit according to the ninth embodiment.

FIG. 31 shows the overall arrangement of a parallel processing logic circuit according to the ninth embodiment. For the descriptive convenience, this parallel processing logic circuit consists of nine processing units peij (i, j=0, 1, 2) laid out in a matrix. Interconnections are formed between neighboring processing units to transfer data. As in the parallel processing logic circuit shown in FIG. 2, the number of processing units peij and connection relationship between them are not limited to those shown in FIG. 31.

Each processing unit peij has an external data input terminal. This external data input terminal is connected to the output terminal of a sensor seij in the same pixel 10 as that for the processing unit peij. Hence, an output signal ISij (i, j=0, 1, 2) from the sensor seij is delivered to the processing unit peij from the external data input terminal.

Figure 32:
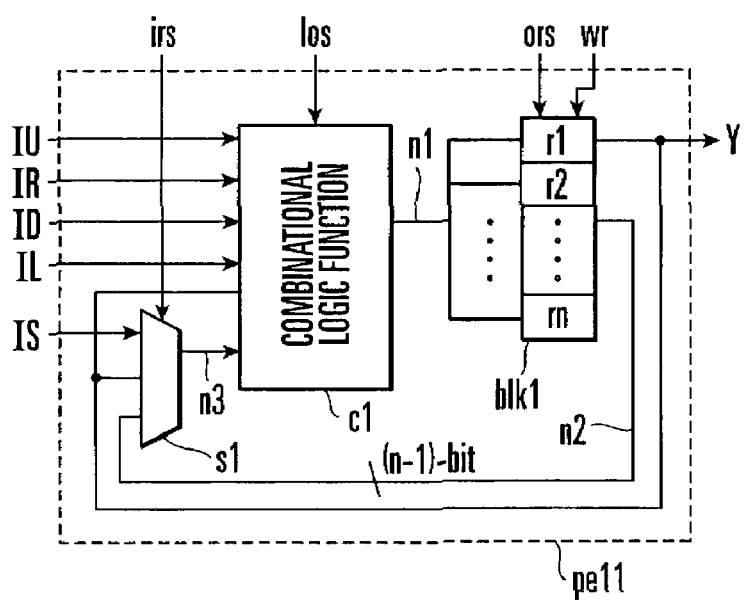
FIG. 32 is a block diagram showing the configuration of a processing unit pe11 shown in FIG. 31.

FIG. 32 shows the configuration of a processing unit pe11 shown in FIG. 31. The processing unit pe11 consists of a combinational logic function c1, a selector s1 serving as the second selection circuit, and a circuit block blk1 made of storage circuits and selectors.

The configuration and operation of the circuit block blk1 are the same as in FIG. 12. That is, the circuit block blk1 consists of D-flip-flops dff1 to dffn which construct n storage circuits, and selectors sd1 to sdn which construct the first selection circuit. Only a D-flip-flop selected by a control signal ors receives an execution result n1 from the combinational logic function c1. The remaining D-flip-flops store again current data.

As shown in FIG. 32, the output signal from one storage circuit r1 in the circuit block blk1 is delivered to four neighboring processing units pe01, pe10, pe12, and pe21 as a signal Y.

This signal Y, output signals n2 (illustrated as a multi-bit signal) from (n−1) storage circuits r2 to rn in the circuit block blk1, and an output signal IS11 from a sensor se11 are connected to the inputs of the selector s1. Only a signal selected by a control signal irs is input to the combinational logic function c1 as a signal n3. Input signals ID, IL, IR, and IU from the four neighboring processing units pe01, pe10, pe12, and pe21 and the output signal Y from the processing unit are input to the combinational logic function c1.

Figure 33:
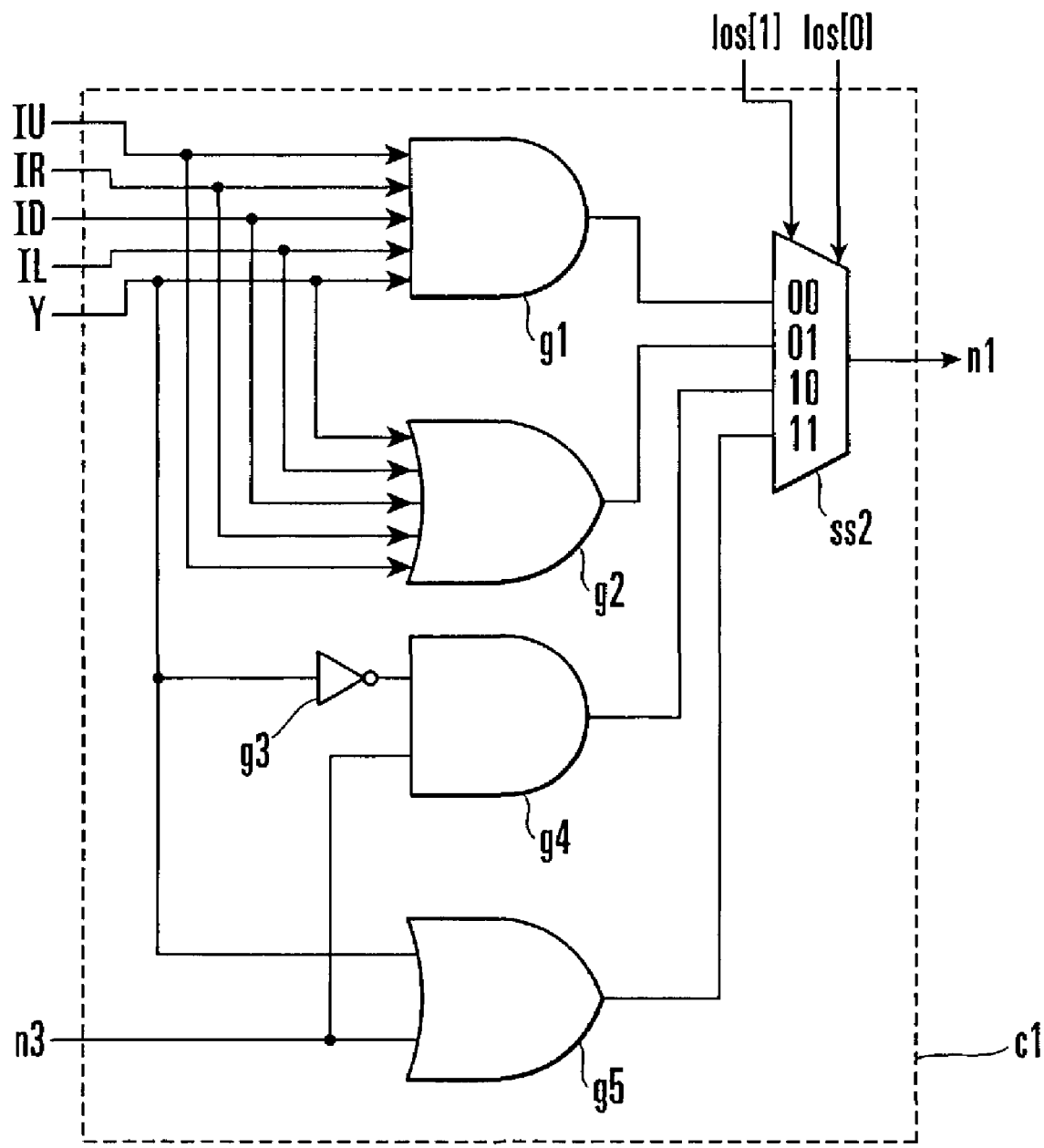
FIG. 33 is a circuit diagram of a combinational logic function in the processing unit pe11 shown in FIG. 32.

FIG. 33 shows the combinational logic function c1 in the processing unit pe11 shown in FIG. 32. The configuration and operation of the combinational logic function c1 are the same as in FIG. 25. However, the signal n3 is given as a signal selected among the signal Y, the signal n2, and the output signal IS11 from the sensor se11.

As shown in FIG. 32, the execution result of the combinational logic function c1 is output to the circuit block blk1, and the data are stored in one or a plurality of the n storage circuits r1 to rn in the block blk1, which are selected by the control signal ors.

Figure 34A:
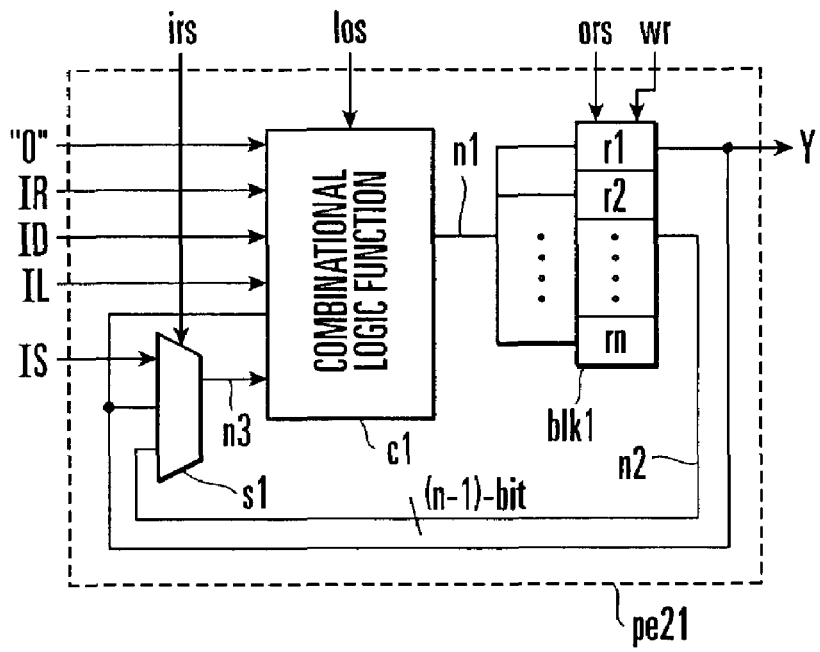
FIG. 34A is a block diagram showing the configuration of a processing unit pe21 at a matrix edge.
Figure 34B:
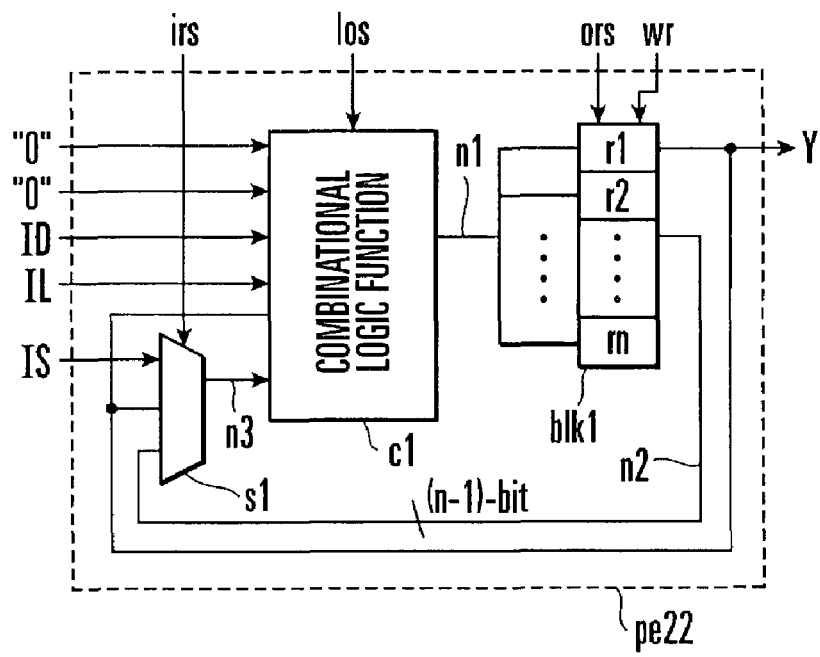
FIG. 34B is a block diagram showing the configuration of a processing unit pe22 at a matrix corner.

FIGS. 34A and 34B show the arrangements of processing units pe21 and pe22 at a matrix edge and a corner shown in FIG. 31. In the processing units pe21 and pe22, logic value "0" is given as an input signal from a disconnected side of a neighboring processing unit. This also applies to the remaining processing units at other matrix edge and corners.

The parallel processing logic circuit shown in FIGS. 31 to 34B can obtain the following advantage in addition to the advantage of the parallel processing logic circuit shown in FIGS. 2 to 4. That is, in each pixel 10 of the pixel array 1, the output signal ISij from the sensors seij is received in parallel by the combinational logic function c1 of the processing unit peij. In addition, the received signal ISij can be directly processed on the pixel array 1. For these reasons, high-speed image processing can be obtained. Additionally, in each processing unit peij, a plurality of intermediate execution results can be stored in a plurality of storage circuits. Hence, the executable function can be extended. A product-of-sum logic of the plurality of storage data is easily implemented with a serial execution of the new AND and OR logic functions. Therefore, the image processing executed in the parallel logic circuit can be further extended.

The same reference numerals as in FIGS. 10 to 14B, FIGS. 19 to 20C, and FIGS. 23 to 26B denote the same or corresponding parts in FIGS. 31 to 34B.

10th Embodiment

In the 10th embodiment of the present invention, a processing unit pe can receive binary data output from a sensor se in each pixel 10 of a pixel array 1 shown in FIG. 1. In addition, a logic function of the local two storage data can be performed in the processing unit.

Figure 35:
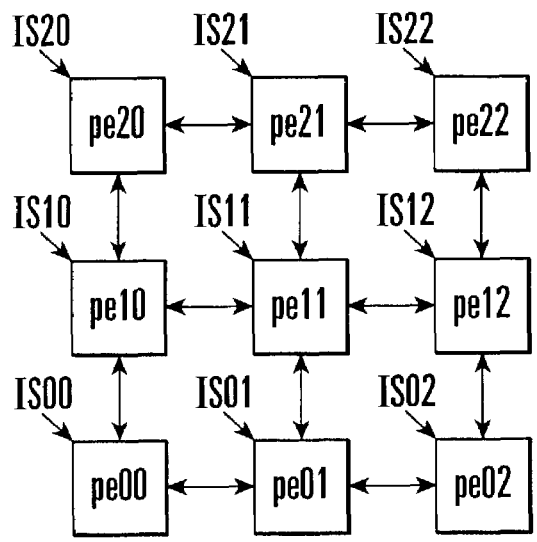
FIG. 35 is a block diagram showing the overall arrangement of a parallel processing logic circuit according to the 10th embodiment.

FIG. 35 shows the overall arrangement of a parallel processing logic circuit according to the 10th embodiment. For the descriptive convenience, this parallel processing logic circuit consists of nine processing units peij (i, j=0, 1, 2) laid out in a matrix. Interconnections are formed between neighboring processing units to transfer data. As in the parallel processing logic circuit shown in FIG. 2, the number of processing units peij and connection relationship between them are not limited to those shown in FIG. 35.

Each processing unit peij has an external data input terminal. This external data input terminal is connected to the output terminal of a sensor seij in the same pixel 10 as that for the processing unit peij. Hence, an output signal ISij (i, j=0, 1, 2) from the sensor seij is delivered to the processing unit peij from the external data input terminal.

Figure 36:
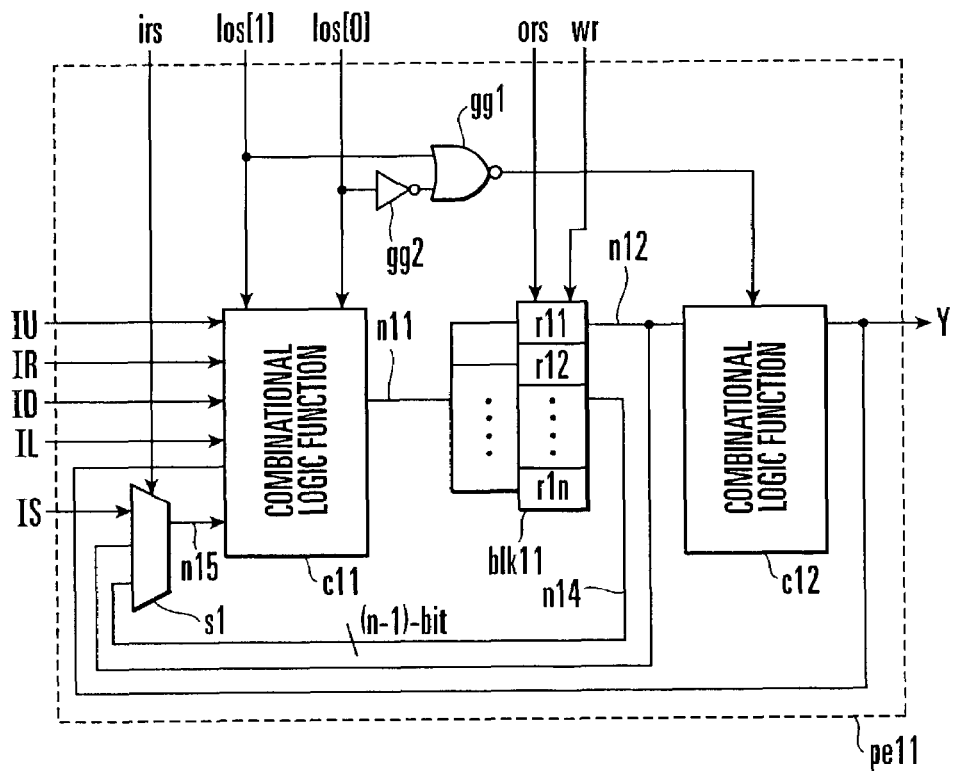
FIG. 36 is a block diagram showing the configuration of a processing unit pe11 shown in FIG. 35.

FIG. 36 shows the configuration of a processing unit pe11 shown in FIG. 35. The processing unit pe11 consists of combinational logic functions c11 and c12, a selector s1 serving as the second selection circuit, a circuit block blk11 made of storage circuits and selectors, a NOR gate gg1, and an inverter gg2.

The configuration and operation of the circuit block blk1 are the same as in FIG. 12. That is, the circuit block blk11 consists of D-flip-flops dff1 to dffn which construct n storage circuits, and selectors sd1 to sdn which construct the first selection circuit. Only a D-flip-flop selected by a control signal ors receives an execution result n11 from the combinational logic function c11. The remaining D-flip-flops store again current data.

As shown in FIG. 36, an output signal n12 from one storage circuit r11 in the circuit block blk11 is processed into a signal Y by the combinational logic function c12 and delivered to four neighboring processing units pe01, pe10, pe12, and pe21.

The output signal n12 from the storage circuit r11, the output signal n14 (illustrated as a multi-bit signal) from (n−1) storage circuits r12 to r1n in the circuit block blk11, and an output signal IS11 from a sensor se11 are connected to the inputs of the selector s1. Only a signal selected by a control signal irs is input to the combinational logic function c11 as a signal n15. Input signals ID, IL, IR, and IU from the four neighboring processing units pe01, pe10, pe12, and pe21 and the output signal Y from the processing unit pe11 are input to the combinational logic function c11.

Figure 37:
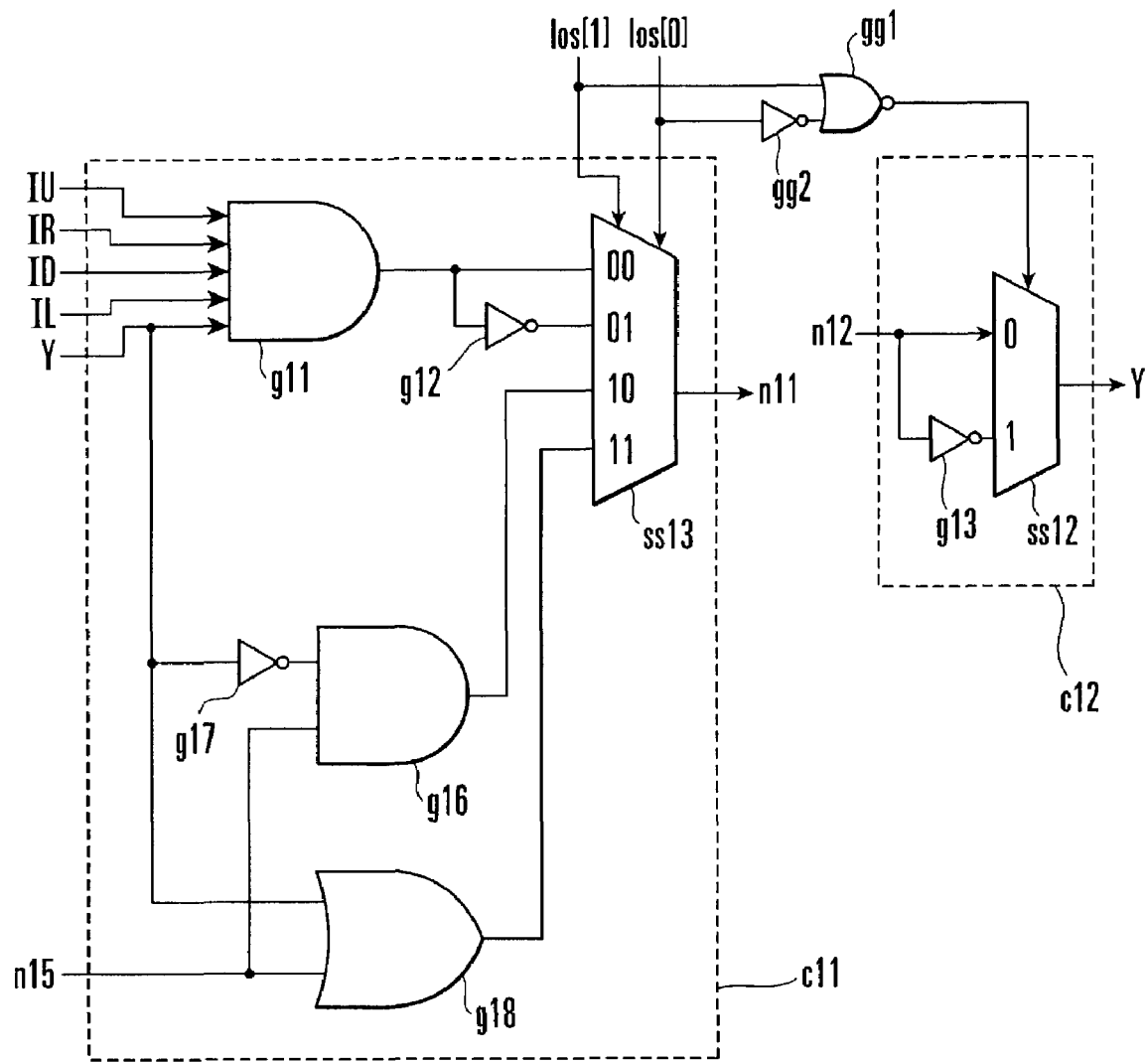
FIG. 37 is a circuit diagram of combinational logic functions in the processing unit pe11 shown in FIG. 36.

FIG. 37 shows the combinational logic functions c11 and c12 in the processing unit pe11 shown in FIG. 36. The configurations and operations of the combinational logic functions c11 and c12 are the same as in FIG. 29. However, the signal n15 is given as a signal selected among the output signal n12 from the storage circuit r11, the output signal n14 (a plurality of bits) from the storage circuits r12 to r1n, and the output signal IS11 from the sensor se11.

As shown in FIG. 36, the operation result n11 of the combinational logic function c11 is output to the circuit block blk11, and the data are stored in one or a plurality of storage circuits in the n storage circuits r11 or r1n, which are selected by the control signal ors.

Figure 38A:
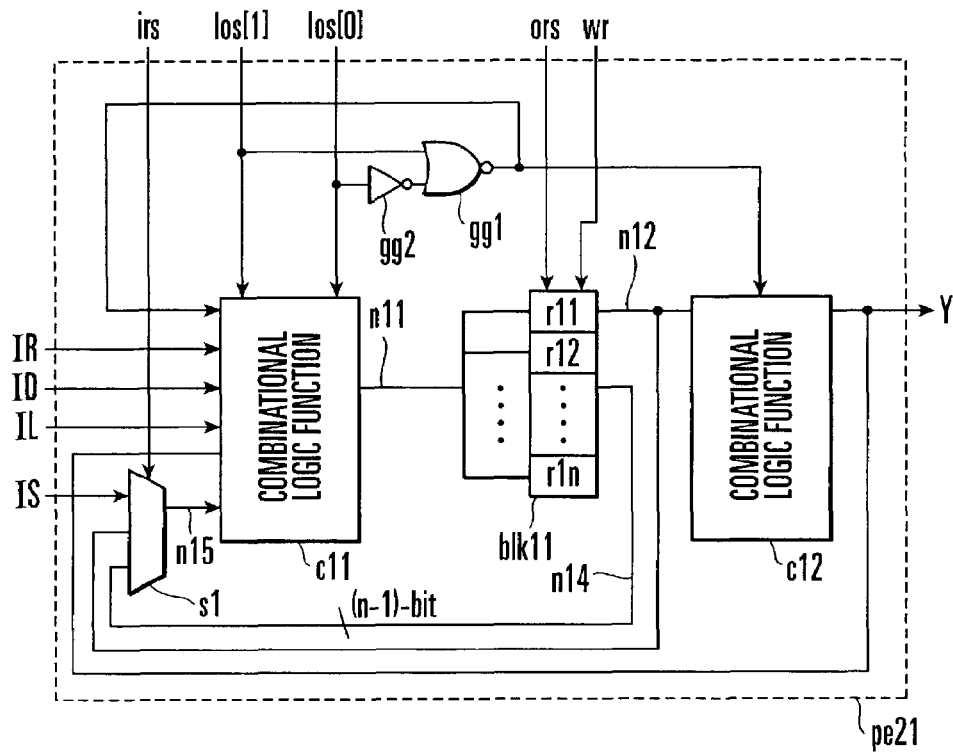
FIG. 38A is a block diagram showing the configuration of a processing unit pe21 at a matrix edge.
Figure 38B:
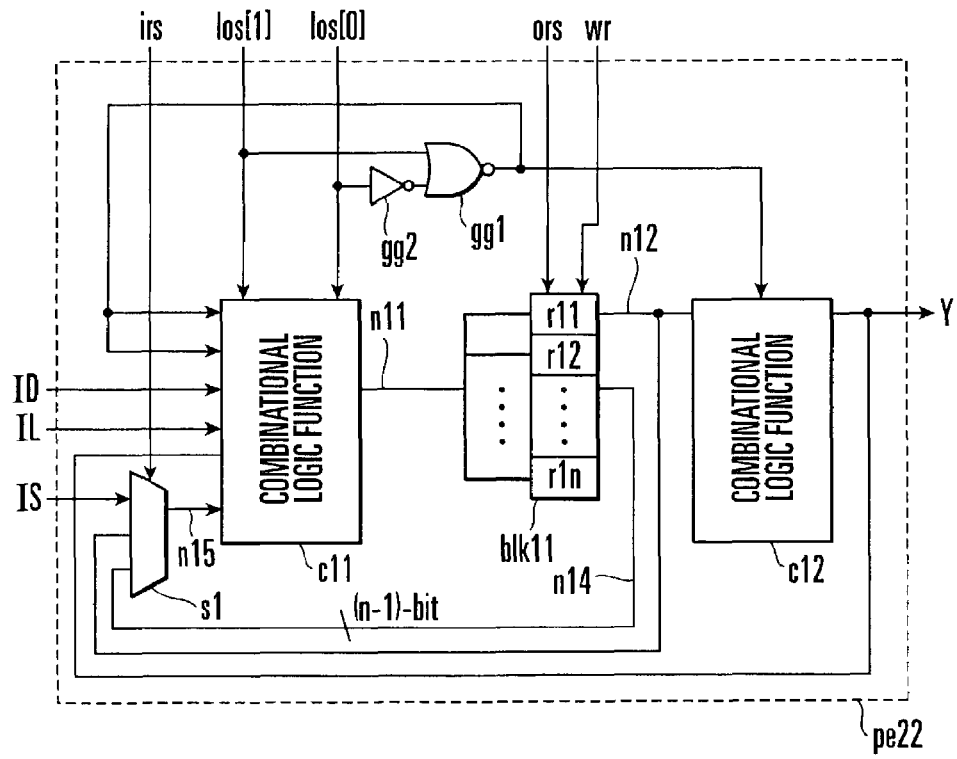
FIG. 38B is a block diagram showing the configuration of a processing unit pe22 at a matrix corner.

As shown in FIGS. 38A and 38B, in the processing units pe21 and pe22 at a matrix edge and a corner shown in FIG. 35, a signal obtained by decoding the control signal los[1] and los[0] with the logic gates gg1 and gg2 is given as the input signal from a disconnected side of a neighboring processing unit. Hence, the input signal from a disconnected side of a neighboring processing unit can always be logic value "0". This also applies to the remaining processing units at other matrix edge and corner.

According to the parallel processing logic circuit shown in FIGS. 35 to 38B, in each pixel 10 of the pixel array 1, the output signal ISij from the sensors seij is received in parallel by the combinational logic function c11 of the processing unit peij. In addition, the received signal ISij can be directly processed on the pixel array 1. For these reasons, high-speed image processing can be obtained. Additionally, in each processing unit peij, a plurality of intermediate execution results can be stored using a plurality of storage circuits. Hence, the executable function can be extended. A product-of-sum logic of the plurality of storage data is easily implemented with a serial execution of the above-mentioned AND and OR function of the local storage data. Furthermore, the logic gate in the processing unit is shared between the cases of executing the 5-input AND or the 5-input OR. Therefore, the size of the processing unit can be reduced and the load capacitance at the input of a neighboring processing unit can be reduced. Hence, the processing unit can have low power consumption and high operation speed.

The same reference numerals as in FIGS. 15 to 18B and FIGS. 27 to 30B denote the same or corresponding parts in FIGS. 35 to 38B.

11th Embodiment

In the 11th embodiment of the present invention, in the parallel processing logic circuit shown in FIGS. 23 to 26B or FIGS. 31 to 34B, the function of a combinational logic function c1 in a processing unit peij (i, j=0, 1, 2) is changed to the logic function in which the executable function can be modified by the logic modification signals commonly distributed to the processing units peij.

Figure 39:
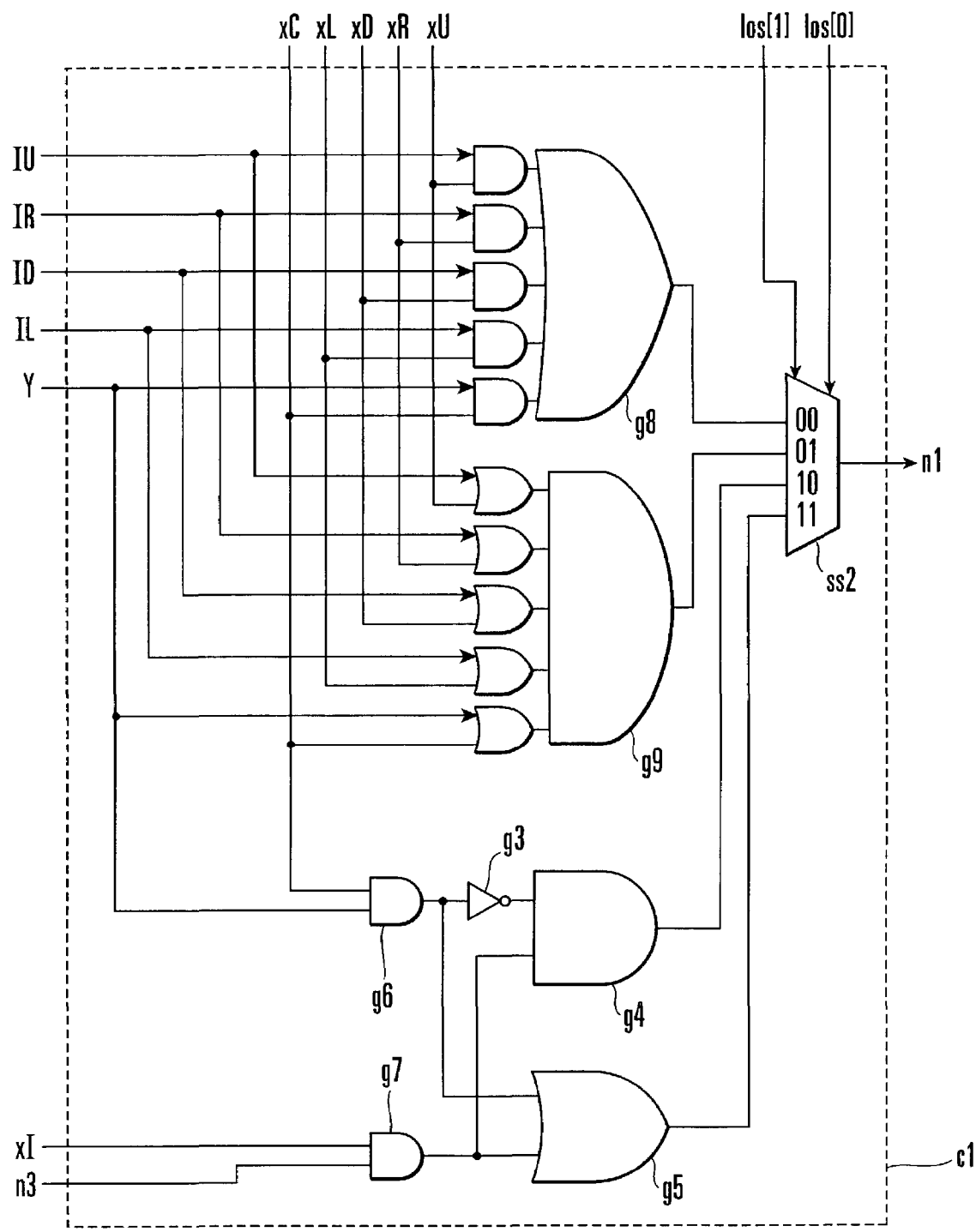
FIG. 39 is a circuit diagram of a combinational logic function in a processing unit which constructs a parallel processing logic circuit according to the 11th embodiment.

FIG. 39 shows a combinational logic function in a processing unit pe11 according to the 11th embodiment. The combinational logic function c1 consists of a 10-input AND-OR gate g8, 10-input OR-AND gate g9, 2-input AND gates g4, g6, and g7, 2-input OR gate g5, inverter g3, and a selector ss2.

In addition to input signals ID, IL, IR, and IU delivered from four neighboring processing units pe01, pe10, pe12 and pe21 and an output signal Y from the processing unit pe11 itself, logic modification signals xD, xL, xR, xU, and xC are commonly input to the 10-input AND-OR gate g8 and 10-input OR-AND gate g9. The signal Y and logic modification signal xC are input to the 2-input AND gate g6. A signal n3 from a selector s1 and a logic modification signal xI are input to the 2-input AND gate g7. The output signal of the 2-input AND gate is input to the inverter g3. The output signal of the 2-input AND gate g7 and the output signal of the inverter g3 are input to the 2-input AND gate g4. The output signal of the 2-input AND gate g7 and the output signal of the 2-input AND gate g6 are input to the 2-input OR gate g5. The output signals from the logic gates g8, g9, g4, and g5 are input to the selector ss2. By a control signal los[1] and los[0] commonly distributed from a controller 2 shown in FIG. 1A to the processing units peij, one of the output signals from the logic gates g8, g9, g4, and g5 is selected and output to a circuit block blk1 as an execution result n1 of the combinational logic function c1.

Table 5 shows the logic equations executed in the combinational logic function c1 and the corresponding values of the control signal los[1-0].

TABLE 5

| los[1-0] | Logic Function c1 |
| --- | --- |
| 00 | n1 = xU * IU + xR * IR + xD * ID + xL * IL + xC * Y |
| 01 | n1 = (xU + IU) * (xR + IR) * (xD + ID) * (xL + IL) * (xC + Y) |
| 10 | n1 = $\overline{xC * Y}$ * xI * n3 |
| 11 | n1 = xC * Y + xI * n3 |

The 10-input AND-OR gate g8 and 10-input OR-AND gate g9 can individually validate or invalidate the input signals ID, IL, IR, IU, and Y to the combinational logic function c1 in accordance with the logic modification signals xD, xL, xR, xU, and xC. In addition, the 2-input AND gate g7 can validate or invalidate the signal n3 to the logic gates g4 and g5 in accordance with the logic modification signal xI.

12th Embodiment

In the 12th embodiment of the present invention, in the parallel processing logic circuit shown in FIGS. 27 to 30B or FIGS. 35 to 38B, a combinational logic function c11 in a processing unit peij (i, j=0, 1, 2) is changed to the logic function in which the executable function can be modified by he logic modification signals commonly distributed to the processing units peij.

Figure 40:
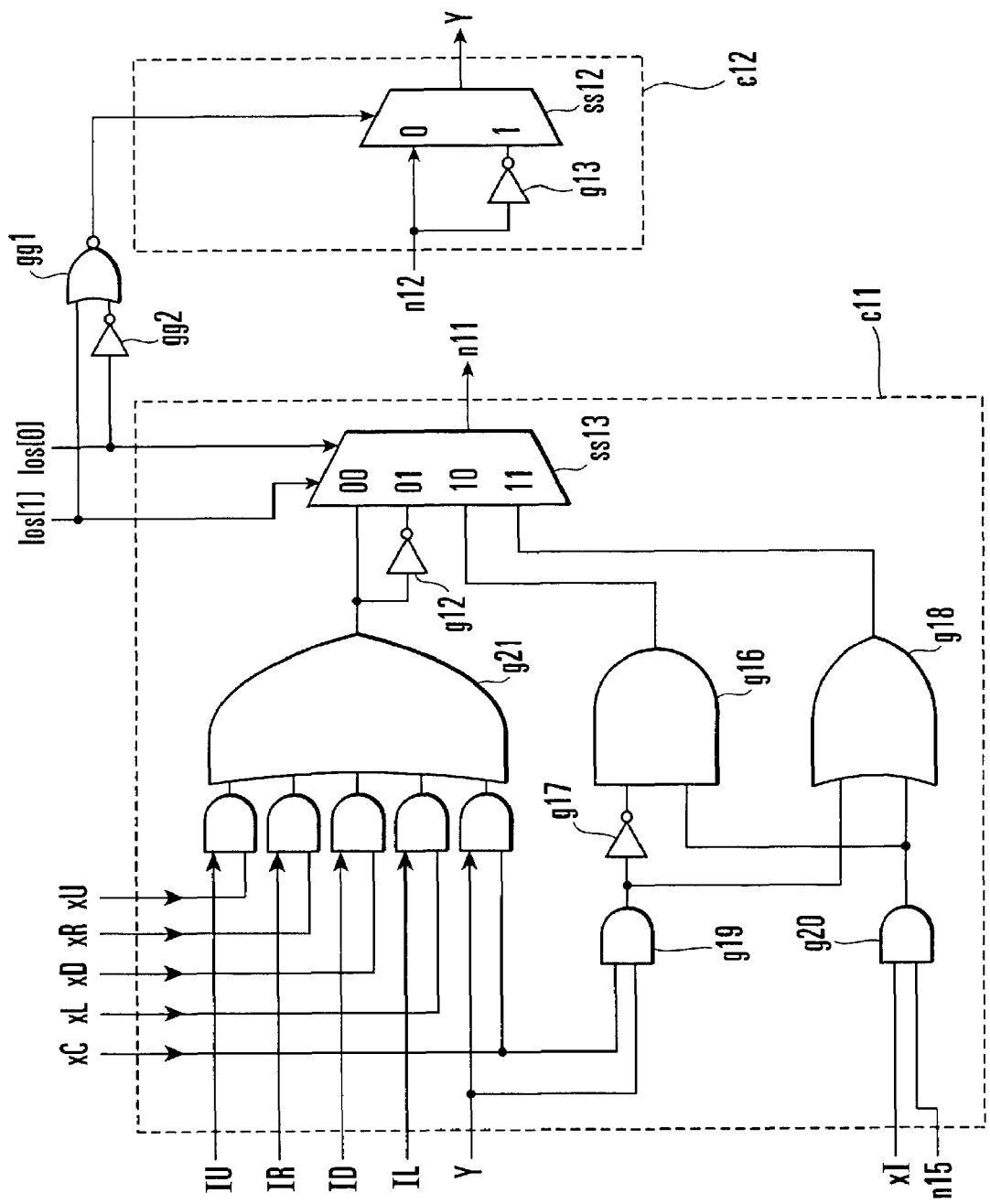
FIG. 40 is a circuit diagram of a combinational logic function in a processing unit which constructs a parallel processing logic circuit according to the 12th embodiment.

FIG. 40 shows a combinational logic function in a processing unit pe11 according to the 12th embodiment. The combinational logic function c11 consists of a 10-input AND-OR gate g21, 2-input AND gates g16, g19, and g20, 2-input OR gate g18, inverters g12 and g17, and a selector ss13. A combinational logic function c12 is made of an inverter g13 and a selector ss12.

In addition to input signals ID, IL, IR, and IU delivered from four neighboring processing units pe01, pe10, pe12 and pe21 and an output signal Y from the processing unit pe11 itself, logic modification signals xD, xL, xR, xU, and xC are input to the 10-input AND-OR gate g21. The signal Y and logic modification signal xC are input to the 2-input AND gate g19. A signal n15 from a selector s1 and a logic modification signal xI are input to the 2-input AND gate g20. The output signal of the 2-input AND gate is input to the inverter g17. The output signal of the 2-input AND gate g20 and the output signal of the inverter g17 are input to the 2-input AND gate g16. The output signal of the 2-input AND gate g20 and the output signal of the 2-input AND gate g19 are input to the 2-input OR gate g18. The output signals of the logic gates g21, g16, and g18 and the output from the 10-input AND-OR gate g21, and the inverse by the inverter g12 are all input to the selector ss13. The selector ss13 is controlled by a control signal los[1] and los[0], and outputs a signal selected from the input signals as an operation result n11 of the combinational logic function c11.

Table 6 shows the logic equations executed in the combinational logic functions c11 and c12, and the corresponding values of the control signal los[1-0].

TABLE 6

| los[1-0] | Logic Function c11 | Logic Function c12 |
|---|---|---|
| 00 | n11 = xU * IU + xR * IR + xD * ID + xL * IL + xC * Y | Y = n12 |
| 01 | n11 = xU * IU + xR * IR + xD * ID + xL * IL + xC * Y | Y = $\overline{n12}$ |
| 10 | n11 = $\overline{xC*Y}$ * xI * n15 | Y = n12 |
| 11 | n11 = xC * Y + xI * n15 | Y = n12 |

The 10-input AND-OR gate g21 can individually validate or invalidate the input signals ID, IL, IR, IU, and Y to the combinational logic function c11 in accordance with the logic modification signals xD, xL, xR, xU, and xC. In addition, the 2-input AND gate g20 can validate or invalidate the signal n15 to the logic gates g16 and g18 in accordance with the logic modification signal xI.

13th Embodiment

In the 13th embodiment of the present invention, control signals are delivered commonly to the processing units located in the same row or column. The control signals are used to specify some of the processing units in the matrix like address signals in a memory.

FIG. 41 shows the overall arrangement of a parallel processing logic circuit according to the 13th embodiment. For the descriptive convenience, this parallel processing logic circuit consists of nine processing units peij (i, j=0, 1, 2) laid out in a matrix. Interconnections are formed between neighboring processing units to transfer data. A first control signal line EXj is commonly connected to each column of the nine processing units peij. A second control signal line EYi is commonly connected to each row of the nine processing units peij. A control signal exj for specifying a processing unit of each column is supplied to each first control signal line EXj by a controller 2 shown in FIG. 1. A control signal eyi for specifying a processing unit of each row is supplied to each second control signal line EYi.

FIG. 42 shows the configuration of a processing unit pe11 shown in FIG. 41. In addition to a combinational logic function c1, a selector s1, and circuit block blk1, the processing unit pe11 has a 3-input AND gate gg3. The controller 2 delivers a write signal wr and control signals ex1 and ey1 to the AND gate gg3. The output signal from the AND gate gg3 is delivered as a write signal to storage circuits r1 to rn which is contained in the circuit block blk1. Hence, only when (ex1,ey1)=(1,1), the contents of the storage circuits r1 to rn can be updated by the write signal wr. Each processing unit other than the processing unit pe11 also has the 3-input AND gate gg3 such that updating the contents of the storage circuits r1 to rn in that processing unit can be controlled.

For example, when (ex0,ex1,ex2)=(0,1,0) and (ey0,ey1, ey2)=(0,1,0), only the central processing unit pe11 shown in FIG. 41 can update the contents of the storage circuits r1 to rn while the remaining processing units do not update the contents of the storage circuits.

According to the parallel processing logic circuit shown in FIGS. 41 and 42, logic operation can be invalidated or validated locally for the specific one of the processing units. With this configuration, the image processing operation function can be extended.

This embodiment can be applied not only to the parallel processing logic circuit shown in FIGS. 23 to 26 but also to all the above-described parallel processing logic circuits.

Next, modifications to the third embodiment in which a plurality of storage circuits can be used in a processing unit which constructs a parallel processing logic circuit will be described as the 14th to 17th embodiments of the present invention.

14th Embodiment

The overall arrangement of a parallel processing logic circuit according to the 14th embodiment of the present invention is the same as in FIG. 10, and a description thereof will be omitted. This also applies to the 15th to 17th embodiments to be described later.

Figure 43A:
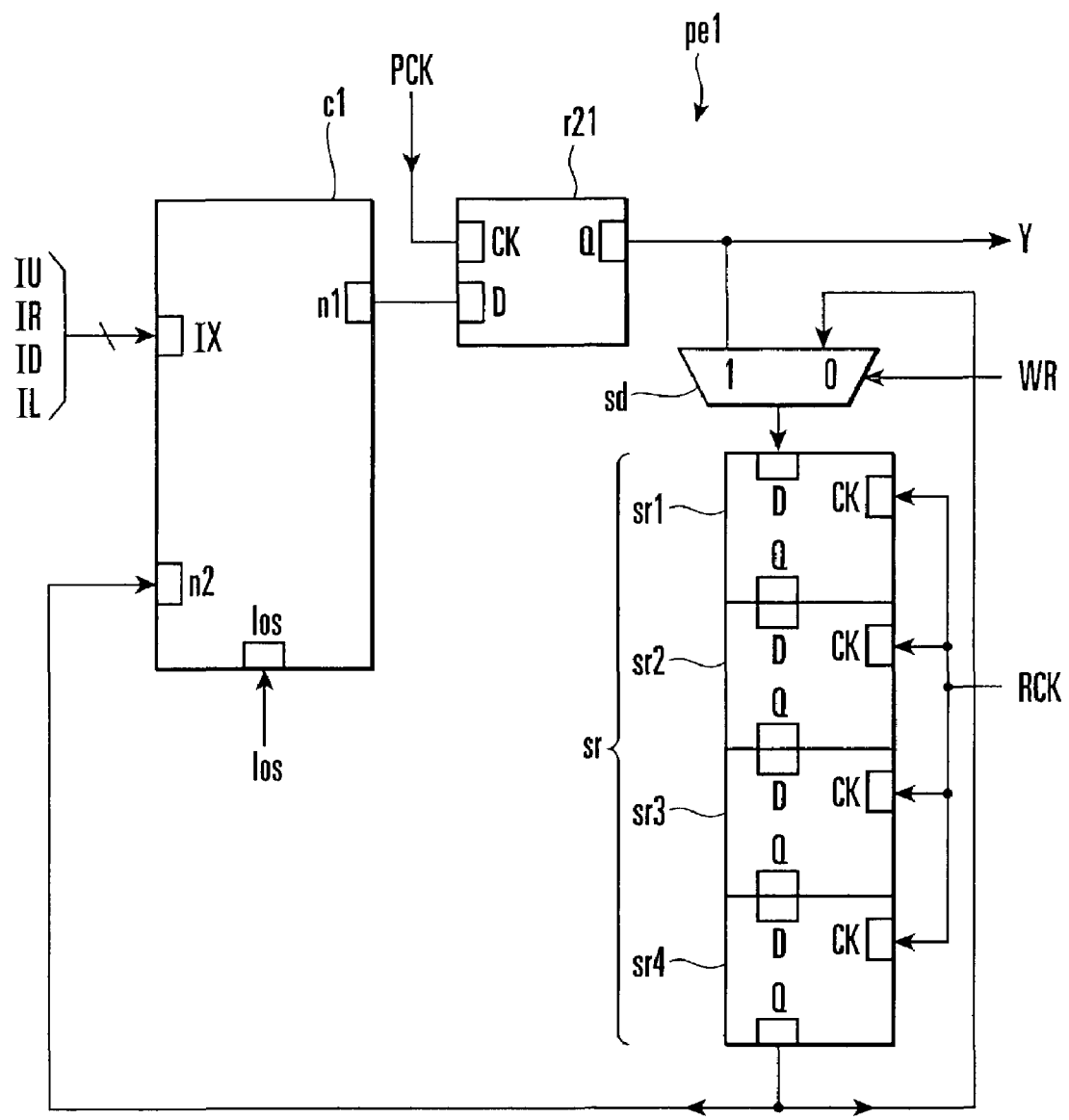
FIG. 43A is a block diagram showing the circuit configuration of a processing unit which constructs a parallel processing logic circuit according to the 14th embodiment.

FIG. 43A shows the configuration of a processing unit according to the 14th embodiment. The same reference numerals as in FIG. 11 denote the same or corresponding parts in FIG. 43A.

A processing unit pe1 consists of a combinational logic function c1 for executing logic operation, a 1-bit register r21 serving as a first register for storing a logic operation result, a 2-1 selector circuit sd serving as a third selection circuit, and 1-bit registers sr1 to sr4 which constitute a shift register sr. In the processing unit pe1 shown in FIG. 43A, the bit width of the register circuit is 1 bit, and the number of outputs are five. However, the present invention is not limited to this.

The combinational logic function c1 receives a multi-bit input signal IX (IU, IR, ID, IL) externally delivered from first input terminals and 1-bit binary data stored in the 1-bit register sr4 and executes logic operation. An output n1 is delivered to the 1-bit register r21 and stored therein. The type of logic operation to be executed is specified by a control signal los.

The 1-bit register r21 is an edge-triggered D-flip-flop. The 1-bit register r21 stores data at the positive edge of a first write signal PCK. The stored data is delivered to the neighboring processing units as an output signal Y.

The output terminals of the 1-bit register r21 and 1-bit register sr4 are connected to the input terminals of the 2-1 selector circuit sd. One of the inputs is selected by a selection signal WR and connected to the input terminal of the 1-bit register sr1.

The 1-bit registers sr1 to sr4 are edge-triggered D-flip-flops and constitute the shift register sr. The 1-bit registers sr1 to sr4 are sequentially cascade-connected in series. The output terminal of the 1-bit register sr4 is connected to one input terminal of the 2-1 selector circuit sd. The output terminal of the 1-bit register sr4 is also connected to an input n2 of the combinational logic function c1.

Figure 43B:
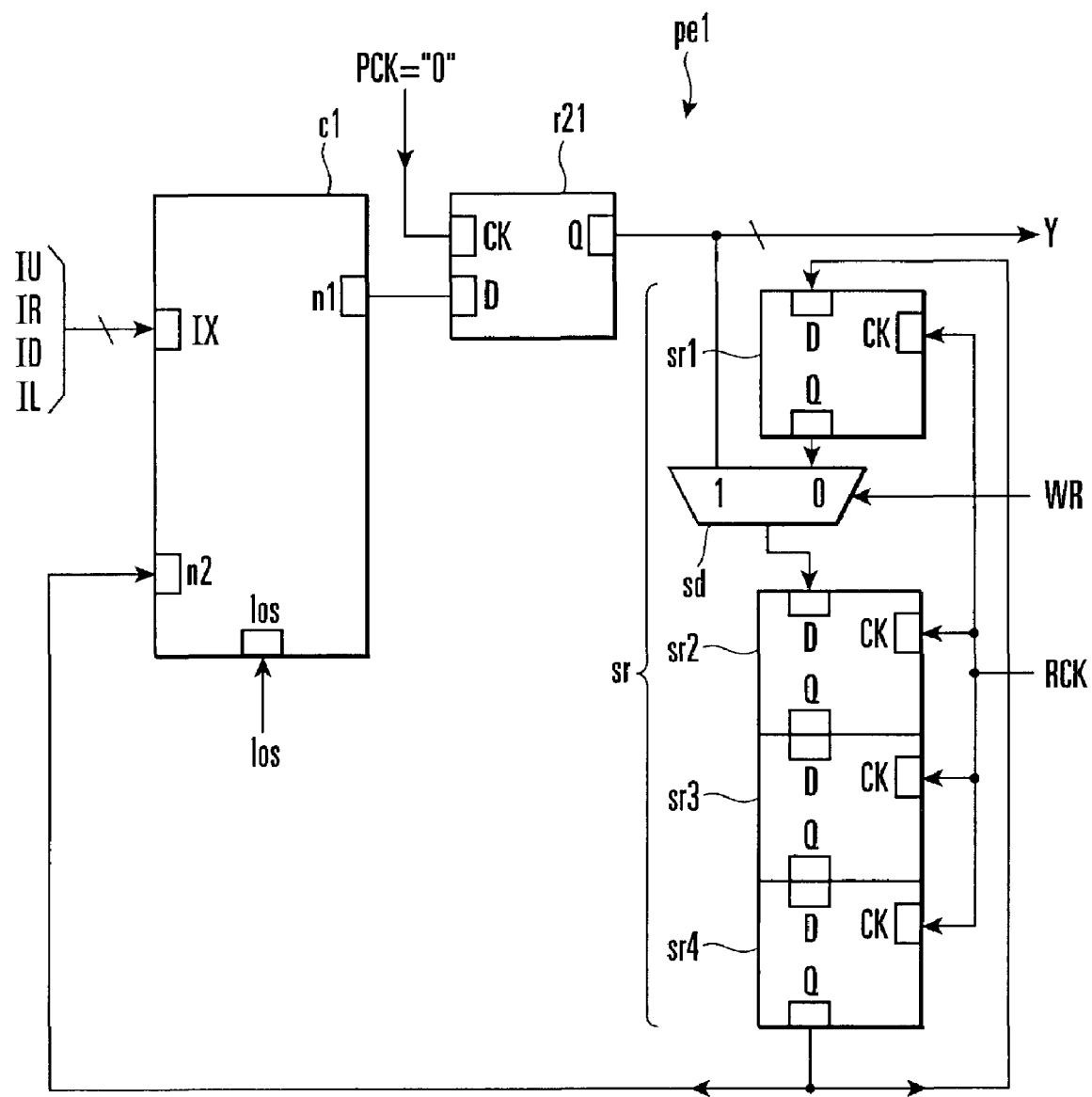
FIG. 43B is a block diagram showing a modification of the processing unit shown in FIG. 43A.

In the processing unit pe1 shown in FIG. 43A, the output of the 2-1 selector circuit sd is connected to the input terminal of the 1-bit register sr1. However, the 2-1 selector circuit sd may be connected to the input terminal of any one of the 1-bit registers sr1 to sr4 which construct the shift register sr. For example, as shown in FIG. 43B, the 2-1 selector circuit sd may be arranged between the 1-bit registers sr1 and sr2 in the loop of the shift register sr.

When the selection signal WR of the 2-1 selector circuit sd is "0", the shift register sr closes the loop of shift operation of the 1-bit registers sr1 to sr4. At the positive edge of a second write signal RCK, binary data stored in the 1-bit registers sr1 to sr4 are sequentially transferred. When the selection signal WR is "1", the loop is opened between the 1-bit register sr1 and the 1-bit register sr4. The data from the 1-bit register r21 is transferred to the 1-bit register sr1 at the positive edge of a second write signal RCK.

The basic operation sequence of the processing unit pe1 shown in FIG. 43A will be described next with reference to FIGS. 44A to 44D. Operation of executing logic function between the input signal IX and 1-bit binary data "d1" stored in the 1-bit register sr2 and overwriting the execution result "res0" on data "d0" stored in the 1-bit register sr1 will be described. The sequence can be roughly divided into three steps.

Figure 44A:
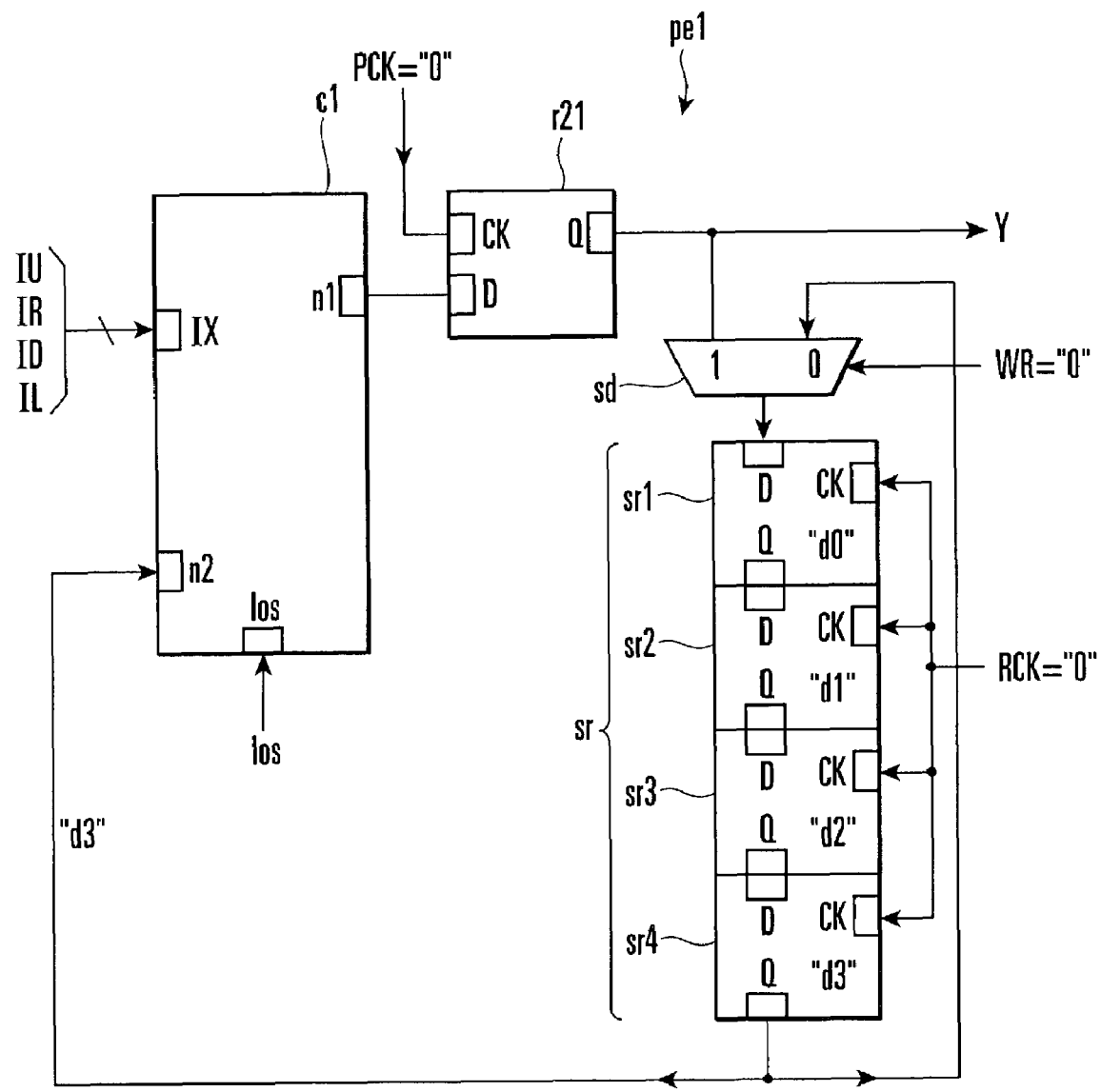
FIG. 44A is a block diagram for explaining the initial state of the processing unit shown in FIG. 43A.

FIG. 44A shows the initial state of the processing unit pe1. In the initial state, binary data "d0", "d1", "d2", and "d3" are stored in the 1-bit registers sr1 to sr4, respectively. Arbitrary data is stored in the 1-bit register r21.

Figure 44B:
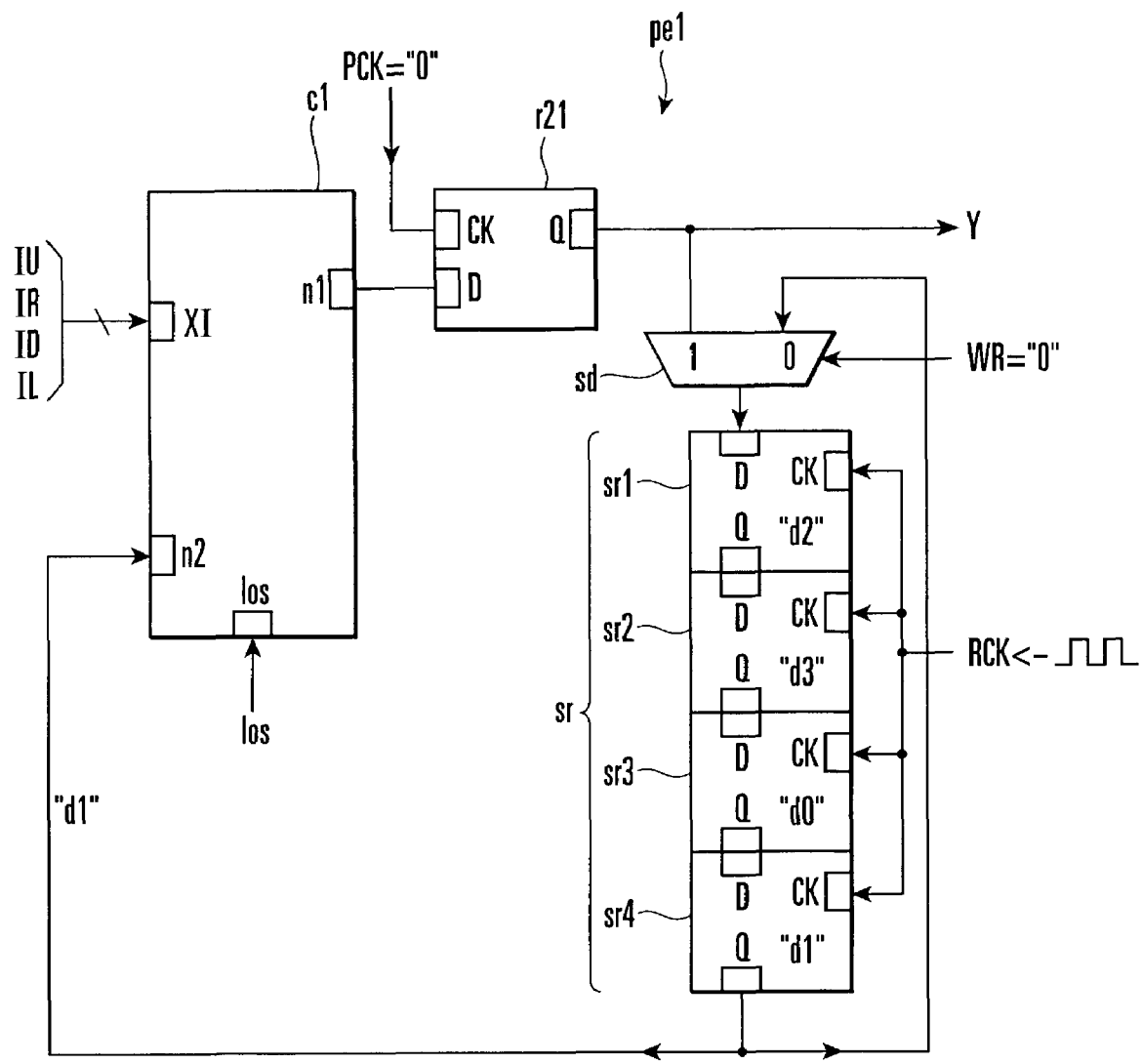
FIG. 44B is a block diagram for explaining specification of a read register as the first step.

FIG. 44B shows specification of a read register as the first step. Only the output terminal of the 1-bit register sr4 is connected to the input n2 of the combinational logic function c1. For this reason, the selection signal WR of the 2-1 selector circuit sd is set to "0", and a positive pulse is applied to the second write signal RCK continuously twice to shift "d1" stored in the 1-bit register sr2 to the 1-bit register sr4. In this way, the combinational logic function c1 reads out the 1-bit binary data "d1" initially stored in the 1-bit register sr2. FIG. 44B shows the data stored in the respective registers when the read operation is completed.

Figure 44C:
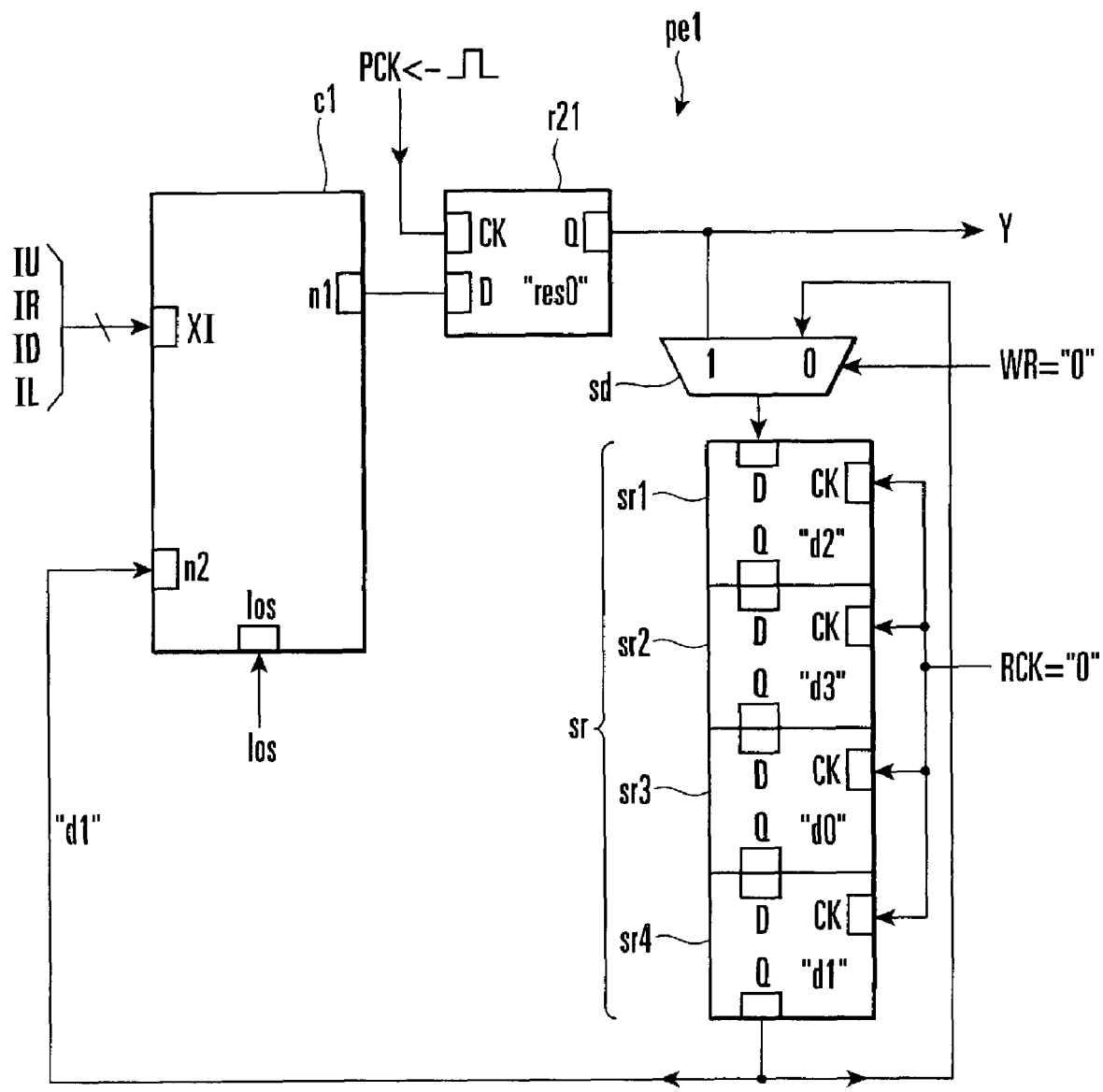
FIG. 44C is a block diagram for explaining execution of logic operation and storage of the execution result in a register as the second step.

FIG. 44C shows execution of logic function and storing the execution result in a register as the second step. In the state wherein the binary data "d1" is stored in the 1-bit register sr4, the control signal los is set to cause the combinational logic function c1 to execute predetermined logic operation, and a positive pulse is applied to the first write signal PCK. In this way, the operation result "res0" of the combinational logic function c1 is stored in the 1-bit register r21.

Figure 44D:
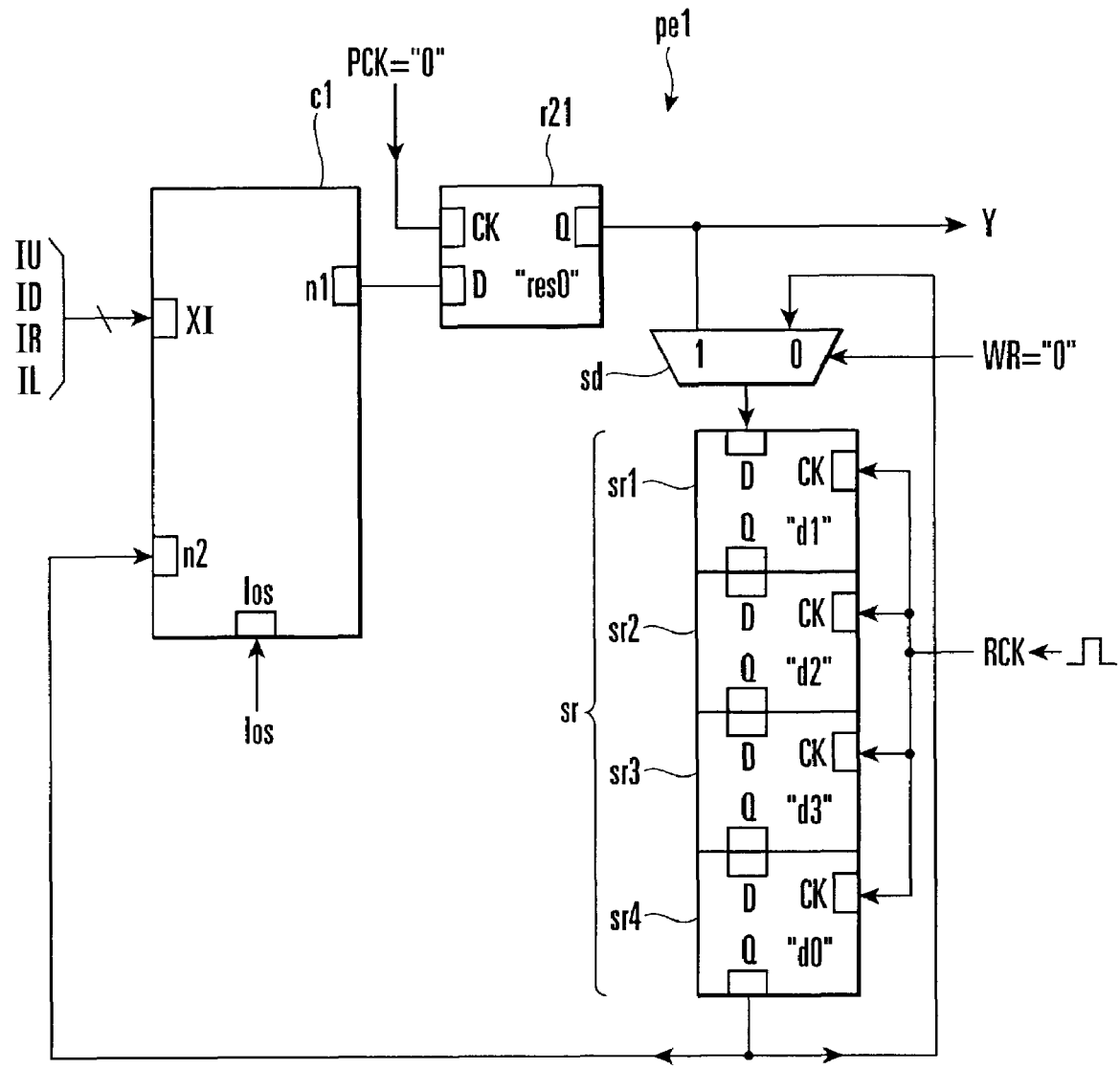
FIGS. 44D and 44E are block diagrams for explaining specification of a write register and storage of the execution result as the third step.
Figure 44E:
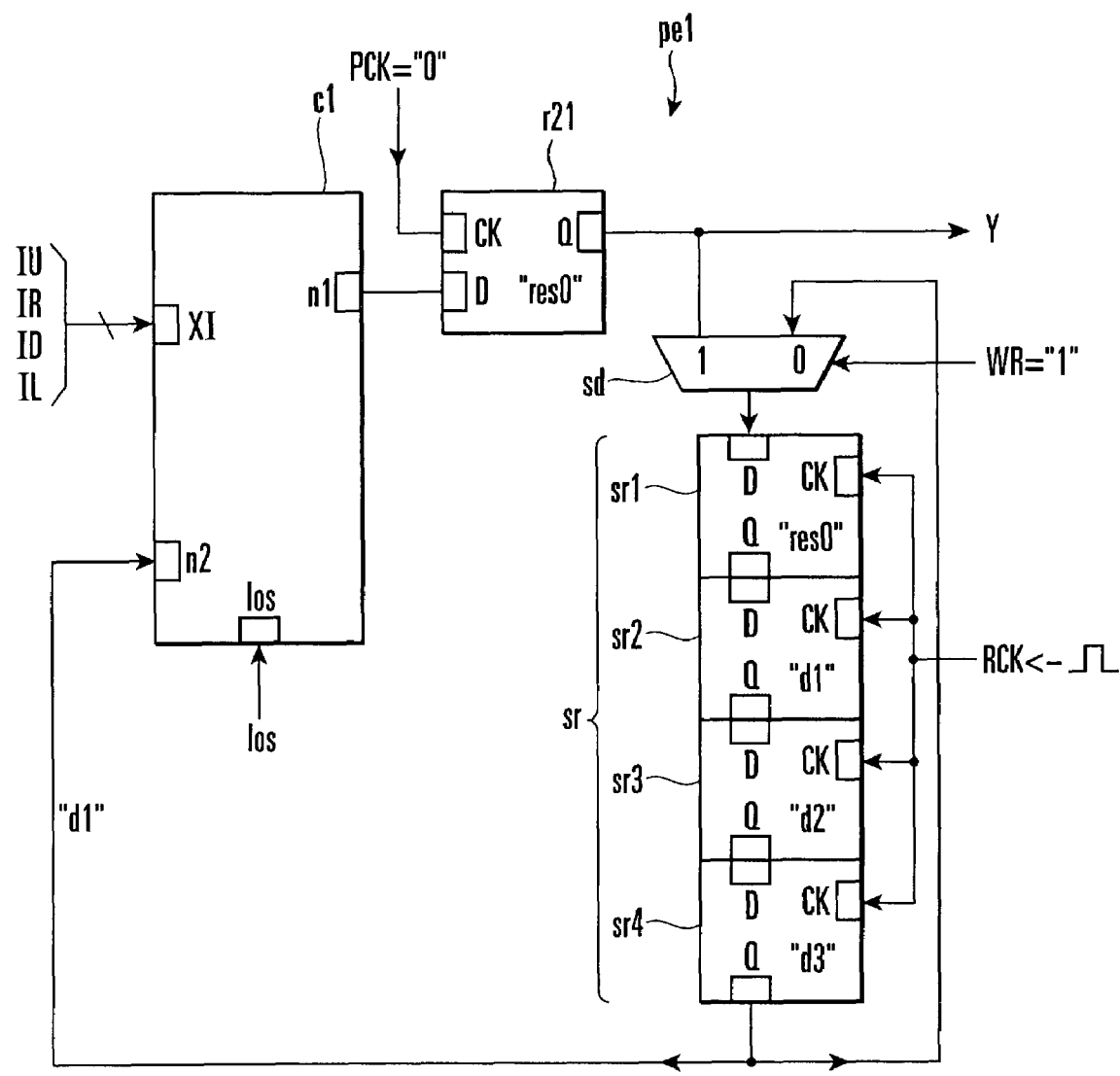

FIGS. 44D and 44E show how to store the execution result in a specified write register as the third step. The selection signal WR of the 2-1 selector circuit sd is set to "0", and a positive pulse is applied to the second write signal PCK once, thereby shifting the binary data "d0" to the 1-bit register sr4. FIG. 44D shows this shifted state. Subsequently, the selection signal WR is set to "1", and a positive pulse is applied to the second write signal RCK once. In this way, the execution result "res0" stored in the 1-bit register r21 is overwritten on the binary data "d0" and stored in the 1-bit register sr1. FIG. 44E shows the overwritten state.

Figure 45:
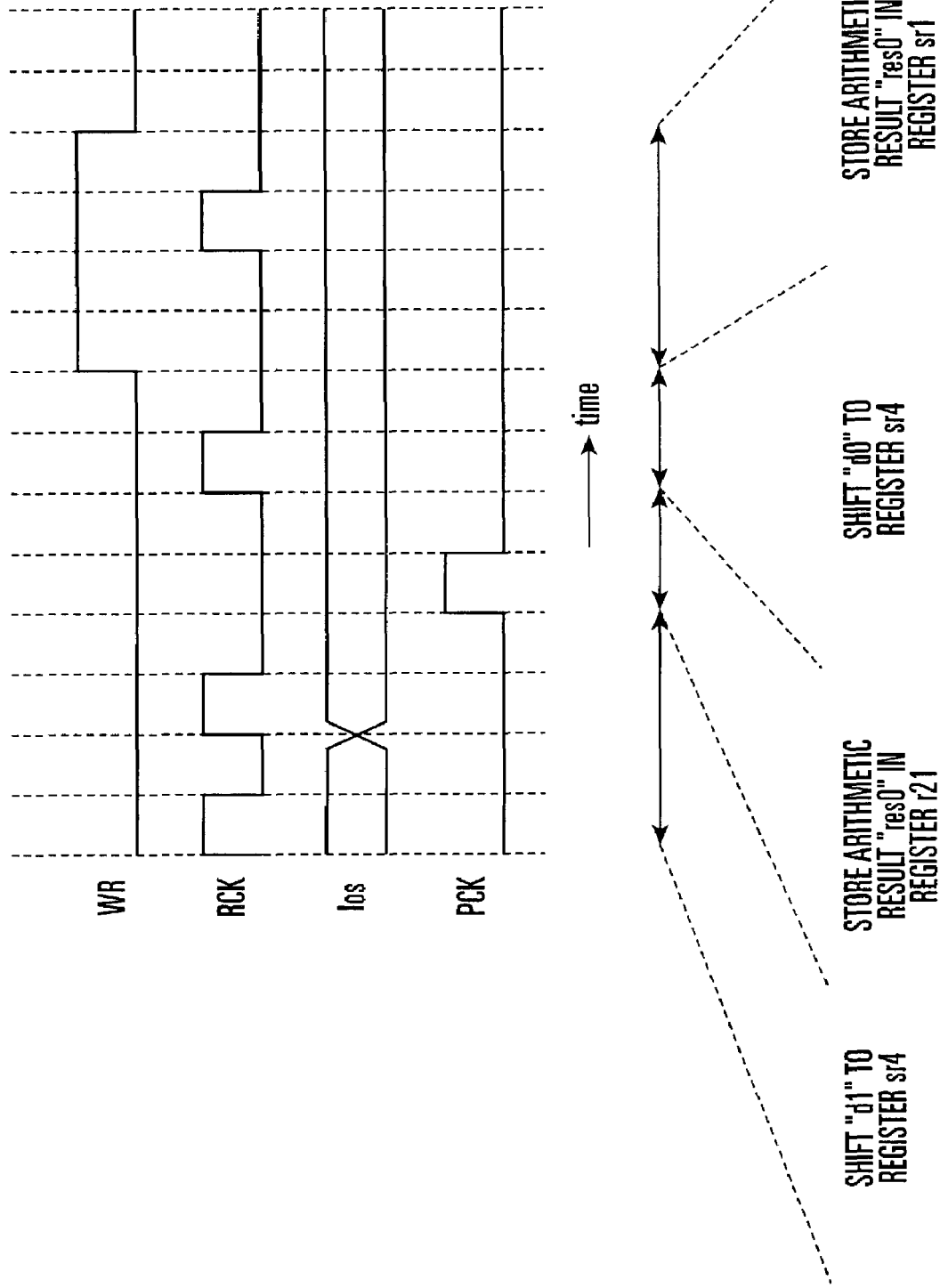
FIG. 45 is a timing chart showing the operation sequence of the processing unit shown in FIG. 43A.

FIG. 45 shows the operation sequence of the processing unit pe1 shown in FIG. 43A. As described above, the processing unit pe1 is controlled by four signals: the selection signal WR of the 2-1 selector circuit sd, the first write signal PCK, the control signal los for specifying logic function, and the second write signal RCK. Each time section divided by dotted lines indicates a half cycle of the operation cycle. In the first two cycles, a register having data for which logic function is to be executed is specified. In the next cycle, the execution result of logic function is stored in the 1-bit register r21. In the next cycle, binary data stored in a register in which the execution result should be overwritten is shifted onto a predetermined register. In the next two cycles, the execution result is overwritten on the binary data and stored in the specified register.

According to the processing unit pe1 shown in FIG. 43A, the shift register sr is comprised of the 1-bit registers sr1 to sr4. The combinational logic function c1 accesses the shift register sr through only a specific 1-bit register. However, since any register can be accessed by shifting the data stored in the target register to the specific 1-bit register, there is no need for read or write circuit to each 1-bit register. Hence, the scale of the circuit elements can be largely reduced. Hence, the resolution of the parallel processing circuit made of the processing units pe1 can be increased.

15th Embodiment

Figure 46:
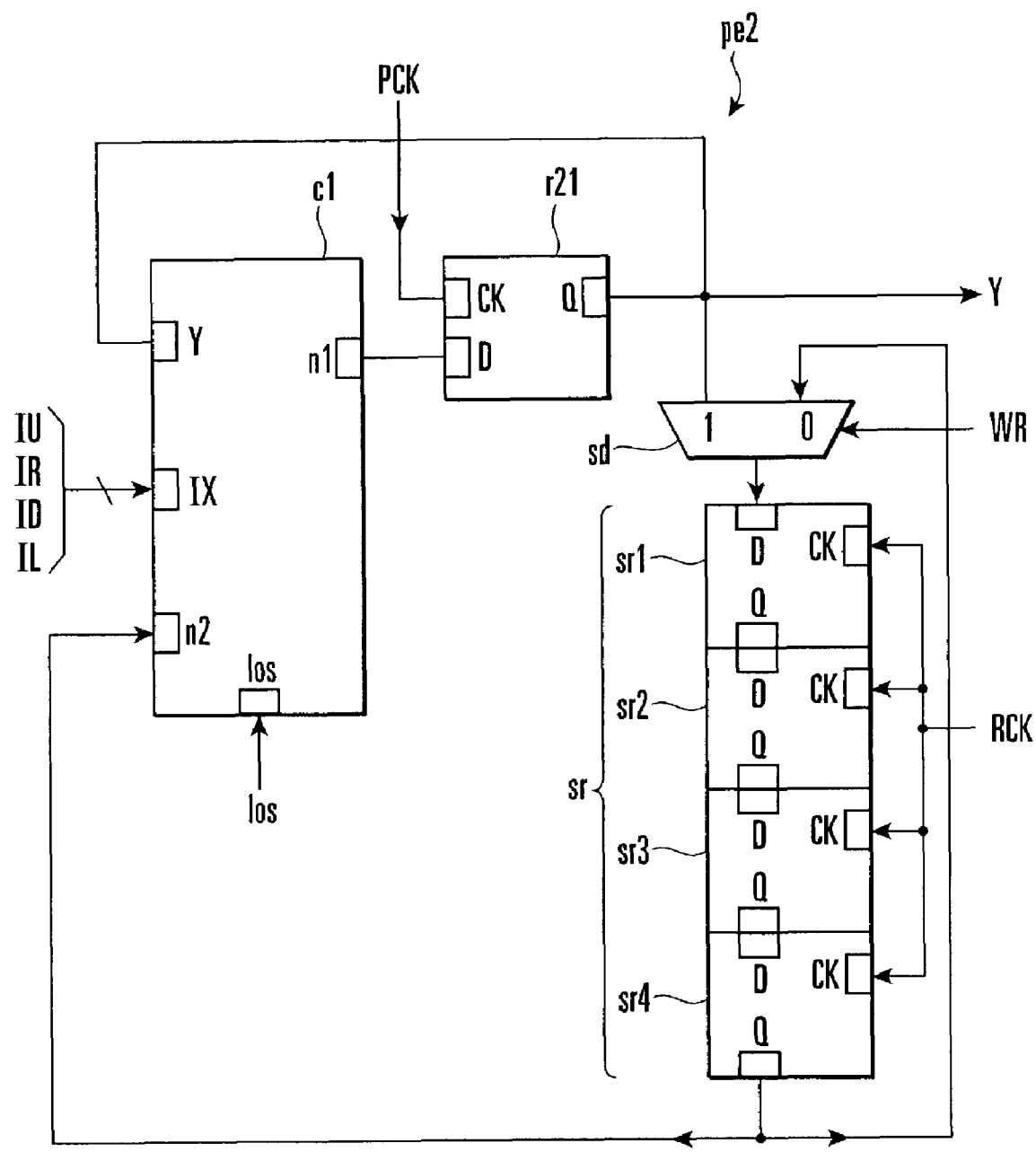
FIG. 46 is a block diagram showing the circuit configuration of a processing unit which constructs a parallel processing logic circuit according to the 15th embodiment.

FIG. 46 shows the configuration of a processing unit according to the 15th embodiment of the present invention. The same reference numerals as in FIGS. 11 and 43A denote the same or corresponding parts in FIG. 46.

A processing unit pe2 consists of a combinational logic function c1 for executing logic function, a 1-bit register r21 for storing the execution result, a 2-1 selector circuit sd, and 1-bit registers sr1 to sr4 which constitute a shift register sr. The processing unit pe2 is obtained by modifying the combinational logic function of the processing unit pe1. The output of the 1-bit register r21 is used as an input Y to the combinational logic function c1, and logic function is executed with the input variables stored in the 1-bit register r21 and the 1-bit register sr4. Such a logic execution mechanism is useful particularly when it is required to execute logic function of a plurality of binary data stored in local registers.

16th Embodiment

Figure 47:
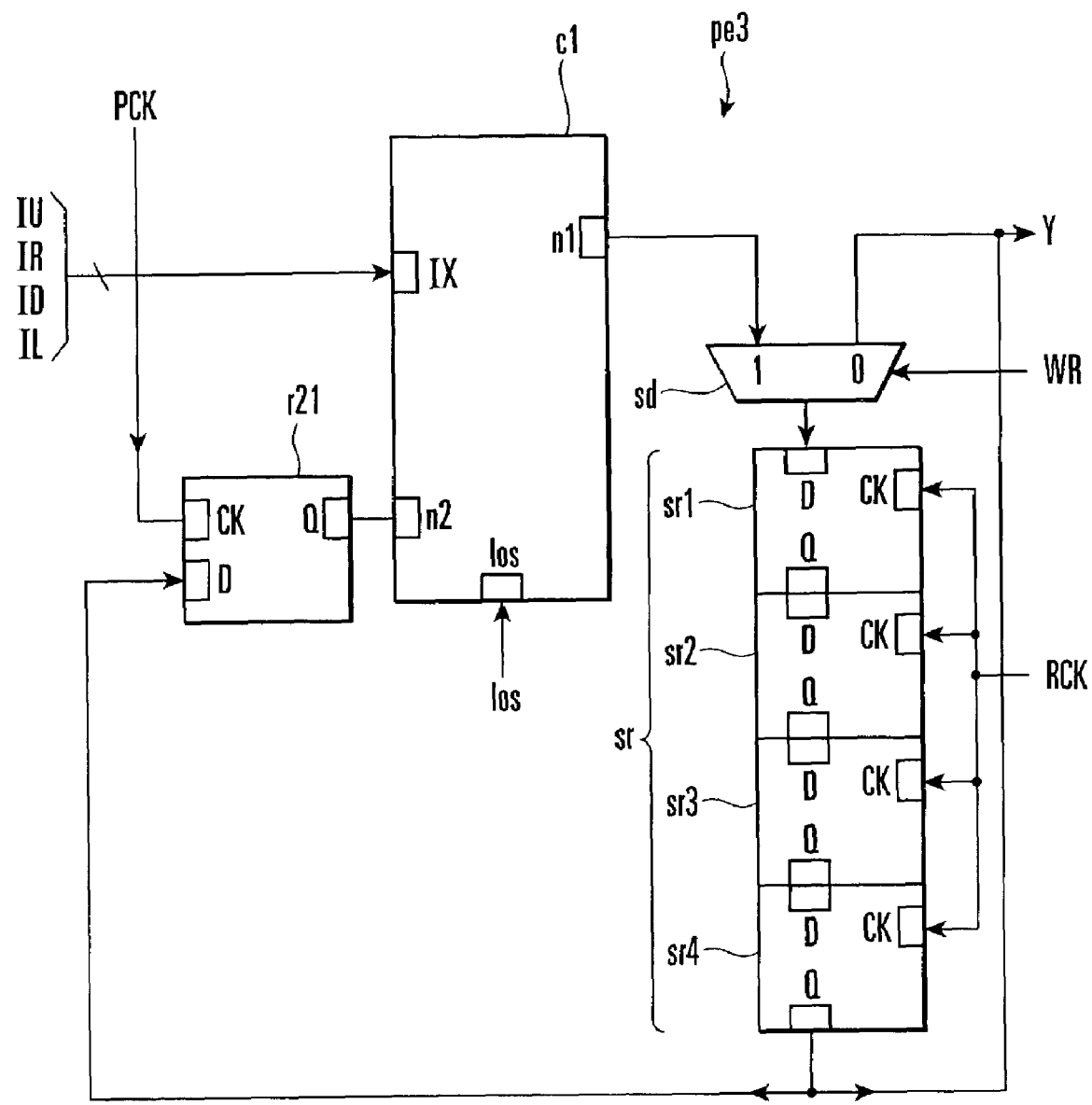
FIG. 47 is a block diagram showing the circuit configuration of a processing unit which constructs a parallel processing logic circuit according to the 16th embodiment.

FIG. 47 shows the configuration of a processing unit according to the 16th embodiment of the present invention. The same reference numerals as in FIGS. 11 and 43A denote the same or corresponding parts in FIG. 47.

A processing unit pe3 consists of a combinational logic function c1 for executing logic function, a 1-bit register r21 for storing a logic execution result, a 2-1 selector circuit sd, and 1-bit registers sr1 to sr4 which constitute a shift register sr. The processing unit pe3 shown in FIG. 47 is obtained by modifying connection of circuit elements in the processing unit pe1 shown in FIG. 43A.

The combinational logic function c1 receives a multi-bit input signal IX (IU, IR, ID, IL) externally delivered from first input terminals and 1-bit binary data stored in the 1-bit register sr4 and executes logic operation. An output n1 is output to one input terminal of the 2-1 selector circuit sd. The type of logic function to be executed is specified by a control signal los.

The 1-bit register r21 is an edge-triggered D-flip-flop. The 1-bit register r21 stores data at the positive edge of a first write signal PCK.

The output n1 of the combinational logic function c1 and the output terminal of the 1-bit register sr4 are connected to the input terminals of the 2-1 selector circuit sd. One of the inputs is selected by a selection signal WR and output to the 1-bit register sr1.

The 1-bit registers sr1 to sr4 are edge-triggered D-flip-flops and constitute the shift register sr. The 1-bit registers sr1 to sr4 are sequentially connected in series. The output terminal of the 1-bit register sr4 is connected to one input terminal of the 2-1 selector circuit sd. The data stored in the 1-bit register sr4 is output as the output signal Y and also connected to the input terminal of the 1-bit register r21.

When the selection signal WR of the 2-1 selector circuit sd is "0", the shift register sr closes the loop of shift operation of the 1-bit registers sr1 to sr4. At the positive edge of a second write signal RCK, binary data stored in the 1-bit registers sr1 to sr4 are sequentially transferred. When the selection signal WR is "1", the loop is opened between the 1-bit register sr1 and the 1-bit register sr4. The data from the output n1 of the combinational logic function c1 is input to the 1-bit register sr1 through the 2-1 selector circuit.

The basic operation sequence of the processing unit pe3 will be described next with reference to FIGS. 48A to 48E. First, execution of logic function that has inputs of signal IX and 1-bit binary data "d1" stored in the 1-bit register sr2 will be described. Then, overwriting an operation result "res0" on data "d0" stored in the 1-bit register sr1 will be described. The sequence can be roughly divided into three steps.

Figure 48A:
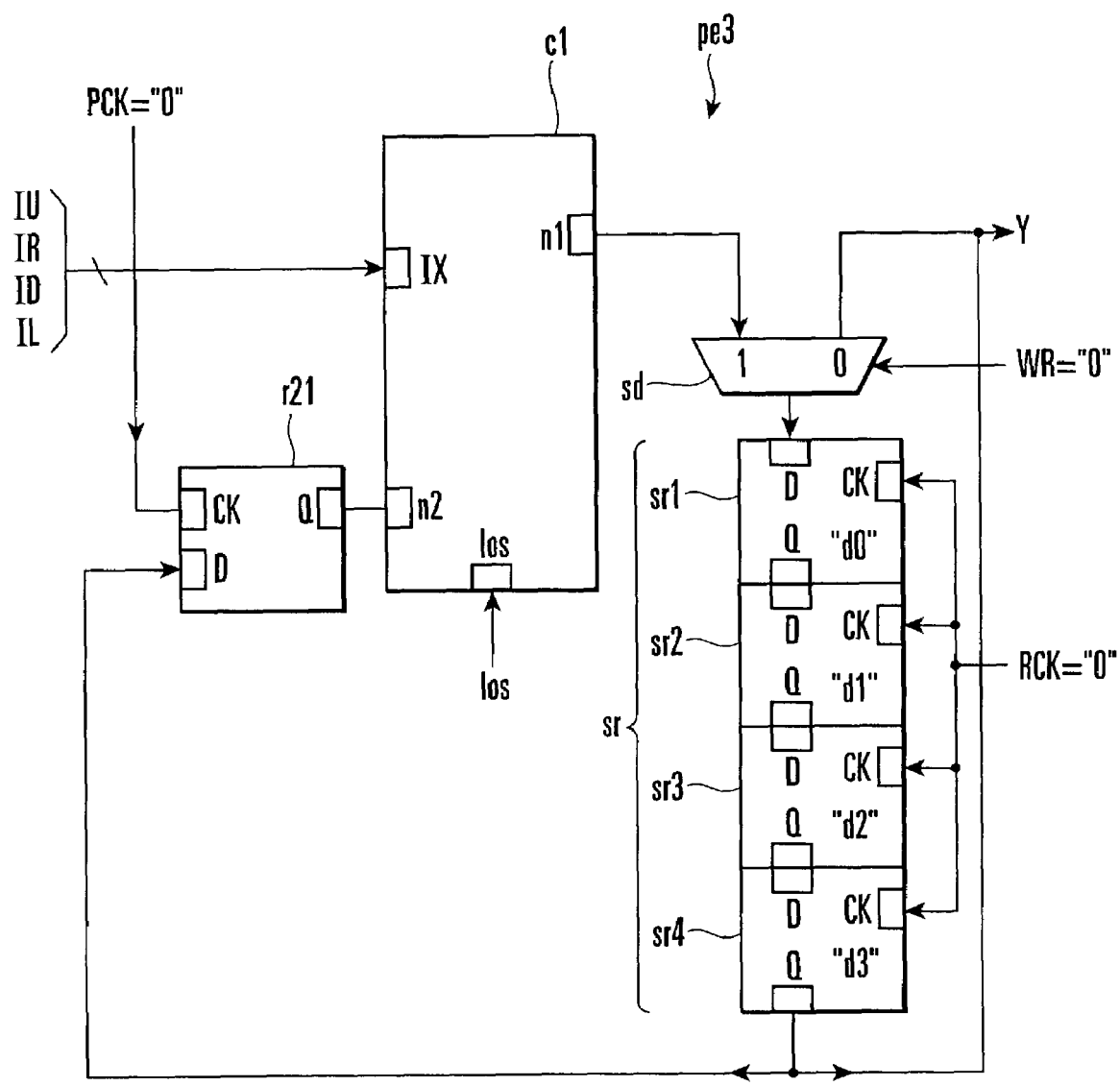
FIG. 48A is a block diagram for explaining the initial state of the processing unit shown in FIG. 47.

FIG. 48A shows the initial state of the processing unit pe3. In the initial state, binary data "d0", "d1", "d2", and "d3" are stored in the 1-bit registers sr1 to sr4, respectively. Arbitrary data is stored in the 1-bit register r21.

Figure 48B:
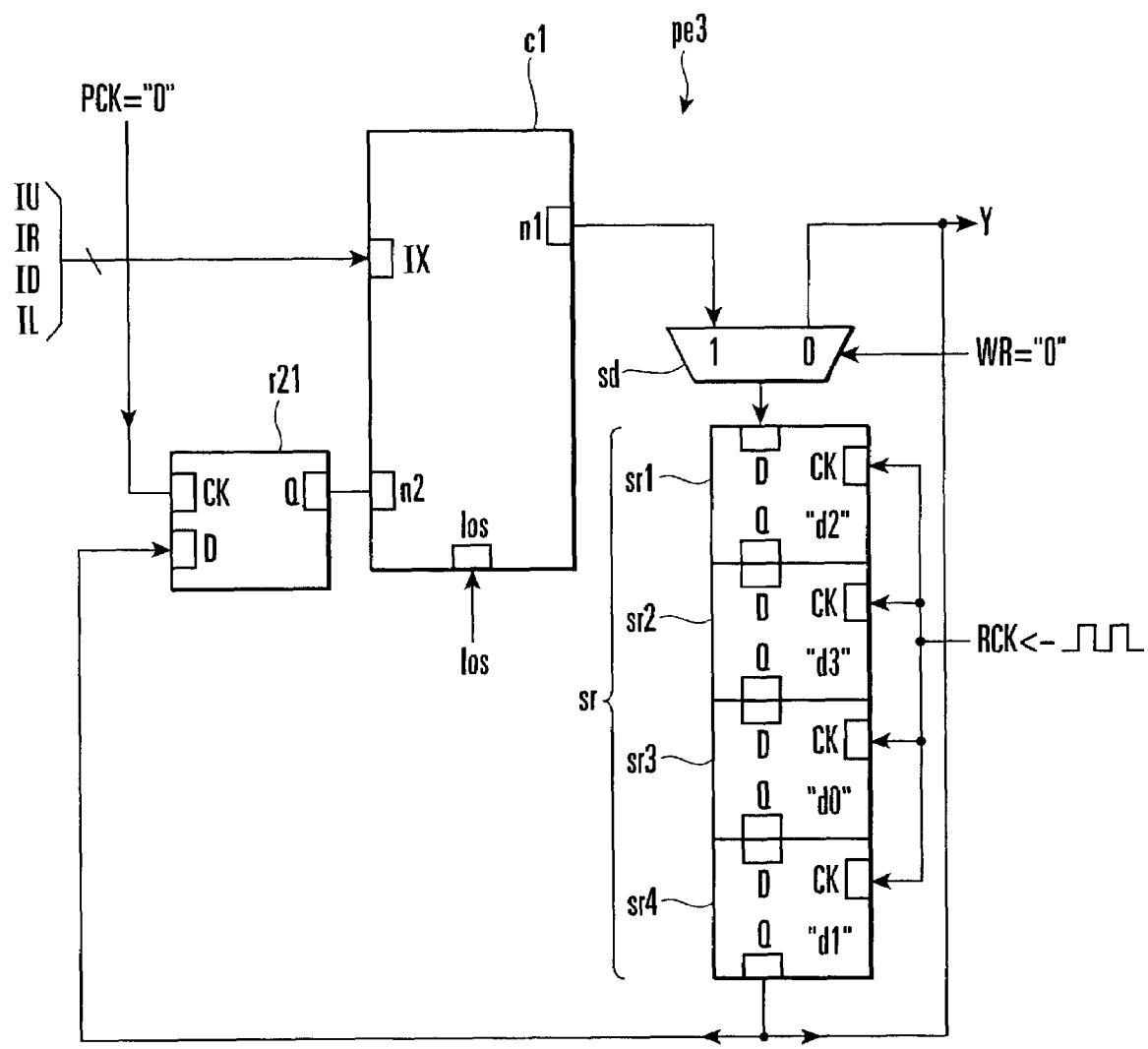
FIG. 48B is a block diagram for explaining specification of a read register as the first step.
Figure 48C:
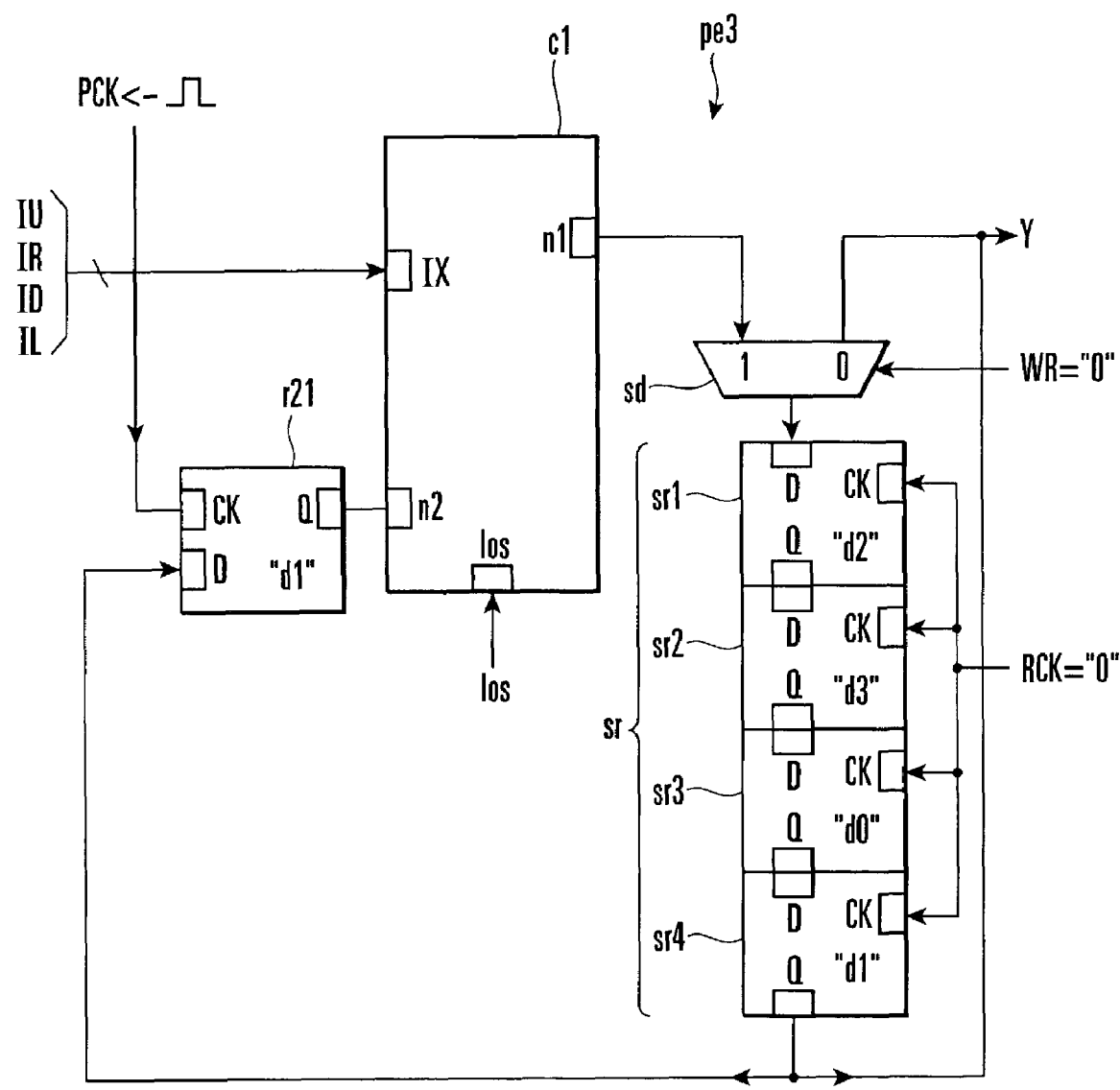
FIG. 48C is a block diagram for explaining storage of data in the specified read register as the first step.

FIG. 48B shows specification of a read register as the first step. FIG. 48C shows data storage in the designated read register as the first step. Only the output terminal of the 1-bit register r21 is connected to the input n2 of the combinational logic function c1. The selection signal WR of the 2-1 selector circuit sd is set to "0", and a positive pulse is applied to the second write signal RCK continuously twice to shift "d1" stored in the 1-bit register sr2 to the 1-bit register sr4. Subsequently, a positive pulse is applied to the first write signal PCK once to store in the 1-bit register r21 "d1" stored in the 1-bit register sr4. In the above manner, the 1-bit binary data "d1" initially stored in the 1-bit register sr2 can be transferred to and stored in the 1-bit register r21. FIG. 48B shows a timing when the binary data "d1" is transferred to the 1-bit register sr4. FIG. 48C shows a timing when the binary data "d1" is stored in the 1-bit register r21.

Figure 48D:
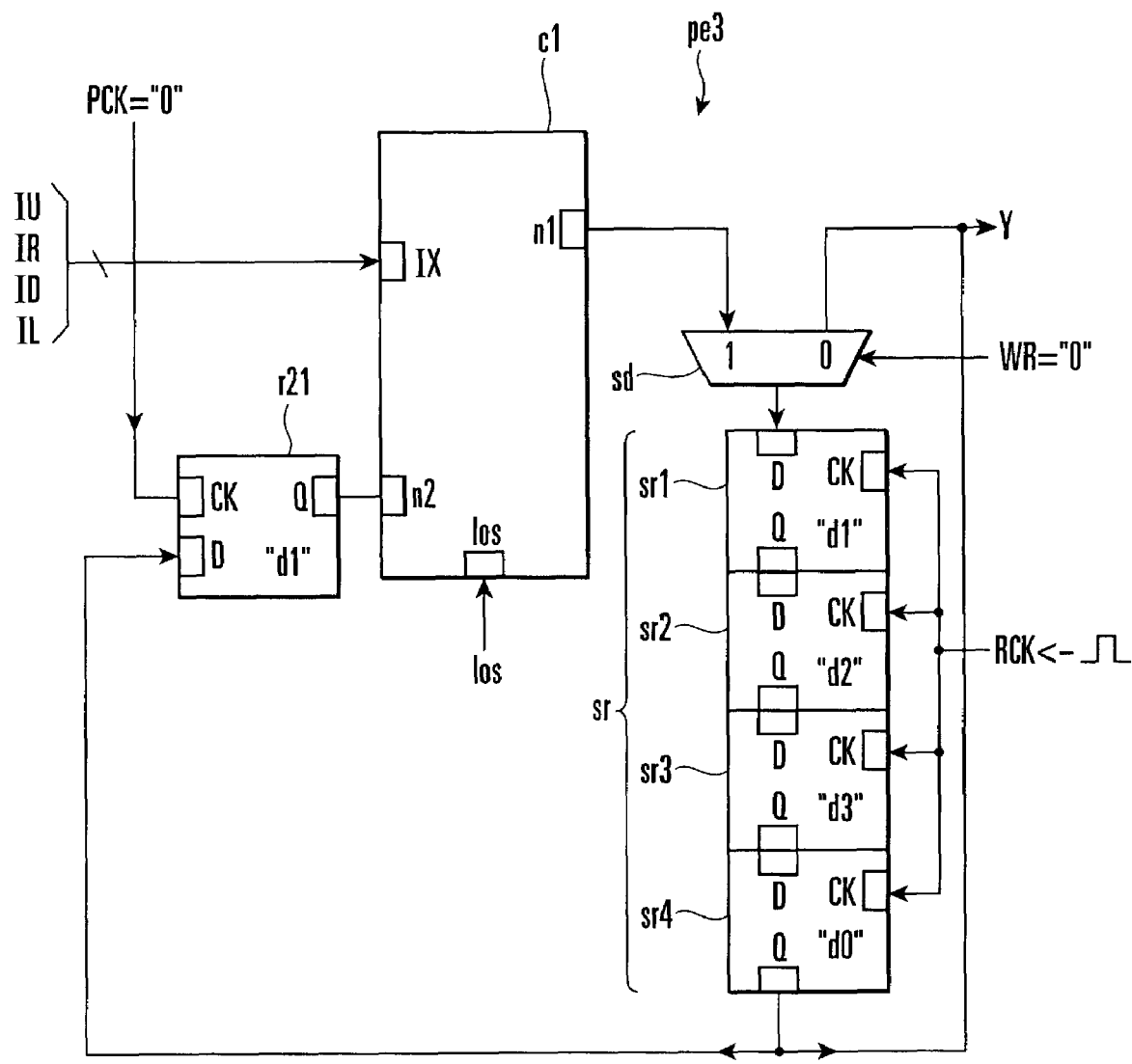
FIG. 48D is a block diagram for explaining execution of logic operation and specification of a write register as the second step.

FIG. 48D shows execution of logic function and specification of a write register as the second step. As shown in FIG. 48C, in the state wherein the binary data "d1" is stored in the 1-bit register r21, the control signal los is set to cause the combinational logic function c1 to execute predetermined logic operation. In addition, the selection signal WR of the 2-1 selector circuit sd is set to "0", and a positive pulse is applied to the second write signal RCK once, thereby shifting the binary data "d0" to the 1-bit register sr4. FIG. 48D shows a timing when the data "d0" is transferred to the 1-bit register sr4.

Figure 48E:
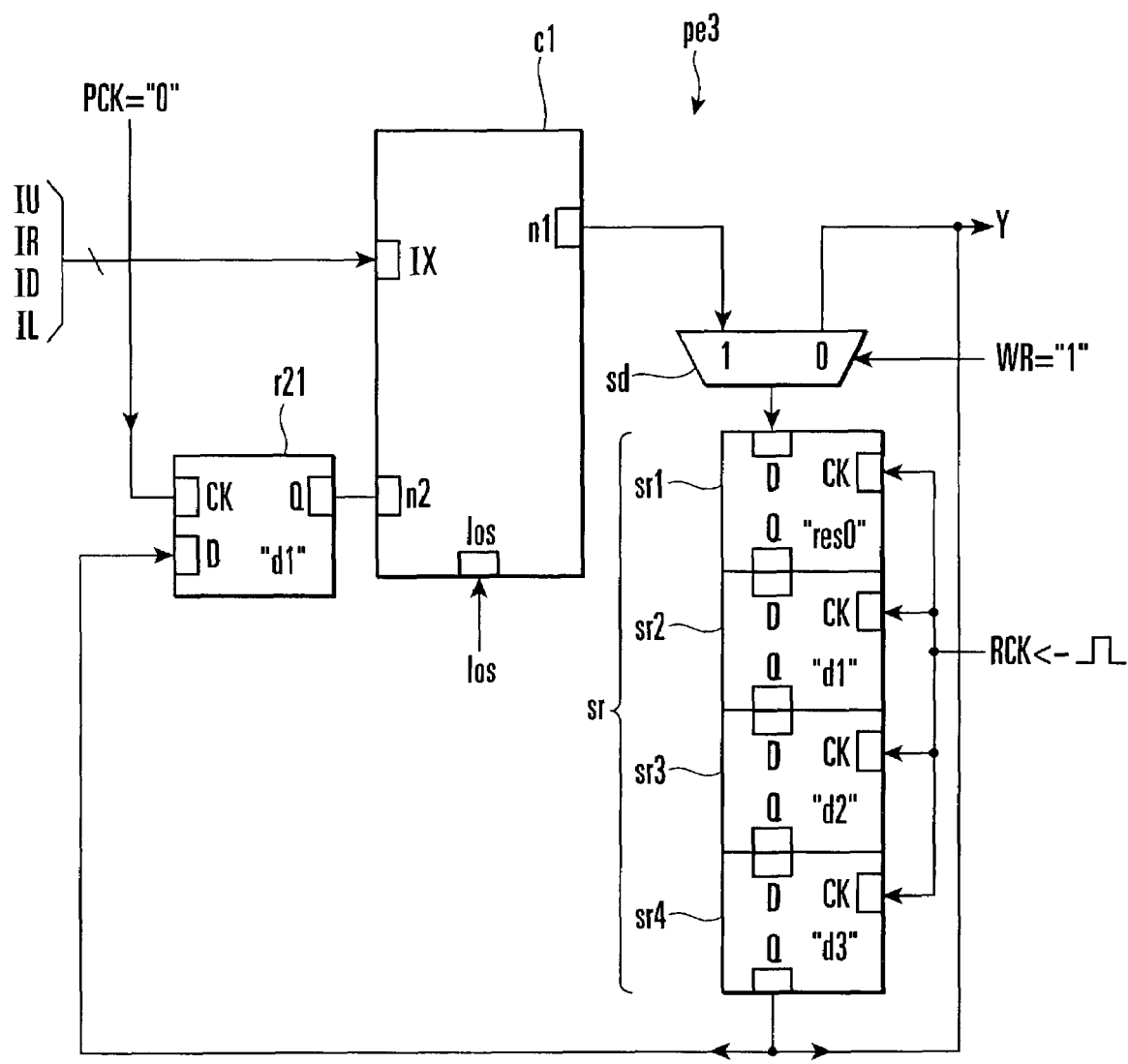
FIG. 48E is a block diagram for explaining storage of the execution result in a write register as the third step.

FIG. 48E shows storing the execution result in the write register as the third step. The selection signal WR of the 2-1 selector circuit sd is set to "1", and a positive pulse is applied to the second write signal RCK once, thereby overwriting the operation result "res0" on the data "d0".

Figure 49:
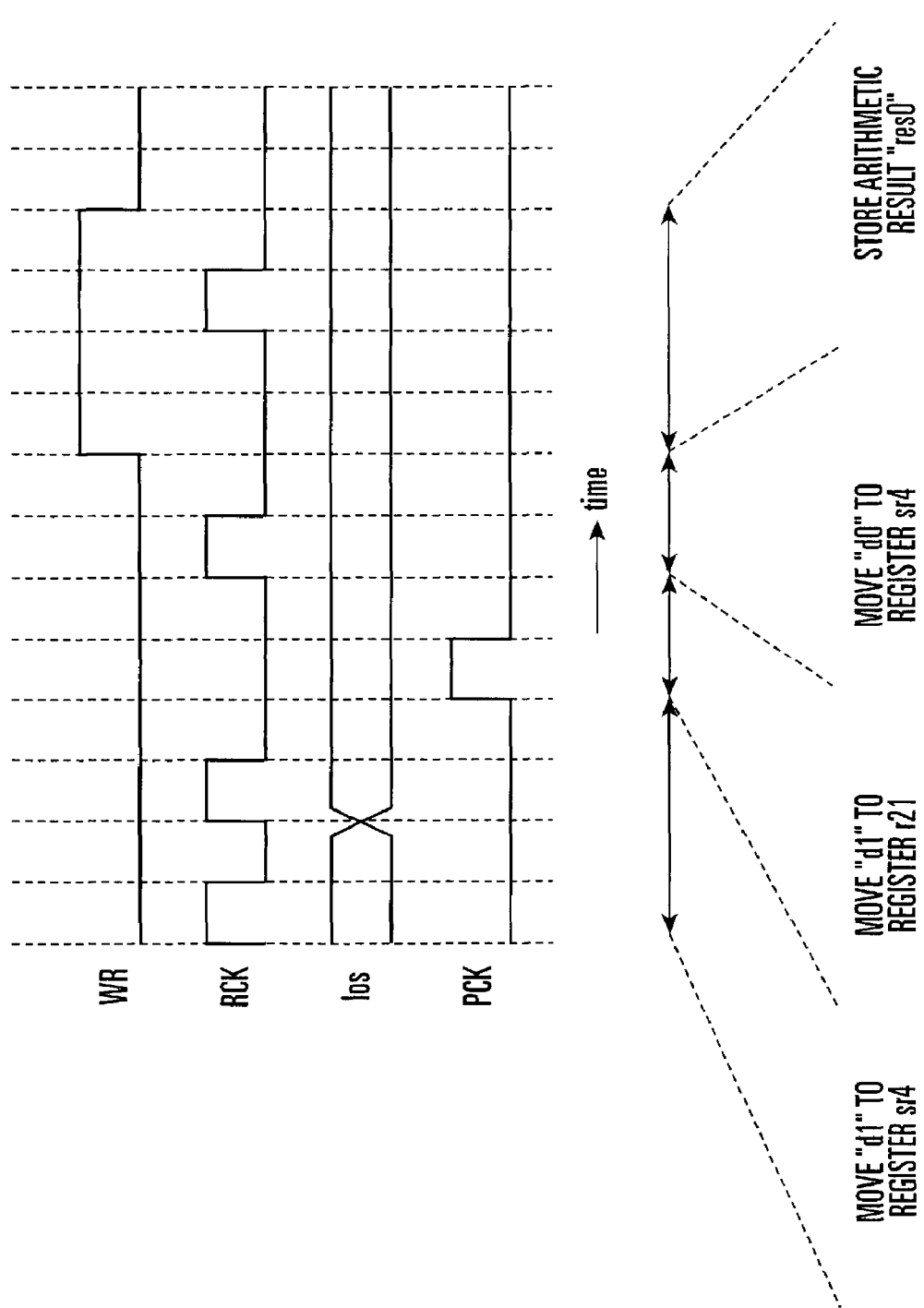
FIG. 49 is a timing chart showing the operation sequence of the processing unit shown in FIG. 47.

FIG. 49 shows the operation sequence of the processing unit pe3 shown in FIG. 47. As described above, the processing unit pe3 is controlled by four signals: the selection signal WR of the 2-1 selector circuit sd, the second write signal RCK, the control signal los for specifying logic operation, and the first write signal PCK. Each time section divided by dotted lines indicates a half cycle of the operation cycle. In the first two cycles, a register having data for which logic function is to be executed is specified. In the next cycle, the data stored in the specified register is transferred to the 1-bit register r21. In the next cycle, binary data stored in a register on which the execution result should be overwritten is shifted onto a predetermined register. In the next two cycles, the execution result is overwritten on the data shifted from the specified register.

According to the processing unit pe3 shown in FIG. 47, the shift register sr is comprised of the 1-bit registers sr1 to sr4. When the combinational logic function c1 is to access the shift register sr, data on the register to be accessed is transferred onto a specific register, and access is done only through the specific register. So, there is no need for read on write circuit to each 1-bit register. Hence, the scale of the circuit elements can be largely reduced. Hence, the resolution of the parallel processing circuit made of the processing units pe1 can be increased.

17th Embodiment

Figure 50:
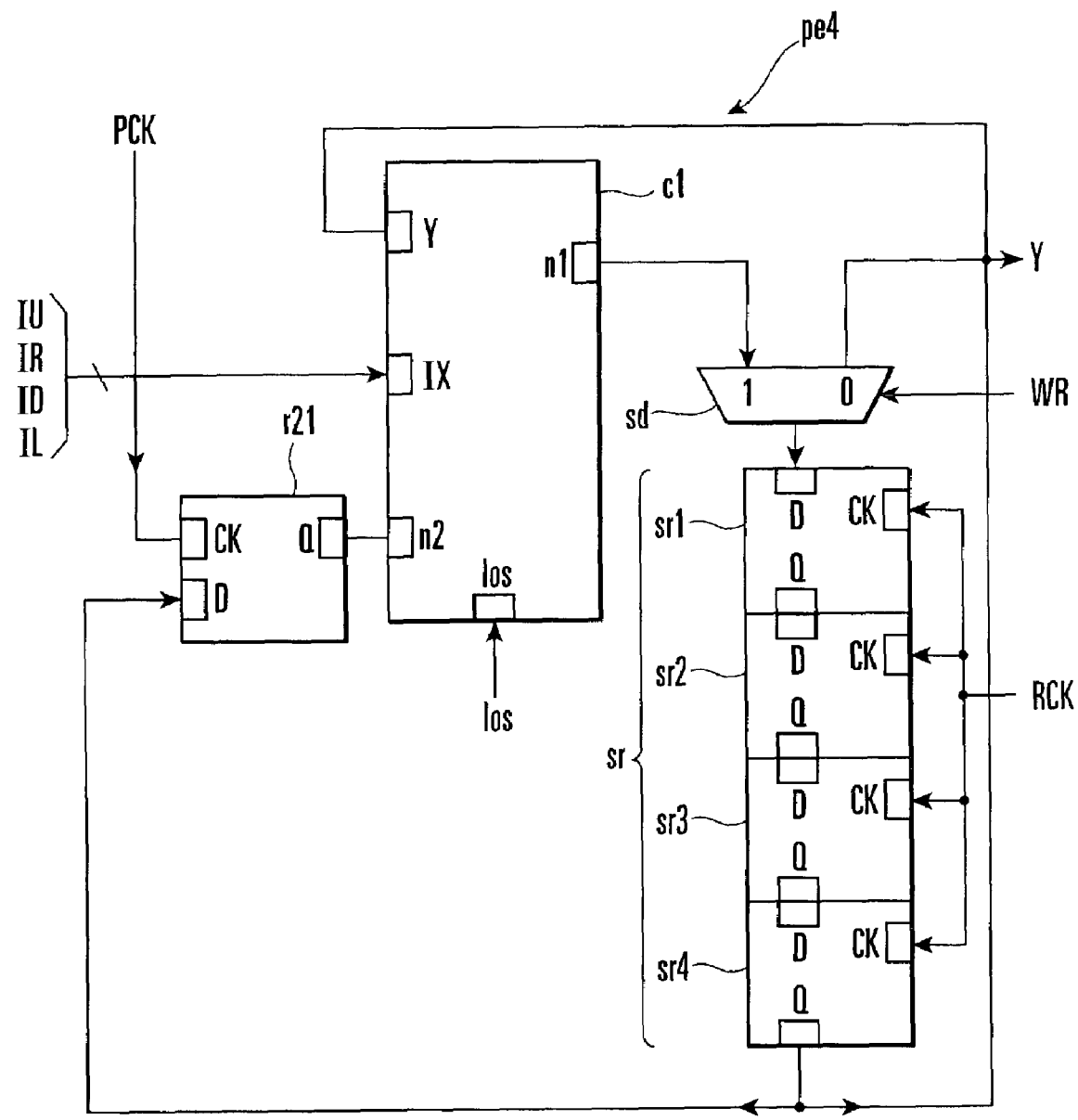
FIG. 50 is a block diagram showing the circuit configuration of a processing unit which constructs a parallel processing logic circuit according to the 17th embodiment.

FIG. 50 shows the configuration of a processing unit according to the 17th embodiment of the present invention. The same reference numerals as in FIGS. 11 and 47 denote the same or corresponding parts in FIG. 50.

A processing unit pe4 consists of a combinational logic function c1 for executing logic function, a 1-bit register r21 for storing a logic execution result, a 2-1 selector circuit sd, and 1-bit registers sr1 to sr4 which constitute a shift register sr. The processing unit pe4 is obtained by modifying the combinational logic function of the processing unit pe3. The output of the 1-bit register sr4 is used as an input Y to the combinational logic function c1, and logic function is executed with the input variables stored in the 1-bit register r21 and the 1-bit register sr4. Such a logic execution mechanism is useful particularly when it is required to execute logic function of a plurality of binary data stored in local registers.

The 14th to 17th embodiments are modifications to the third embodiment. In a similar way, modifications to the fourth embodiment may be constructed.

Figure 51:
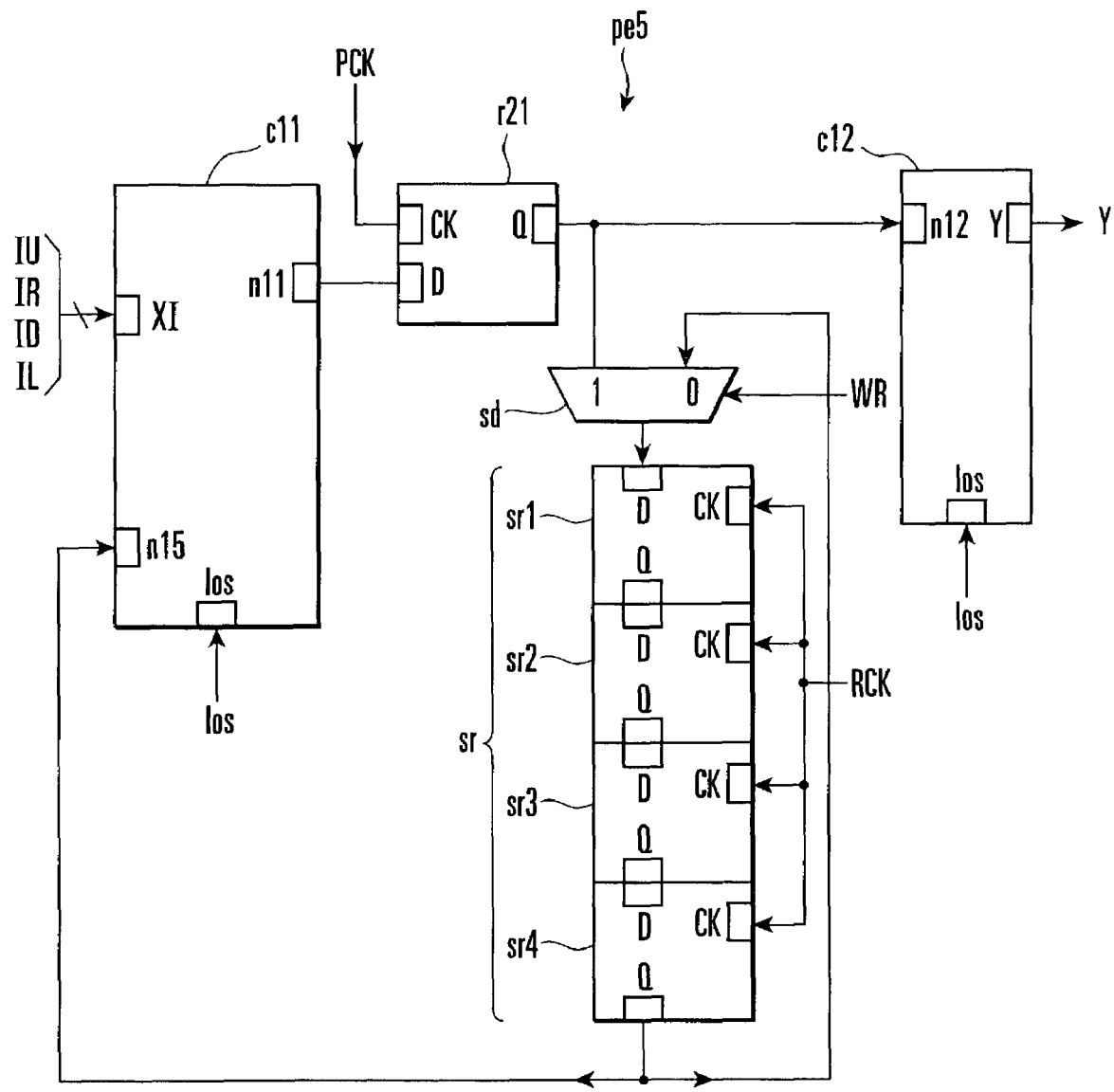
FIG. 51 is a block diagram showing a modification of the processing unit shown in FIG. 43A.

FIG. 51 corresponds to FIG. 43A. In a processing unit pe5 shown in FIG. 51, combinational logic functions c11 and c12 shown in FIG. 16 are used. Hence, an output n11 of the combinational logic function c11 is connected to the input of a 1-bit register r21. The output of the 1-bit register r21 is connected to an input n12 of the combinational logic function c12. The output from the combinational logic function c12 is output to the neighboring processing units as a signal Y. In addition, the output of a 1-bit register sr4 is connected to an input n15 of the combinational logic function c11.

Figure 52:
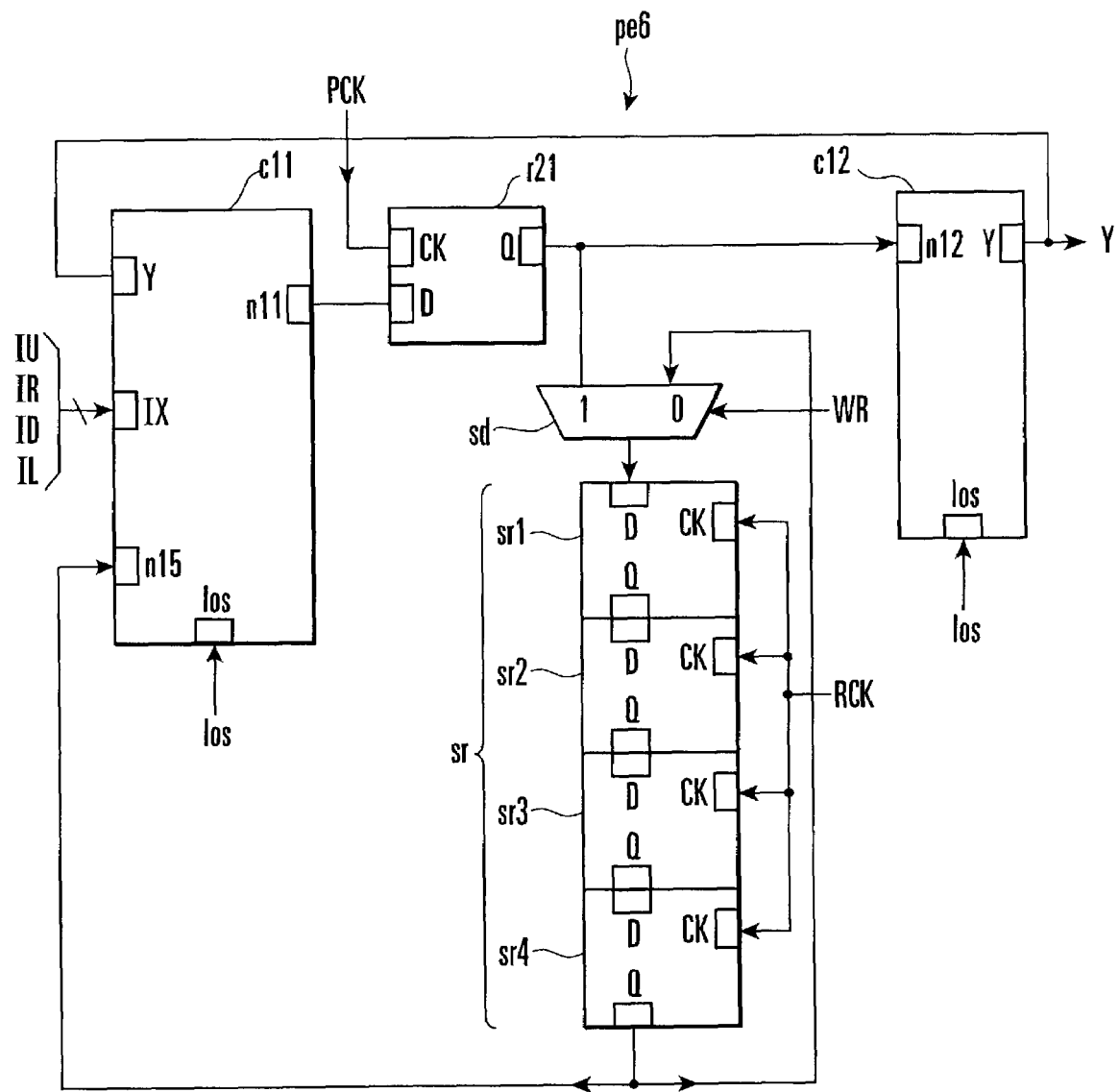
FIG. 52 is a block diagram showing a modification of the processing unit shown in FIG. 46.

FIG. 52 corresponds to FIG. 46. Even in a processing unit pe6 shown in FIG. 52, combinational logic functions c11 and c12 shown in FIG. 16 are used. The output of the combinational logic function c12 is connected to an input Y of the combinational logic function c11.

Figure 53:
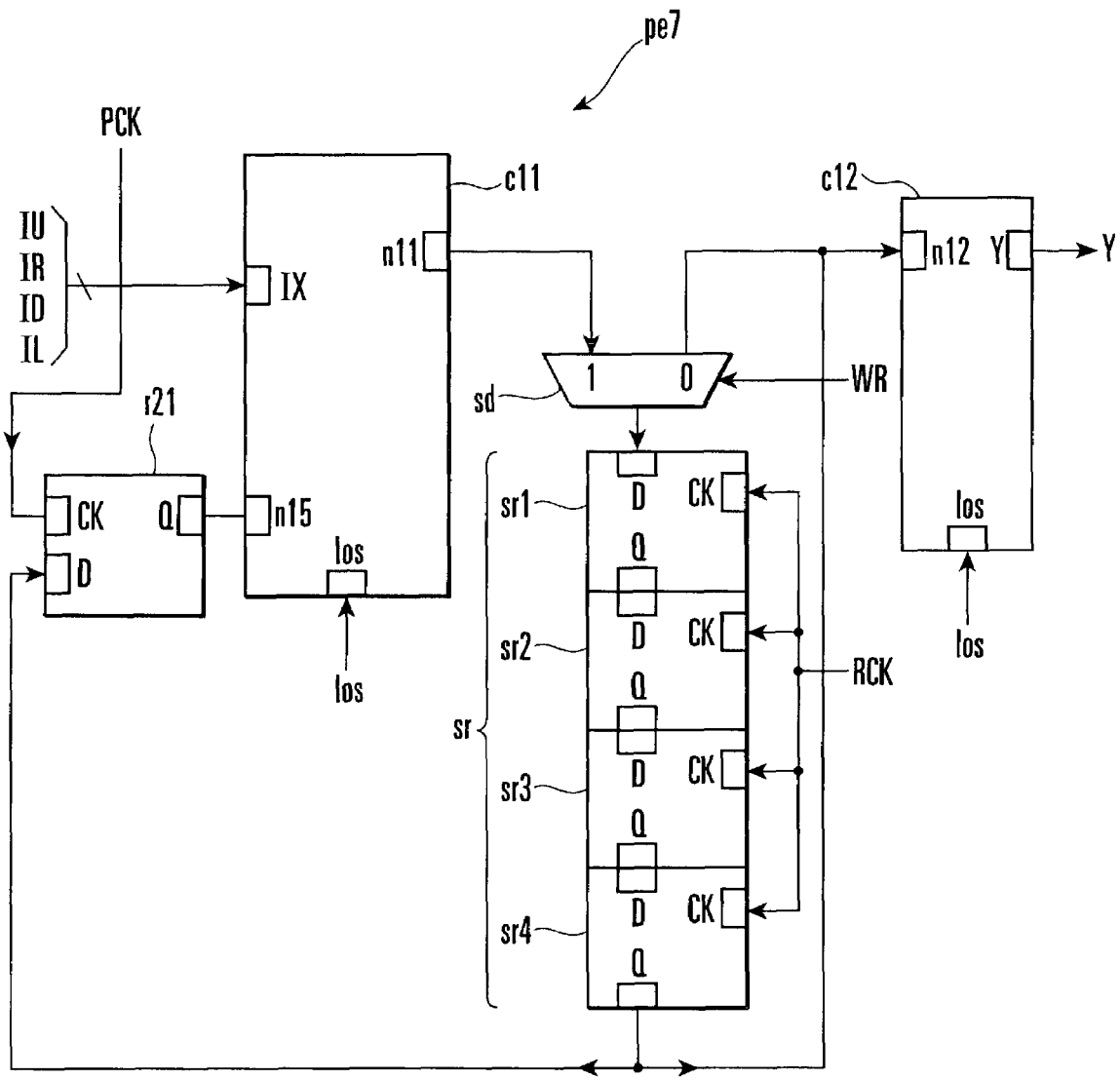
FIG. 53 is a block diagram showing a modification of the processing unit shown in FIG. 47.

FIG. 53 corresponds to FIG. 47. In a processing unit pe7 shown in FIG. 53, combinational logic functions c11 and c12 shown in FIG. 16 are used. Hence, an output n11 of the combinational logic function c11 is connected to one input of a 2-1 selector circuit sd. The output of a 1-bit register sr4 is connected to an input n12 of the combinational logic function c12. The output from the combinational logic function c12 is output to the neighboring processing units as a signal Y. In addition, the output of a 1-bit register r21 is connected to an input n15 of the combinational logic function c11.

Figure 54:
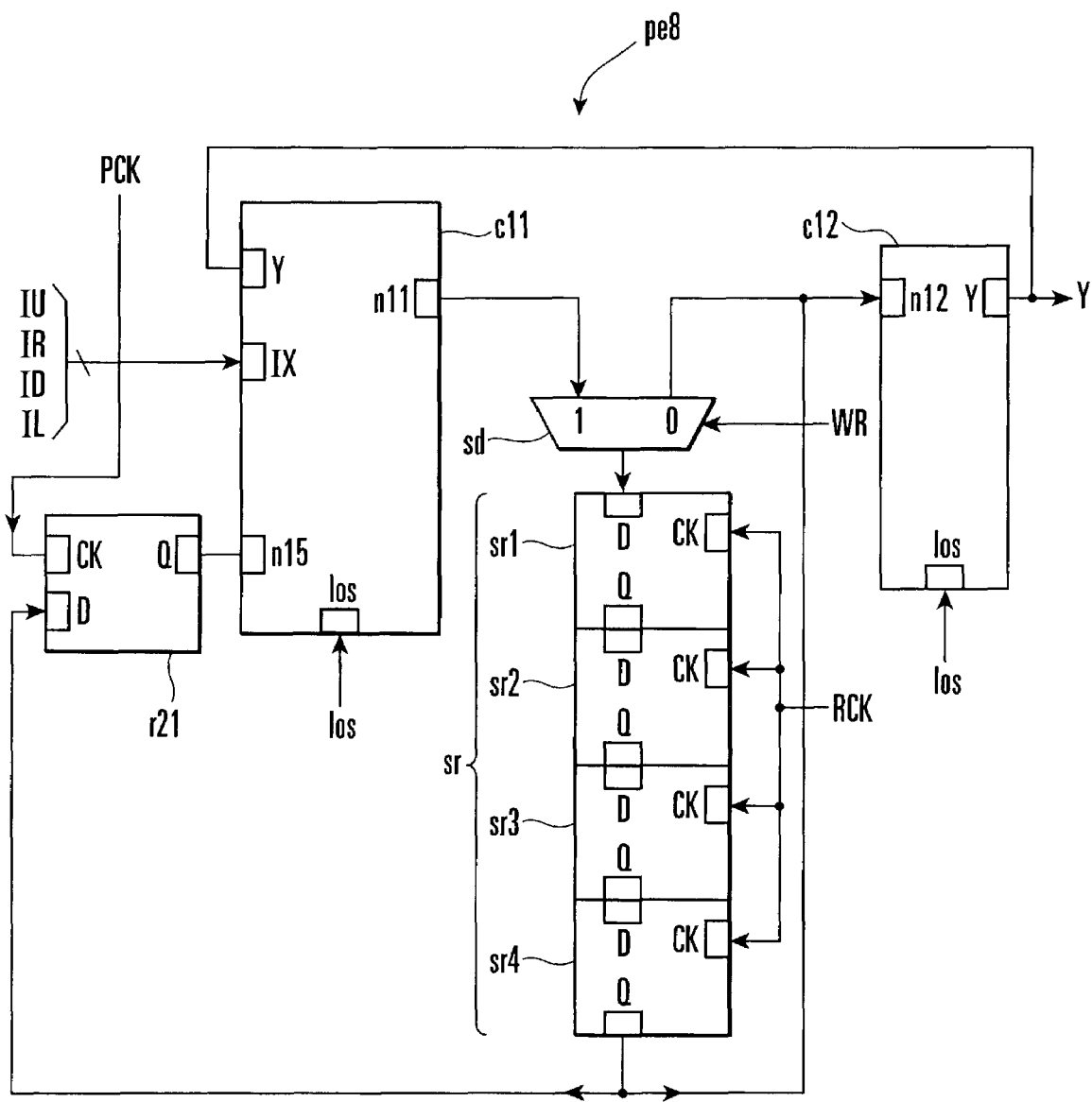
FIG. 54 is a block diagram showing a modification of the processing unit shown in FIG. 50.

FIG. 54 corresponds to FIG. 50. Even in a processing unit pe8 shown in FIG. 54, combinational logic functions c11 and c12 shown in FIG. 16 are used. The output of the combinational logic function c12 is connected to an input Y of the combinational logic function c11.

The configuration of a storage circuit used in a processing unit pe will be described next as the 18th to 30th embodiments of the present invention.

18th Embodiment

FIG. 55 shows a flip-flop circuit using a RAM-type latch circuit as the 18th embodiment of the present invention. In this embodiment, a master-slave flip-flop circuit is made of two RAM-type latch circuits A1a and A1b. One RAM-type latch circuit A1a has NMOS transistors M1, M2, M3, and M4 and inverter circuits G1, G2, and G3. The inverter circuits G1 and G2 constitute a data storage section and store data at data storage nodes Qa and QNa. The transistors M1 to M4 are devices used to access the data storage nodes Qa and QNa. While a clock signal (input signal) CKN is at high level (first level), a transparent mode is set in which a data signal D is transferred to the data storage node Qa, and the inversed signal of the data signal D is transferred to the data storage node QNa. While the clock signal CKN is at low level (second level), a storage mode is set in which the transferred data signal D and its inversed signal are stored at the data storage nodes Qa and QNa.

The other RAM-type latch circuit A1b has NMOS transistors M5, M6, M7, and M8 and inverter circuits G6 and G7. The inverter circuits G6 and G7 constitute a data storage section and store data at data storage nodes Qb and QNb. The transistors M5 to M8 are devices used to access the data storage nodes Qb and QNb. While a clock signal (input signal) CKP obtained by inverting the clock signal CKN is at high level, a transparent mode is set in which a data signal stored at the data storage node Qa is transferred to the data storage node Qb, and the inversed signal of the data signal is transferred to the data storage node QNb. While the clock signal CKP is at low level, a storage mode is set in which the transferred data signal and its inversed signal are stored at the data storage nodes Qb and QNb.

FIGS. 56A to 56D show the operation of the flip-flop circuit shown in FIG. 55. FIG. 56A shows the data signal D. FIG. 56B shows the clock signal CKP. FIG. 56C shows the clock signal CKN. FIG. 56D shows the signal waveform at the data storage node Qb. When the clock signals CKN and CKP in opposite phases are delivered to the RAM-type latch circuits A1a and A1b, the RAM-type latch circuits A1a and A1b are exclusively set in the transparent mode or storage mode. Hence, the flip-flop circuit shown in FIG. 55 receives and stores the data signal D at the positive edge of the clock signal CKP, as shown in FIGS. 56A to 56D.

The flip-flop circuit using RAM-type latch circuits can be compactly laid out in an area about ⅓ that of a transmission flip-flop. For this reason, a processing unit pe which constitutes a parallel processing logic circuit can be made compact, and the integration density of the processing units pe can be increased. Hence, the resolution of image processing can be increased.

19th Embodiment

FIG. 57 shows a flip-flop circuit using a RAM-type latch circuit as the 19th embodiment of the present invention. The flip-flop circuit shown in FIG. 57 consists of a RAM-type latch circuit A1, switch circuit B1, and inverter circuit G4. The RAM-type latch circuit A1 has NMOS transistors M1, M2, M3, and M4 and inverter circuits G1, G2, and G3. The switch circuit has MMOS transistors M11 and M12.

The inverter circuits G1 and G2 constitute a data storage section. The connection point between the input terminal of the inverter circuit G1 and the output terminal of the inverter circuit G2 serves as a first data storage node QN. The connection point between the output terminal of the inverter circuit G1 and the input terminal of the inverter circuit G2 serves as a second data storage node Q. The data storage node Q and the node QN as the inverting node of the data storage node Q serve as the output terminals of the flip-flop circuit.

The inverter circuit G3 receives a data signal D and outputs its inversed signal. The inverter circuit G4 receives a clock signal (second clock signal) CK and outputs its inversed signal (first clock signal). The NMOS transistors M1, M2, M3, M4, M11, and M12 constitute a data input control section. Each of the transistors M1, M2, M3, M4, M11, and M12 is controlled by the clock signal CK, data signal D, or their inversed signals to connect or disconnect the data storage section to or from a ground electrode.

The transistors M11 and M12 are ON/OFF-controlled by the clock signal CK input to the gate terminals so as to transfer the data signal D and its inversed signal to the data storage section or disconnect the signals from the data storage section. The transistor M11 outputs the inversed signal of the data signal D, which is input from the inverter circuit G3 to the drain terminal, from the source terminal (first switch output terminal) to the gate terminal of the transistor M1 (the first data input terminal of the RAM-type latch circuit). The transistor M12 outputs the data signal D, which is input to the drain terminal, from the source terminal (second switch output terminal) to the gate terminal of the transistor M4 (the second data input terminal of the RAM-type latch circuit).

That is, while the clock signal CK is at high level (first level), the transistors M11 and M12 are kept on to transfer the inversed signal of the data signal D to the gate terminal of the transistor M1 and transfer the data signal D to the gate terminal of the transistor M4. On the other hand, while the clock signal CK is at low level (second level), the transistors M11 and M12 are kept off to disconnect the gate terminals of the transistors M1 and M4 from the data input and sets them in a floating state.

The source terminals of the transistors M2 and M3 are connected to the ground electrode. The drain terminals of the transistors M2 and M3 are connected to the source terminals of the transistors M1 and M4, respectively. The drain terminals of the transistors M1 and M4 are connected to the data storage nodes QN and Q, respectively. The transistors M2 and M3 are ON/OFF-controlled by the inversed signal of the clock signal CK, which is input from the inverter circuit G4 to the gate terminals, so as to forcibly connect or disconnect the data storage nodes QN and Q of the data storage section to or from the ground electrode through the transistors M1 and M4.

While the clock signal CK is at low level, the transistors M2 and M3 are kept on. As a result, one of the data storage nodes QN and Q is connected to the ground electrode in accordance with the value of the data signal D immediately before the clock signal CK changes to low level. At this time, the data signal D is stored at the data storage section. This operation will be described later in detail. While the clock signal CK is at high level, the transistors M2 and M3 are kept off to set the data storage section of the inverter circuits G1 and G2 in a storage mode.

FIGS. 58A to 58C show the operation of the flip-flop circuit shown in FIG. 57. FIG. 58A shows the data signal D. FIG. 58B shows the clock signal CK. FIG. 58C shows the signal waveform at the data storage node Q. At the negative edge of the clock signal CK, the data signal D is received and stored, so the flip-flop circuit operates as an edge-triggered D-flip-flop.

This flip-flop circuit is different from that shown in FIG. 55 in the following point. That is, since the transistors M11 and M12 are arranged, the data signal D is electrically disconnected from the gate terminals of the transistors M1 and M4 while the latch circuit is set in the transparent mode, i.e., while the clock signal CK is at low level. For this reason, even when the data signal D is updated during the period of transparent mode, it is not reflected on the data stored in the data storage section. The data signal D is received by the data storage section only at the edge at which the switches from high level to low level.

For example, when the clock signal CK is at high level, and the data signal D is at high level, a signal of low level is supplied to the gate terminal of the transistor M1, and a signal of high level is supplied to the gate terminal of the transistor M4. When the clock signal CK changes to low level, the gate terminals of the transistors M1 and M4 are at low level, and the transistors M1 and M4 are set in the floating state. Charges that correspond to the level of the data signal D immediately before the clock signal CK changes to low level are stored at the gate terminals of the transistors M1 and M4. Because of the charge, the high level of potential is held at the gate terminal of M4, and the low level of potential is held at the gate terminal of M1. As a result, the transistor M1 is kept off, and the transistor M4 is kept on. When the clock signal CK changes to low level, the transistors M2 and M3 are turned on. Hence, the data storage node Q is connected to the ground electrode through the transistors M3 and M4, so the data signal D is stored in the data storage section.

On the other hand, when the clock signal CK is at high level, and the data signal D is at low level, a signal of high level is supplied to the gate terminal of the transistor M1, and a signal of low level is supplied to the gate terminal of the transistor M4. When the clock signal CK changes to low level, charges immediately before the clock signal CK changes to low level are stored at the gate terminals of the transistors M1 and M4. In this case, the transistor M1 is kept on, and the transistor M4 is kept off. Since the low level of the clock signal CK turns on the transistors M2 and M3, the data storage node QN is connected to the ground electrode through the transistors M1 and M2, so the data signal D is stored in the data storage section.

While the clock signal CK is at low level, charges that correspond to the data signal D immediately before the clock signal CK changes to low level are stored in the gate thermals of the transistors M1 and M4. These charges disappear due to a leakage current as time elapses. Hence, the transistor M1 and M4 may be turned off, and both of M1-2 and M3-4 paths are turned off.

However, the data storage nodes Q and QN are still in low impedance state by a pair of inverter circuits G1 and G2, and a large current must be injected into the data storage node Q or QN to invert the data of the data storage section. However, the transistor M1 or M4 which is going to be turned off because of disappearance of charges has no such a current supply ability. Hence, the data of the data storage section is hardly erroneously updated, and the function of the edge-triggered D-flip-flop can be maintained.

As described above, in this embodiment, a latch circuit itself can be made compact by employing a RAM-type latch circuit, and the circuit can be operated as a flip-flop circuit using only one latch circuit by using a new additional circuit. For this reason, a flip-flop circuit more compact than before can be implemented. In addition, to satisfactorily control the data reception and storage timing, a clock signal in an opposite phase is generated in the flip-flop circuit using the inverter circuit G4.

20th Embodiment

Figure 59:
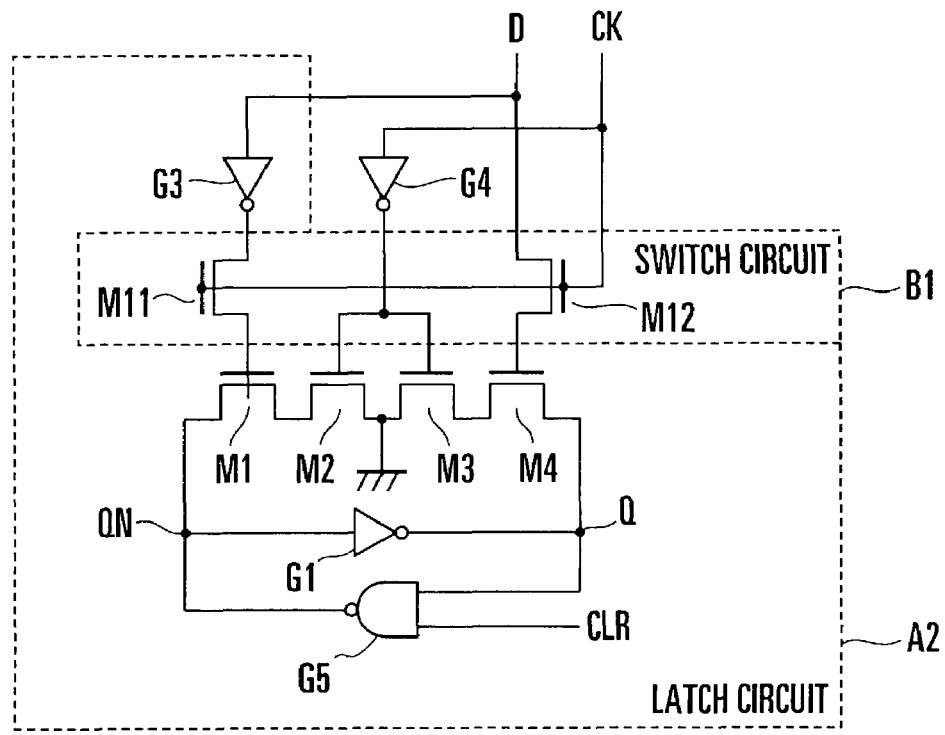
FIG. 59 is a circuit diagram of a flip-flop circuit using a RAM-type latch circuit as the 20th embodiment.

FIG. 59 shows a flip-flop circuit using a RAM-type latch circuit as the 20th embodiment of the present invention. The same reference numerals as in FIG. 57 denote the same parts in FIG. 59. In the flip-flop circuit shown in FIG. 59, a 2-input NAND circuit G5 is used in place of an inverter circuit G2, and a clear input signal CLR is added to forcibly set the data stored in the data storage section to Q=0 and QN=1.

An inverter circuit G1 and the 2-input NAND circuit G5 constitute a data storage section. The connection point between the input terminal of the inverter circuit G1 and the output terminal of the 2-input NAND circuit G5 serves as a data storage node QN. The connection point between the output terminal of the inverter circuit G1 and one input terminal of the 2-input NAND circuit G5 serves as a data storage node Q. The clear input signal CLR is input to the other input terminal of the 2-input NAND circuit G5.

When the clear input signal CLR is set at high level, i.e., logic value "1", the 2-input NAND circuit G5 executes the same operation as that of the inverter circuit G2. This operation is the same as described in the 19th embodiment. On the other hand, when the clear input signal CLR is set at low level, i.e., logic value "0", the output terminal of the 2-input NAND circuit G5 it set at high level, the data storage node QN is fixed at logic value "1", and consequently, the data storage node Q is fixed at logic value "0". In this way, the data stored in the data storage section can be set to Q=0 and QN=1.

21st Embodiment

Figure 60:
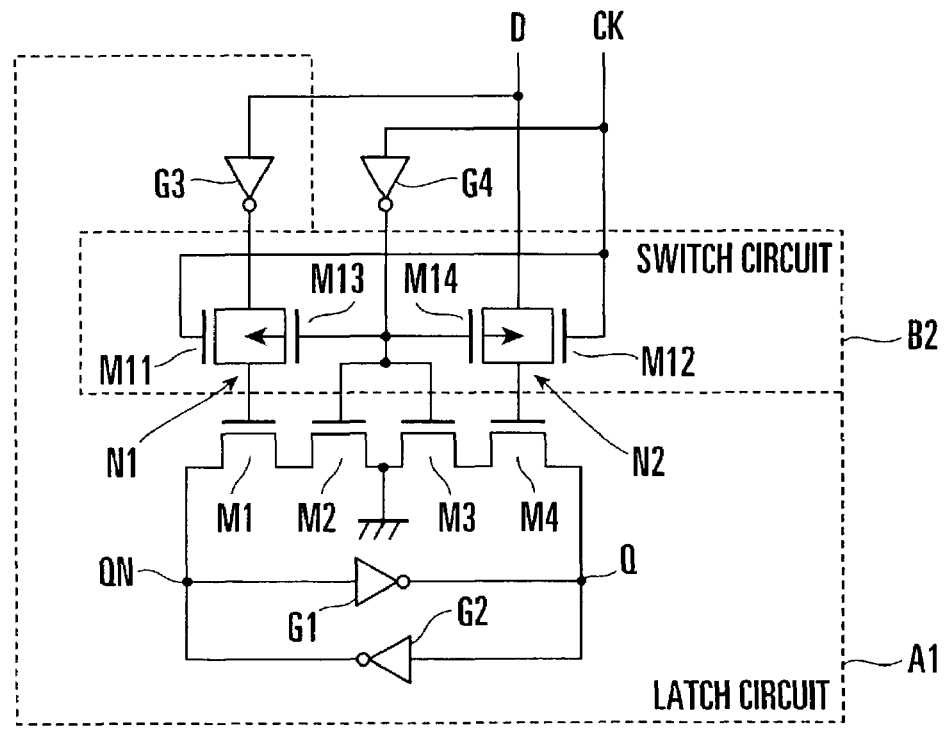
FIG. 60 is a circuit diagram of a flip-flop circuit using a RAM-type latch circuit as the 21st embodiment.

FIG. 60 shows a flip-flop circuit using a RAM-type latch circuit as the 21st embodiment of the present invention. The same reference numerals as in FIG. 57 denote the same parts in FIG. 60. In the flip-flop circuit shown in FIG. 60, PMOS transistors M13 and M14 are added to the flip-flop circuit shown in FIG. 57, thereby replacing MMOS transistors M11 and M12 which connect a data input to a RAM-type latch circuit with a CMOS transmission gate.

The MMOS transistor M11 and PMOS transistor M13 constitute a first CMOS transmission gate. The MMOS transistor M12 and PMOS transistor M14 constitute a second CMOS transmission gate. The drain terminal of the transistor M13 is connected to the output terminal of an inverter circuit G3. The source terminal of the transistor M13 is connected to the gate terminal of a transistor M1. A data signal D is input to the drain terminal of the transistor M14. The source terminal of the transistor M14 is connected to the gate terminal of a transistor M4.

The gate terminals of the transistors M13 and M14 are connected to the output terminal of an inverter circuit G4. While a clock signal CK is at high level, the transistors M11, M12, M13, and M14 are kept on. While the clock signal CK is at low level, the transistors M11, M12, M13, and M14 are kept off. Hence, the operation as a flip-flop circuit is the same as that shown in FIG. 57. In the flip-flop circuit shown in FIG. 60, when the CMOS transmission gates are used, the voltage amplitude at nodes N1 and N2 (the gate terminals of the transistors M1 and M4) can be set at the power supply potential. For this reason, the noise margin can be increased.

22nd Embodiment

Figure 61:
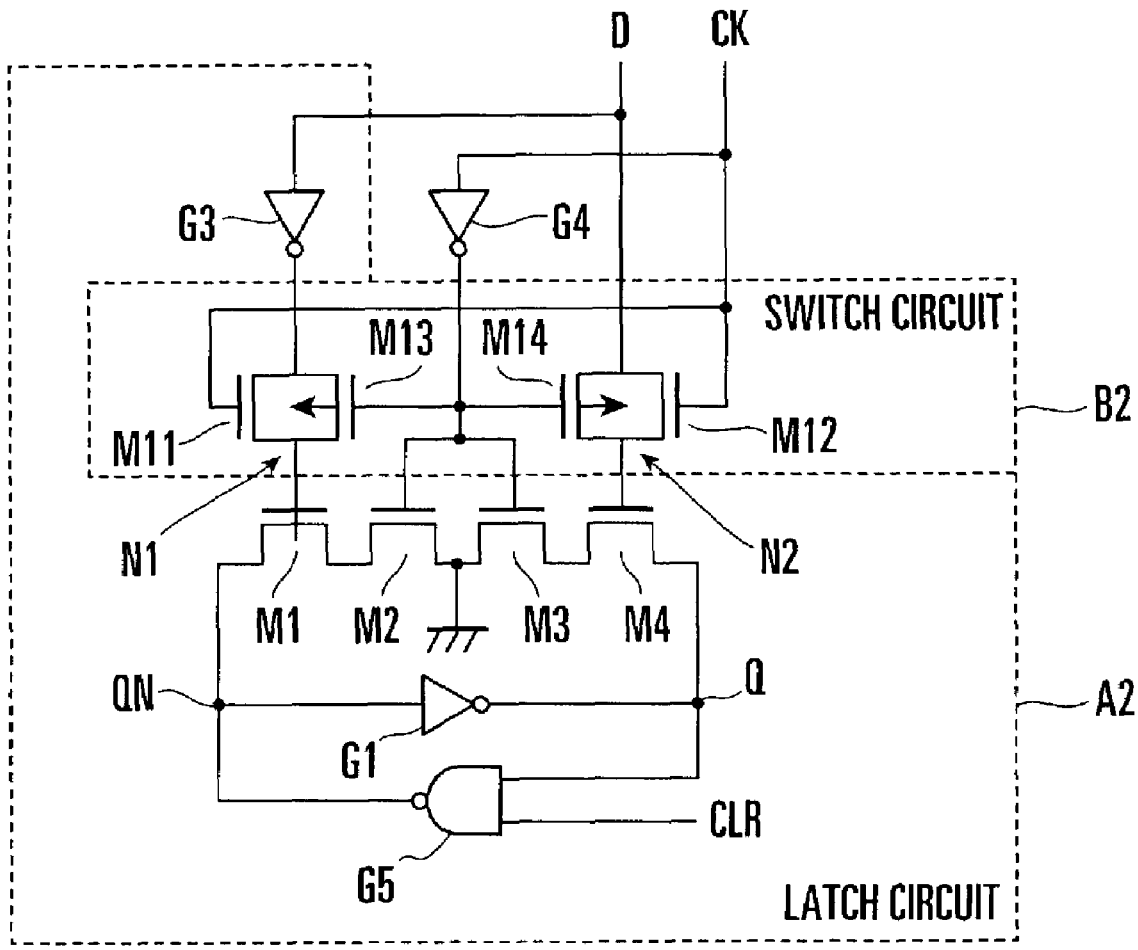
FIG. 61 is a circuit diagram of a flip-flop circuit using a RAM-type latch circuit as the 22nd embodiment.

FIG. 61 shows a flip-flop circuit using a RAM-type latch circuit as the 22nd embodiment of the present invention. The same reference numerals as in FIGS. 57 and 59 denote the same parts in FIG. 61. In the flip-flop circuit shown in FIG. 61, a 2-input NAND circuit G5 is used in place of an inverter circuit G2, and a clear input signal CLR is added to forcibly set the data stored in the data storage section to Q=0 and QN=1.

An inverter circuit G1 and the 2-input NAND circuit G5 constitute a data storage section. The connection point between the input terminal of the inverter circuit G1 and the output terminal of the 2-input NAND circuit G5 serves as a data storage node QN. The connection point between the output terminal of the inverter circuit G1 and one input terminal of the 2-input NAND circuit G5 serves as a data storage node Q. The clear input signal CLR is input to the other input terminal of the 2-input NAND circuit G5.

When the clear input signal CLR is set at logic value "1", the 2-input NAND circuit G5 executes the same operation as that of the inverter circuit G2. This operation is the same as described in the 21st embodiment. On the other hand, when the clear input signal CLR is set at logic value "0", the data storage node QN is fixed at logic value "1", and the data storage node Q is fixed at logic value "0". In this way, the data stored in the data storage section can be set to Q=0 and QN=1.

23rd Embodiment

FIG. 62 shows a flip-flop circuit using a RAM-type latch circuit as the 23rd embodiment of the present invention. FIGS. 63A to 63D show the operation of the flip-flop circuit shown in FIG. 62. FIG. 63A shows a data signal D. FIG. 63B shows a clock signal CK1. FIG. 63C shows a micropulse signal CK2. FIG. 63D shows the signal waveform at a data storage node Q.

Referring to FIG. 62, inverter circuits G11 and G12 and a 2-input NOR circuit G13 constitute a short pulse generating circuit (clock supply circuit) C1. The clock signal (third clock signal) CK1 shown in FIG. 63B is input to the input terminal of the inverter circuit G11. The output terminal of the inverter circuit G11 is connected to the input terminal of the inverter circuit G12. The output terminals of the inverter circuits G11 and G12 are connected to the two input terminals of the NOR circuit G13. The gate terminals of NMOS transistors M2 and M3 (to be described later) are connected to the output terminal of the NOR circuit G13. With this configuration, the short pulse generating circuit C1 receives the clock signal CK1 and generates the short pulse signal (fourth clock signal) CK2 shown in FIG. 63C at the positive edge of the clock signal CK1.

Referring to FIG. 62, inverter circuits G1 and G2 constitute a data storage circuit. The data storage circuit connects the input and output terminals at the data storage nodes Q and QN and stores data written through the data storage nodes.

An inverter G3 receives the data signal D and outputs its inversed signal.

NMOS transistors M1, M2, M3, and M4 constitute a data input control section. The NMOS transistors M1, M2, M3, and M4 are controlled by the data signal D or its inversed signal, or the short pulse signal CK2. The short pulse signal CK2 is input to the gate terminals of the transistors M2 and M3. The source terminals of the transistors M2 and M3 are connected to a ground electrode. The drain terminals are connected to the source terminals of the transistors M1 and M4. The inversed signal of the data signal D and the data signal D are connected to the gate terminals of the transistors M1 and M4, respectively. The drain terminals of the transistors M1 and M4 are connected to the data storage nodes QN and Q.

A flip-flop circuit consists of the above-described data storage circuit and data input control section.

In the short pulse generating circuit C1, the inversed signal of the clock signal CK1 and a signal obtained by delaying the inversed signal by the inverter circuit G12 are input to the 2-input NOR circuit G13. The moment the clock signal CK1 has changed from 0 to 1, both of the two input signals of the 2-input NOR circuit G13 can be set to 0 only during a short period. In accordance with this, the pulse signal CK2 having a very small time width can be generated. The timing charts shown in FIGS. 63A to 63D schematically indicate that the short pulse signal CK2 is generated at the positive edge of the clock signal CK1.

The data input control section made of the four NMOS transistors M1, M2, M3, and M4 switches the operation mode of a RAM-type latch circuit A1 between the storage mode and the transparent mode in accordance with the logic value of the short pulse signal CK2. Table 7 shows the correspondence between the logic values of the short pulse signal CK2, the ON/OFF states of the control devices (M1, M2, M3, and M4), and the operation modes of the RAM-type latch circuit A1.

TABLE 7

| CK2 | M1 | M2 | M3 | M4 | Latch Mode |
|---|---|---|---|---|---|
| 0 | — | off | off | — | Storage |
| 1 | — | on | on | — | Transparent |

In Table 7, the transparent mode corresponds to a case wherein the short pulse signal CK2 is at 1 (first level), and the storage mode corresponds to a case wherein the short pulse signal CK2 is at 0 (second level). Hence, when the short pulse signal CK2 is instantaneously switched as 0→1→0 at positive edges of the clock signal CK1 in the short pulse generating circuit C1, the RAM-type latch circuit A1 can be operated as the edge-triggered D-flip-flop of the clock signal CK1. As described above, in this embodiment, a latch circuit itself can be made compact by employing a RAM-type latch circuit, and the latch circuit can be operated as a flip-flop using the short pulse. For this reason, a flip-flop circuit more compact than before can be implemented.

The short pulse generating circuit only needs to generate the pulse signal CK2 at "1", which has a time width smaller than that of the clock signal CK1 at "1". Hence, the short pulse generating circuit may include a combinational logic function which receives the clock signal CK1 and a signal obtained by delaying the clock signal CK1 and outputs a signal at logic level different from that when the two signals are at the same logic level only while the two signals have different logic levels due to the delay.

24th Embodiment

Figure 64:
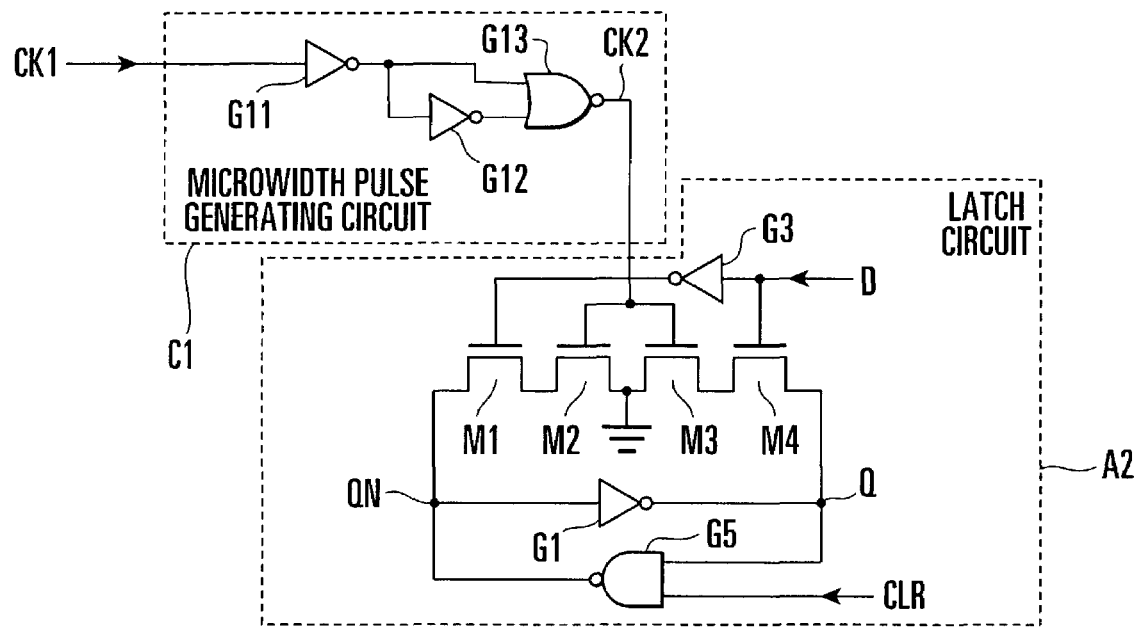
FIG. 64 is a circuit diagram of a flip-flop circuit using a RAM-type latch circuit as the 24th embodiment of the present invention.

FIG. 64 shows a flip-flop circuit using a RAM-type latch circuit as the 24th embodiment of the present invention. The flip-flop circuit shown in FIG. 64 is obtained by modifying the flip-flop circuit shown in FIG. 62. A clear input terminal CLR is added to set data stored in a data storage circuit to 0 at a data storage node Q.

More specifically, a data storage circuit consists of an inverter circuit G1 and 2-input NAND circuit G5. The output of the inverter circuit G1 and one input of the 2-input NAND circuit G5 are connected to the data storage node Q. The input of the inverter circuit G1 and the output of the 2-input NAND circuit G5 are connected to a data storage node QN. One input of the 2-input NAND circuit G5 is connected to the clear input terminal CLR. When a clear signal input to the clear input terminal CLR is set at logic value "0", the data stored in the data storage circuit can be set to 0 at the data storage node Q and 1 at the data storage node QN. When the circuit is to be operated as a flip-flop, the clear signal input to the clear input terminal CLR is set at logic value "1".

25th Embodiment

Figure 65:
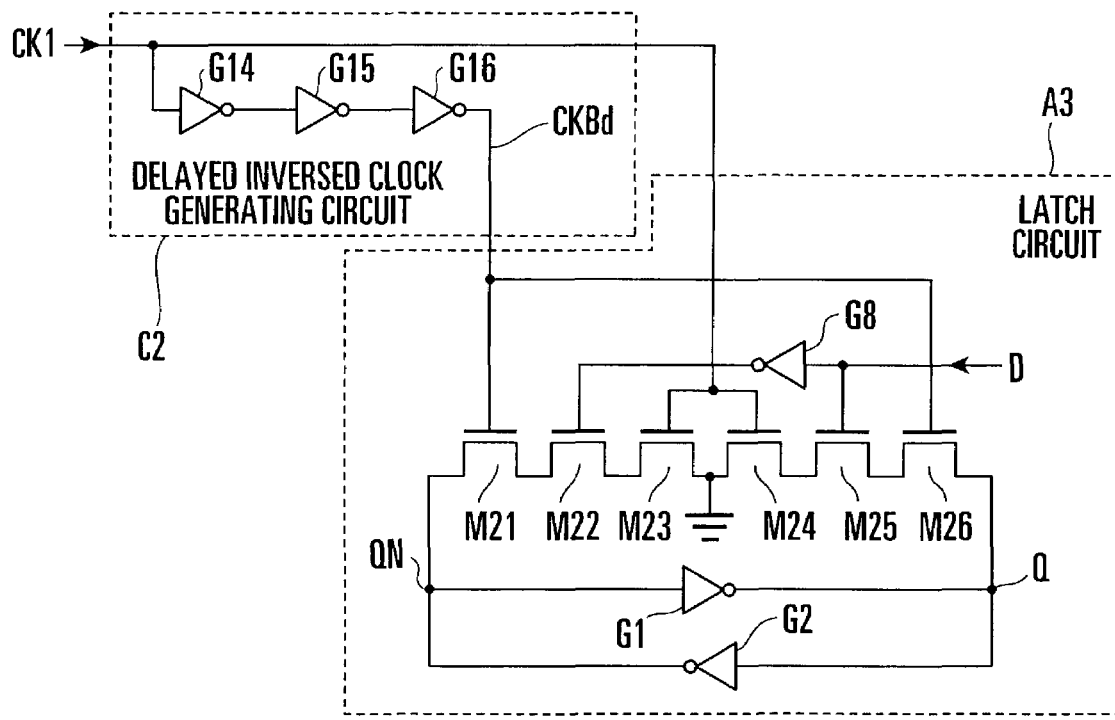
FIG. 65 is a circuit diagram of a flip-flop circuit using a RAM-type latch circuit as the 25th embodiment of the present invention.

FIG. 65 shows a flip-flop circuit using a RAM-type latch circuit as the 25th embodiment of the present invention. FIGS. 66A to 66D show the operation of the flip-flop circuit shown in FIG. 65. FIG. 66A shows a data signal D. FIG. 66B shows a clock signal CK1. FIG. 66C shows a clock signal CKBd. FIG. 66D shows the signal waveform at a data storage node Q.

Referring to FIG. 65, inverter circuits G14, G15, and G16 construct a delayed inversed clock generating circuit C2. The delayed inversed clock generating circuit C2 has a structure in which the inverter circuits G14, G15, and G16 are connected in series. The delayed inversed clock generating circuit C2 receives the clock signal (third clock signal) CK1 and outputs the clock signal (fourth clock signal) CKBd obtained by delaying and inverting the clock signal CK1. The delayed inversed clock generating circuit may have a structure in which an odd number of inverter circuits are connected in series.

Inverter circuits G1 and G2 constitute a data storage circuit, like the flip-flop circuit shown in FIG. 62. The data storage circuit connects the input and output terminals at the data storage nodes Q and QN and stores data written through the data storage nodes. An inverter G8 receives the data signal D and outputs its inversed signal.

NMOS transistors M21, M22, M23, M24, M25, and M26 constitute a data input control section. The NMOS transistors M21, M22, M23, M24, M25, and M26 are controlled by the data signal D, its inversed signal, the clock signal CK1, or its delayed and inversed clock signal CKBd. The clock signal CK1 is input to the gate terminals of the transistors M23 and M24 as the first input signal. The source terminals of the transistors M23 and M24 are connected to a ground electrode. The drain terminals of the transistors M23 and M24 are connected to the source terminals of the transistors M22 and M25, respectively. The inversed signal of the data signal D and the data signal D are connected to the gate terminals of the transistors M22 and M25, respectively. The drain terminals of the transistors M22 and M25 are connected to the source terminals of the transistors M21 and M26. The clock signal CKBd is input to the gate terminals of the transistors M21 and M26 as the second input signal. The drain terminals of the transistors M21 and M26 are connected to the data storage nodes QN and Q.

In the delayed inversed clock generating circuit C2, the clock signal CK1 is input to the inverter circuit chain of three stages, and the delayed and inverted clock signal CKBd is generated as the output from the inverter circuit chain. FIGS. 66A to 66D schematically show the timing relationship between the clock signals CK1 and CKBd.

The data input control section made of the six NMOS transistors M21, M22, M23, M24, M25, and M26 switches the operation mode of a RAM-type latch circuit A3 between the storage mode and the transparent mode in accordance with the logic values of the clock signals CK1 and CKBd. Table 8 shows the correspondence between the logic values of the clock signals CK1 and CKBd, the ON/OFF states of the devices, and the operation modes of the latch circuit.

TABLE 8

| CK1 | CKBd | M1 | M2 | M3 | M4 | M5 | M6 | Latch Mode |
| --- | --- | --- | --- | --- | --- | --- | --- | --- |
| 0 | 1 | on | — | off | off | — | on | Storage |
| 1 | 1 | on | — | on | on | — | on | Transparent |
| 1 | 0 | off | — | on | on | — | off | Storage |
| 0 | 0 | off | — | off | off | — | off | Storage |

In Table 8, the transparent mode corresponds to a case wherein both the clock signals CK1 and CKBd are at logic value "1" (first level). The storage mode corresponds to all cases other than the transparent mode, i.e., a case wherein at least one of the clock signals CK1 and CKBd is at logic value "0" (second level). Hence, as shown in the timing charts of FIGS. 66A to 66D, switching between the transparent mode and the storage mode can easily be realized by generating the clock signal CKBd by delaying and inverting the original clock signal CK1 and making a timing at which both the clock signals are set at 1. Hence, the short pulse generating circuit C1 as in the flip-flop circuit shown in FIG. 62 can be omitted, and an additional circuit for generating an internal clock signal can be made small. For this reason, the entire flip-flop circuit can be made compact.

26th Embodiment

FIG. 67 shows a flip-flop circuit using a RAM-type latch circuit as the 26th embodiment of the present invention. The flip-flop circuit shown in FIG. 67 is obtained by modifying the flip-flop circuit shown in FIG. 65. A clear input terminal CLR is added to set data stored in a data storage circuit to 0 at a data storage node Q.

More specifically, a data storage circuit consists of an inverter circuit G1 and 2-input NAND circuit G5. The output of the inverter circuit G1 and one input of the 2-input NAND circuit G5 are connected to the data storage node Q. The input of the inverter circuit G1 and the output of the 2-input NAND circuit G5 are connected to a data storage node QN. One input of the 2-input NAND circuit G5 is connected to the clear input terminal CLR. When a clear signal input to the clear input terminal CLR is set at logic value "0", the data stored in the data storage circuit can be set to 0 at the data storage node Q and 1 at the data storage node QN. When the circuit is to be operated as a flip-flop, the clear signal input to the clear input terminal CLR is set at logic value "1".

27th Embodiment

Figure 68:
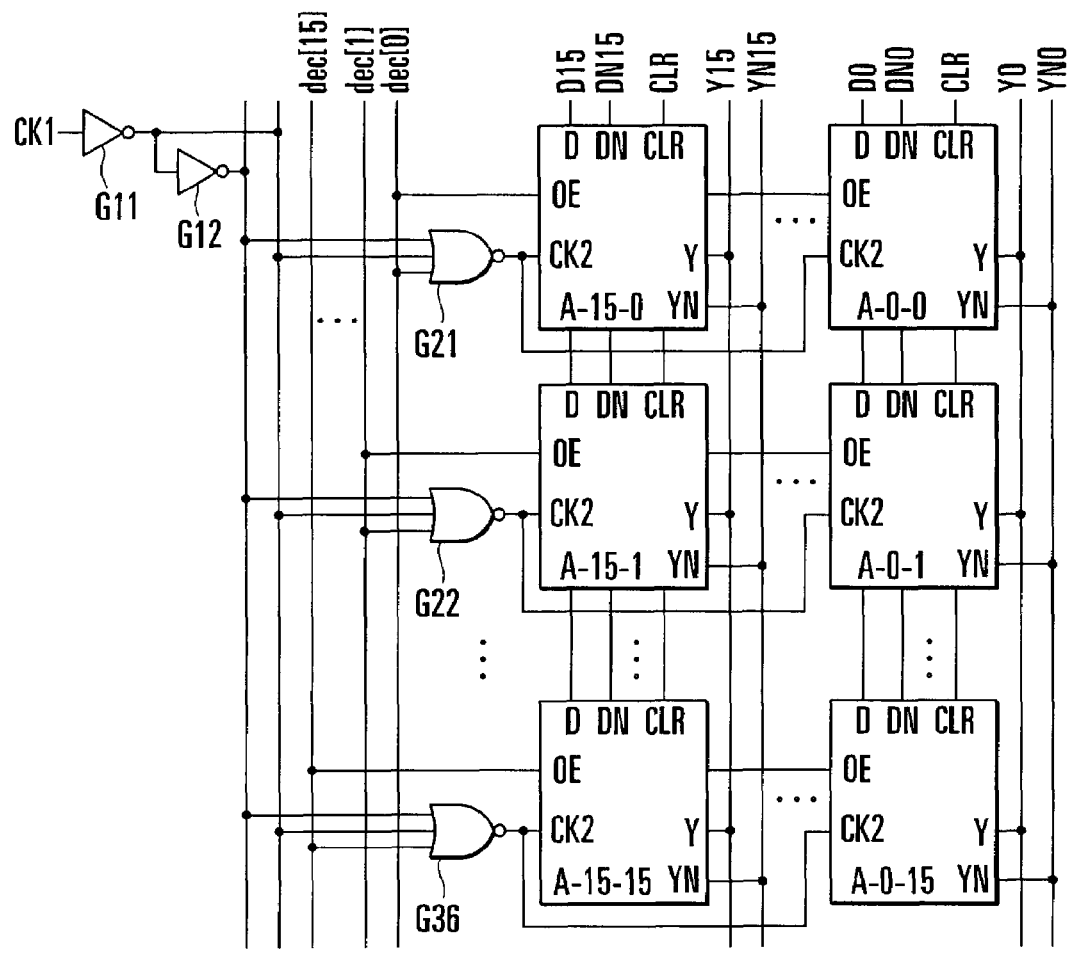
FIG. 68 is a circuit diagram of the overall arrangement of a register file using a RAM-type latch circuit as the 27th embodiment of the present invention.

FIG. 68 shows the overall arrangement of a register file using a RAM-type latch circuit as the 27th embodiment of the present invention. A register file having 16 registers each having a 16-bit width is shown as an example. Circuit blocks A-0-0 to A-15-15 represent RAM-type latch circuits. Referring to FIG. 68, 16 RAM-type latch circuits laid out in a row direction constitute one 16-bit register, and 16 registers are arranged in the column direction. Referring to FIG. 68, a short pulse signal generating circuit consists of inverter circuits G11 and G12 and one of 3-input NOR circuits G21, G22, ..., G36. This short pulse signal generating circuit generates a pulse CK2 having a small width from a clock signal CK1 and supplies the pulse to RAM-type latch circuits AX (X=0-0 to 15-15). The 3-input NOR circuits G21, G22, ..., G36 receive decode signals dec[0], dec[1], ..., dec[15], respectively, to control a register in which data given by {D15, DN15, ..., D0, DN0} is to be written.

Figure 69:
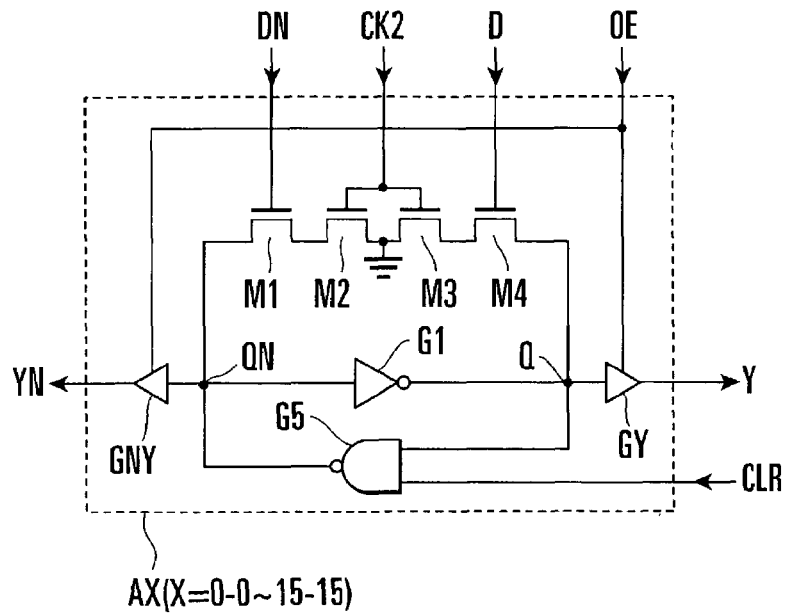
FIG. 69 is a circuit diagram showing the arrangement of a RAM-type latch circuit AX with a clear terminal, which is used for the register file shown in FIG. 68.

FIG. 69 shows the configuration of the RAM-type latch circuit AX (X=0-0 to 15-15) with a clear terminal, which is used for the register file shown in FIG. 68. This RAM-type latch circuit AX (X=0-0 to 15-15) is the same as that used in the flip-flop circuit shown in FIG. 64, and a detailed description thereof will be omitted. Output gates GY and GYN output data stored at data storage nodes Q and QN to external bus Y and YN, respectively, in accordance with a read signal from a read control terminal OE. When OE=1, data is output. When OE=0, a high impedance is output. This also applies to the following embodiments.

In the register file shown in FIG. 68, a register to which data is to be written is specified by the decode signals dec[0], dec[1], ..., dec[15], and the clock signal CK1 is raised whereby a set value can be applied to data input terminals D and DN of the RAM-type latch circuit AX on the specified register. With the short pulse signal CK2, the individual RAM-type latch circuits AX (X=0-0 to 15-15) can be used as flip-flops for storing data at the positive edge of the clock signal CK1.

In the register file shown in FIG. 68, part of the short pulse generating circuit and the decoding circuit can be shared. In addition, the storage circuit element can be made compact by using a RAM-type latch circuit. Hence, as compared to a conventional circuit which combines a master-slave flip-flop circuit and a decoder circuit, the circuit scale of the entire register file can be reduced.

28th Embodiment

Figure 70:
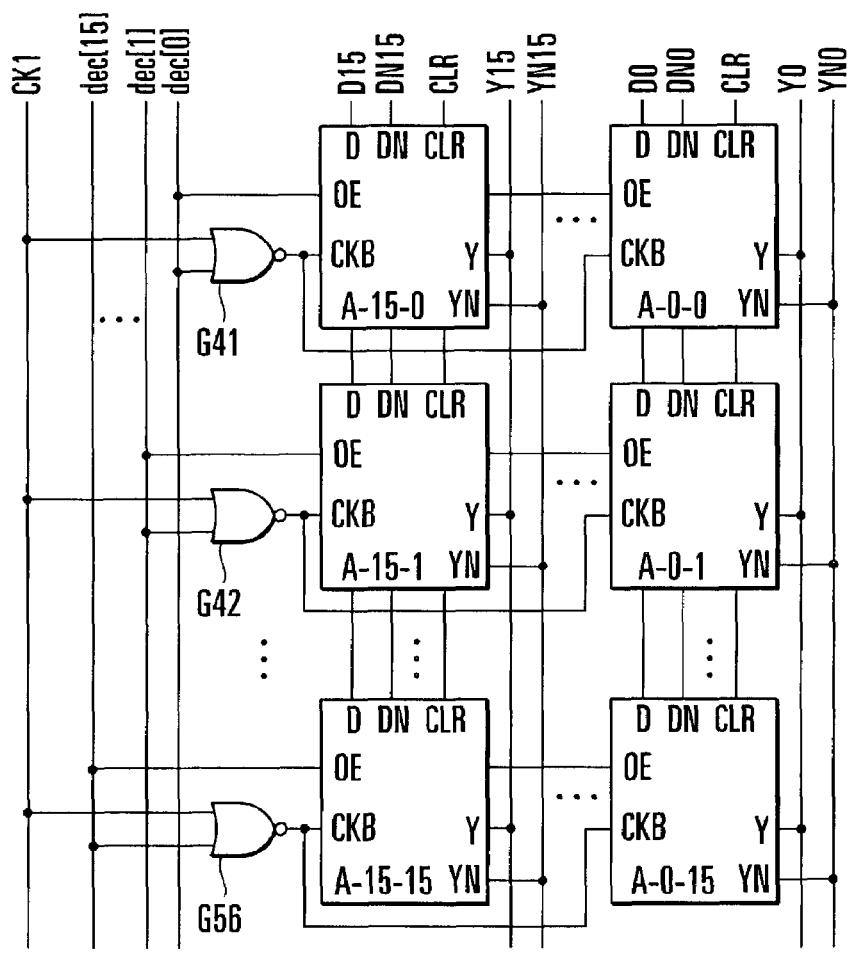
FIG. 70 is a circuit diagram showing the overall arrangement of a register file using a RAM-type latch circuit as the 28th embodiment of the present invention.

FIG. 70 shows the overall arrangement of a register file using a RAM-type latch circuit as the 28th embodiment of the present invention. A register file having 16 registers each having a 16-bit width is shown as an example. Circuit blocks A-0-0 to A-15-15 represent RAM-type latch circuits. Referring to FIG. 70, 16 flip-flop circuits laid out in a row direction constitute one 16-bit register, and 16 registers are arranged in the column direction. In addition, 2-input NOR circuits G41, G42, ..., G56 validate or invalidate a supplied clock signal CK according to the decode signals dec[0], dec[1], ..., dec[15], respectively, and deliver the resulting clock signal to a register on a row in which data is to be written.

Figure 71:
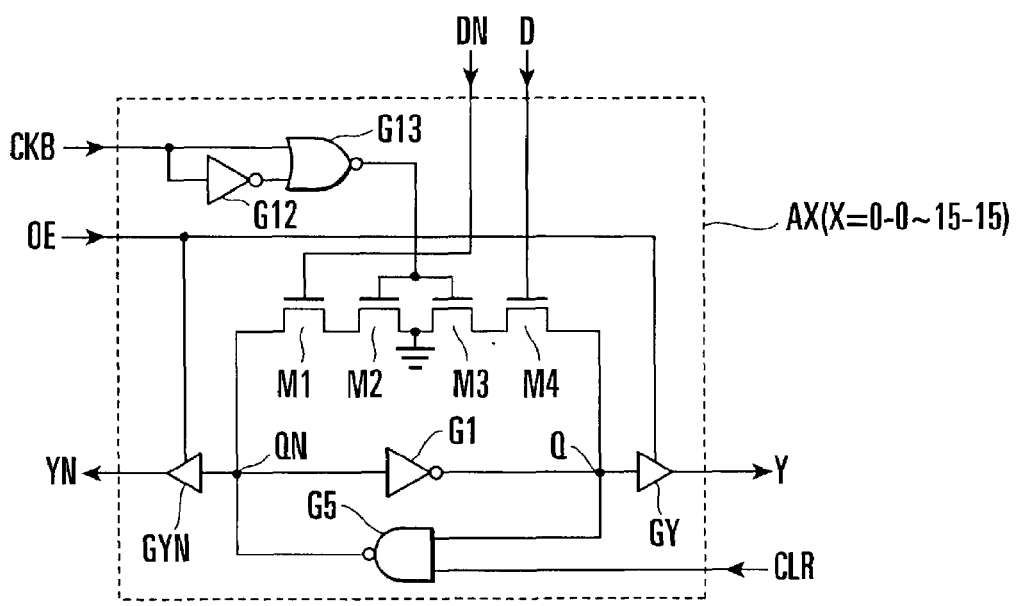
FIG. 71 is a circuit diagram showing a flip-flop circuit used for the register file shown in FIG. 70.

FIG. 71 shows the flip-flop circuit used for the register file shown in FIG. 70. For the flip-flop circuit shown in FIG. 71, the flip-flop circuit shown in FIG. 64 is modified such that data is stored at the negative edge of a clock signal CKB.

In the register file shown in FIG. 70, a register on a row to which data is to be written is specified by the decode signals dec[0], dec[1], ..., dec[15], and a clock signal CK is raised whereby a set value can be applied to data input terminals D and DN of a RAM-type latch circuit AX on the specified register. Since a flip-flop circuit using a RAM-type latch circuit is compact, the occupied area of the entire register file can be reduced as compared to a conventional circuit using a master-slave flip-flop circuit.

29th Embodiment

Figure 72:
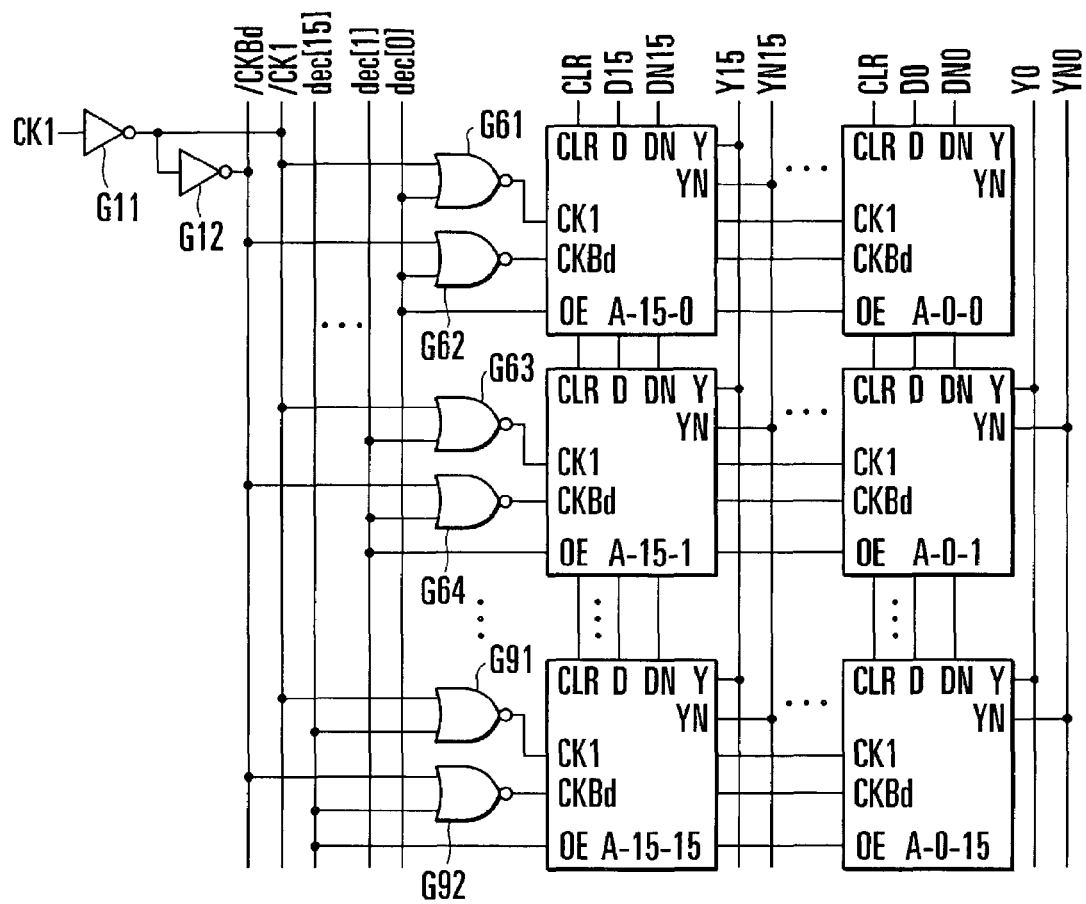
FIG. 72 is a circuit diagram showing the overall arrangement of a register file using a RAM-type latch circuit as the 29th embodiment of the present invention.

FIG. 72 shows the overall arrangement of a register file using a RAM-type latch circuit as the 29th embodiment of the present invention. A register file having 16 registers each having a 16-bit width is shown as an example. Circuit blocks A-0-0 to A-15-15 represent RAM-type latch circuits. Referring to FIG. 72, 16 latch circuits laid out in a row direction constitute one 16-bit register, and 16 registers are arranged in the column direction. Inverter circuits G11 and G12 and 2-input NOR circuits G61, G62 to G91, and G92 (a total of 16 sets of 2-input NOR circuits including a set of, e.g., 2-input NOR circuits G61 and G62) constitute a delayed inversed clock signal generating circuit. A clock signal CKBd is generated by delaying and inverting a clock signal CK1 and supplied to latch circuits AX (X=0-0 to 15-15). The 2-input NOR circuits G61, G62 to G91, and G92 receive decode signals dec[0], dec[1], ..., dec[15] and validate or invalidate /CK (logical inversed value of CK) and /CKBd (logical inversed value of CKBd) and supply the resulting clock signals CK1 and CKBd to the RAM-type latch circuits AX (X=0-0 to 15-15).

Figure 73:
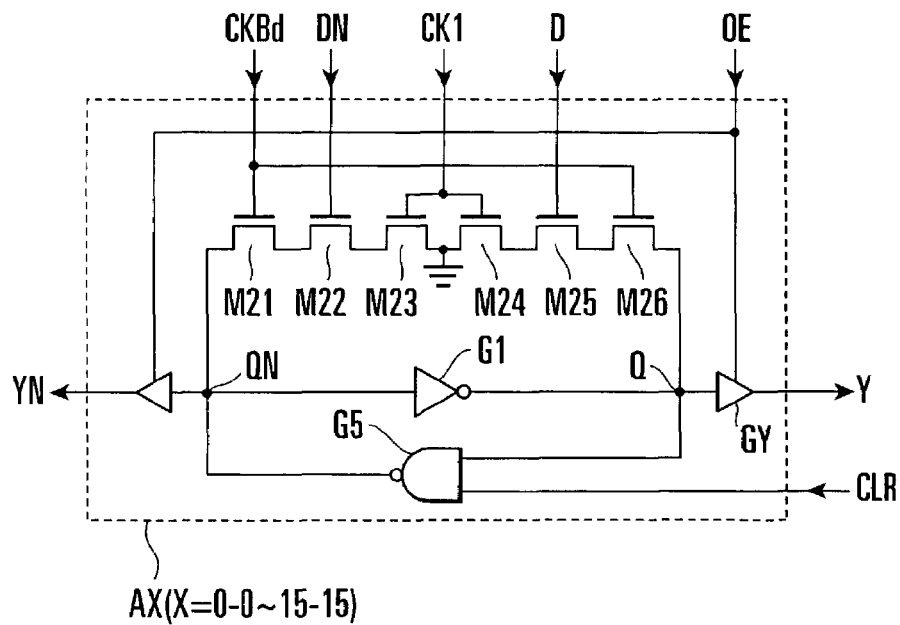
FIG. 73 is a circuit diagram showing the arrangement of a RAM-type latch circuit AX with a clear terminal, which is used for a register file shown in FIG. 72.

FIG. 73 shows the configuration of the RAM-type latch circuit AX (X=0-0 to 15-15) with a clear terminal, which is used for the register file. This RAM-type latch circuit AX (X=0-0 to 15-15) is the same as that used in the flip-flop circuit shown in FIG. 67, and a detailed description thereof will be omitted.

In the register file shown in FIG. 72, a register on a row to which data is to be written is specified by the decode signals dec[0], dec[1], ..., dec[15], and the clock signal CK1 is raised whereby a set value can be applied to data input terminals D and DN of the RAM-type latch circuit AX on that register. In the register file shown in FIG. 72, two clock signals having different timings and polarities are generated and supplied to the RAM-type latch circuits. Hence, the RAM-type latch circuit can be used as a flip-flop for storing data at the positive edge of the clock signal CK1.

In the register file arrangement shown in FIG. 72, part of the delayed inversed clock generating circuit and the decoding circuit can be shared. In addition, the storage circuit element can be made compact by using a RAM-type latch circuit. Hence, as compared to a conventional circuit which combines a master-slave flip-flop circuit and a decoder circuit, the circuit scale of the entire register file can be reduced.

30th Embodiment

Figure 74:
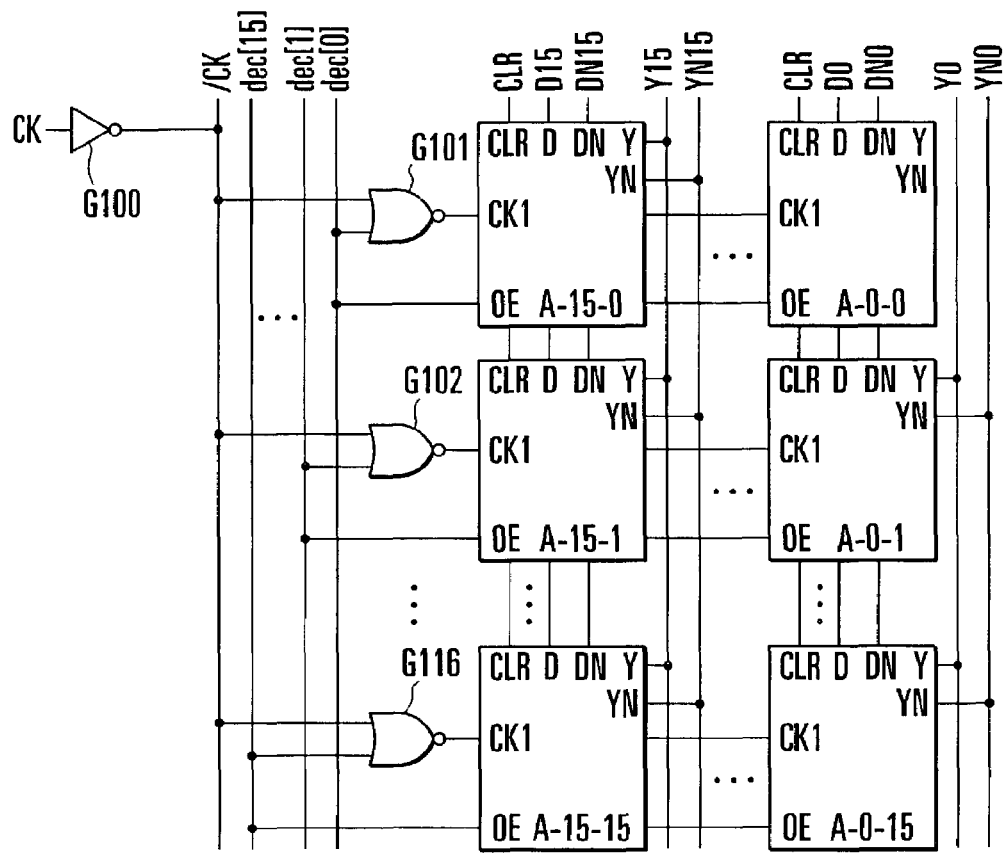
FIG. 74 is a circuit diagram showing the overall arrangement of a register file using a RAM-type latch circuit as the 30th embodiment of the present invention.

FIG. 74 shows the overall arrangement of a register file using a RAM-type latch circuit as the 30th embodiment of the present invention. A register file having 16 registers each having a 16-bit width is shown as an example. Circuit blocks A-0-0 to A-15-15 represent RAM-type latch circuits. Referring to FIG. 74, 16 flip-flop circuits laid out in a row direction constitute one 16-bit register, and 16 registers are arranged in the column direction. Two-input NOR circuits G101, G102, . . . , G106 validate or invalidate a clock signal/CK according to decode signals dec[0], dec[1], . . . , dec[15] and delivers the resulting clock signal to a register on a row to which data is to be written.

Figure 75:
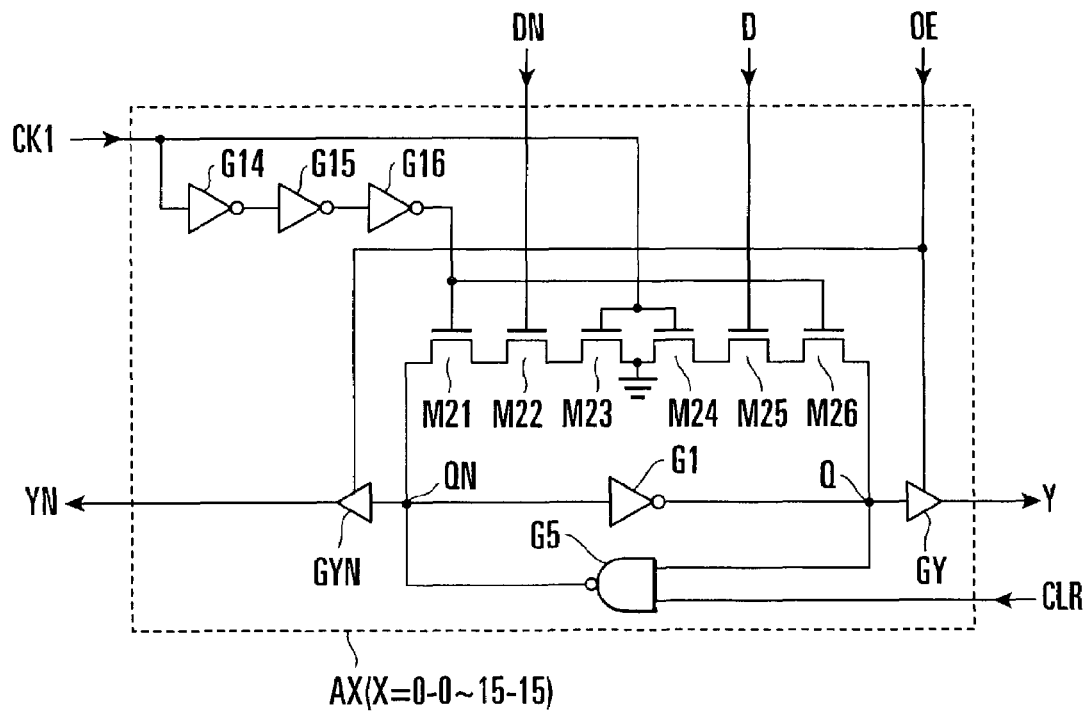
FIG. 75 is a circuit diagram showing a flip-flop circuit used for the register file shown in FIG. 74.
Figure 76A:
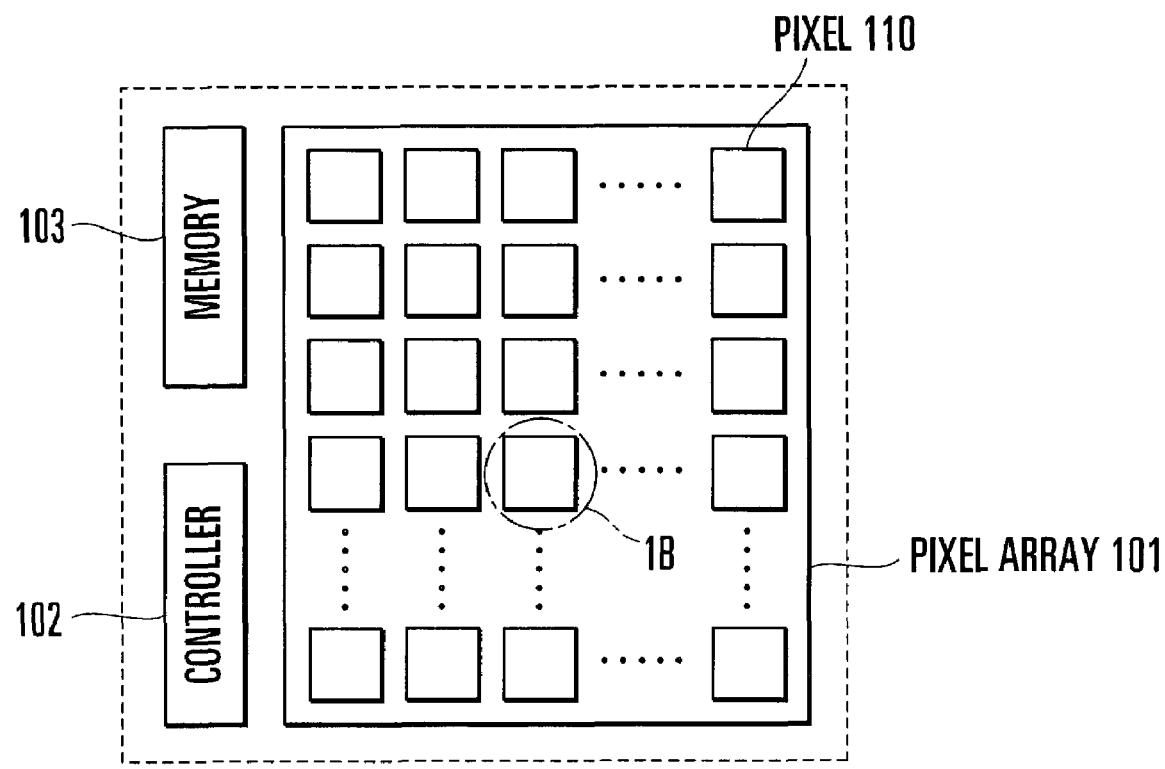
FIG. 76A is a block diagram for explaining the background art of a parallel processing logic circuit.
Figure 76B:
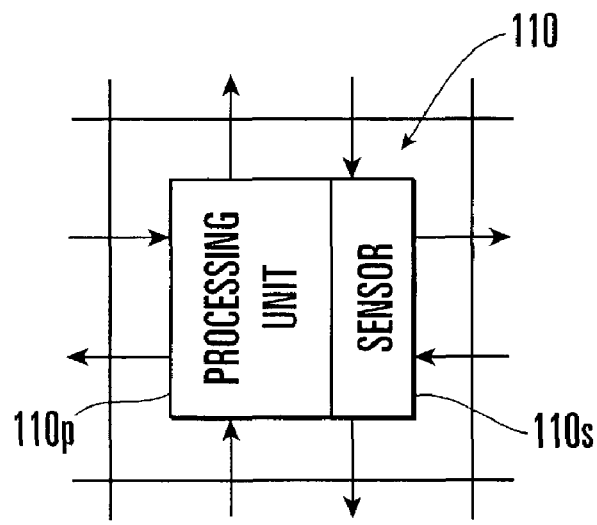
FIG. 76B is a block diagram showing the configuration of a pixel indicated by a dotted circle in FIG. 76A.

FIG. 75 shows the configuration of the flip-flop circuit used for the register file shown in FIG. 74. This flip-flop circuit is the same as that shown in FIG. 67, and a detailed description thereof will be omitted.

In the register file shown in FIG. 74, a register on a row to which data is to be written is specified by the decode signals dec[0], dec[1], . . . , dec[15], and the clock signal CK is raised whereby a set value can be applied to data input terminals D and DN of a flip-flop circuit on the specified register. Since a flip-flop circuit using a RAM-type latch circuit is compact, the occupied area of the entire register file can be reduced as compared to a conventional circuit using a master-slave flip-flop circuit.

As described above, in this embodiment, a RAM-type latch circuit is used as a basic latch circuit, thereby making it possible to instantaneously change the latch mode between the storage and transparent using two clock signals with different timings. The clock supply circuit for delivering a clock signal to a latch circuit only needs to generate the third clock signal simply by delaying and inverting the first clock signal. No short pulse need be generated. Thus, when this configuration is employed, the latch circuit can be made compact, and the clock supply circuit can be simplified. For this reason, the flip-flop circuit can be made compact. So, the entire digital integrated circuit that contains the flip-flop can be made compact.

What is claimed is:

1. A parallel processing logic circuit for sensor signal processing, comprising:
sensors laid out in a matrix; and
a processing unit which corresponds to each sensor and executes logic function on the basis of binary data from each sensor,
wherein said processing unit comprises operation means for receiving the binary data output from said sensor, binary data output from said processing unit, and binary data output from another processing unit, exclusively executing only predetermined combinational logic function and combinational logic function as a dual logic function of the predetermined combinational logic function, and outputting binary data as an execution result to said another processing unit.

2. A circuit according to claim 1, wherein said processing unit comprises
a combinational logic function having a first logic circuit which executes the predetermined combinational logic function, a second logic circuit which executes the combinational logic function as the dual logic function of the predetermined combinational logic function, and a control circuit which exclusively switches the usable logic function in the unit between said first logic circuit and said second logic circuit, and
a storage circuit which stores the binary data as the execution result by said combinational logic function and outputs the stored binary data to said another processing unit.

3. A circuit according to claim 1, wherein
said processing unit comprises
a first logic circuit which receives the binary data output from said sensor, the binary data output from said processing unit, and the binary data output from said another processing unit and selectively executes two kinds of logic functions,
a storage circuit which stores binary data output from said first logic circuit, and
a second logic circuit which selectively executes two kinds of logic functions for binary data output from said storage circuit and outputs binary data as an execution result to said another processing units, and
said processing unit further comprises control means for switching, by a control signal, both the logic functions executed by said second logic circuit of said processing unit and by said first logic circuit of said another processing unit which receives an output from said processing unit, and controlling exclusive execution of the predetermined combinational logic function and the combinational logic function as the dual logic function of the predetermined combinational logic function.

4. A circuit according to claim 2, wherein
said processing unit has a plurality of storage circuits and a first selection circuit which selects a storage circuit from said plurality of storage circuits and causes the selected storage circuit to store the execution result by said combinational logic function, and
at least one of binary data stored in said plurality of storage circuits is output to said another processing unit.

5. A circuit according to claim 3, wherein
said processing unit has a plurality of storage circuits and a first selection circuit which selects a storage circuit from said plurality of storage circuits and causes the selected storage circuit to store the execution result by said first logic circuit, and
at least one of binary data stored in said plurality of storage circuits is output to said second logic circuit.

6. A circuit according to claim 4, wherein said processing unit further comprises a second selection circuit which selects binary data to be input to said combinational logic function from the plurality of binary data output from said plurality of storage circuits.

7. A circuit according to claim 5, wherein said processing unit further comprises a second selection circuit which selects binary data to be input to said first logic circuit from the plurality of binary data output from said plurality of storage circuits.

8. A circuit according to claim 6, wherein said operation means of said processing unit comprises means for exclusively executing and outputting the predetermined combinational logic function, the combinational logic function as the dual logic function of the predetermined combinational logic function, an OR of two arbitrary binary data in the plurality of binary data from said plurality of storage circuits of said processing unit, and an AND of a logical NOT of one of the two binary data and the other binary data.

9. A circuit according to claim 7, wherein said operation means of said processing unit comprises means for exclusively executing and outputting the predetermined combinational logic function, the combinational logic function as the dual logic function of the predetermined combinational logic function, an OR of two arbitrary binary data in the plurality of binary data from said plurality of storage circuits of said processing unit, and an AND of a logical NOT of one of the two binary data and the other binary data.

10. A circuit according to claim 6, wherein said second selection circuit of said processing unit selectively inputs binary data from an external data input terminal of said processing unit to said combinational logic function of said processing unit.

11. A circuit according to claim 7, wherein said second selection circuit of said processing unit selectively inputs binary data from an external data input terminal of said processing unit to said first logic circuit of said processing unit.

12. A circuit according to claim 8, wherein said second selection circuit of said processing unit selectively inputs binary data from an external data input terminal of said processing unit to said combinational logic function of said processing unit.

13. A circuit according to claim 9, wherein said second selection circuit of said processing unit selectively inputs binary data from an external data input terminal of said processing unit to said first logic circuit of said processing unit.

14. A circuit according to claim 8, wherein said combinational logic function of said processing unit comprises switching means for switching between a valid state and an invalid state of the binary data input from said storage circuit of said processing unit and the binary data input from said another processing unit in accordance with a logic modification signal commonly input from an outside of said processing unit.

15. A circuit according to claim 9, wherein said first logic circuit of said processing unit comprises switching means for switching between a valid state and an invalid state of the binary data input from said storage circuit of said processing unit and the binary data input from said another processing unit in accordance with a logic modification signal commonly input from an outside of said processing unit.

16. A circuit according to claim 10, wherein said combinational logic function of said processing unit comprises switching means for switching between a valid state and an invalid state of the binary data input from said storage circuit of said processing unit, the binary data input from said another processing unit, and the binary data input from said external data input terminal in accordance with a logic modification signal commonly input from an outside of said processing unit.

17. A circuit according to claim 11, wherein said first logic circuit of said processing unit comprises switching means for switching between a valid state and an invalid state of the binary data input from said storage circuit of said processing unit, the binary data input from said another processing unit, and the binary data input from said external data input terminal in accordance with a logic modification signal commonly input from an outside of said processing unit.

18. A circuit according to claim 12, wherein said combinational logic function of said processing unit comprises switching means for switching between a valid state and an invalid state of the binary data input from said storage circuit of said processing unit, the binary data input from said another processing unit, and the binary data input from said external data input terminal in accordance with a logic modification signal commonly input from an outside of said processing unit.

19. A circuit according to claim 13, wherein said first logic circuit of said processing unit comprises switching means for switching between a valid state and an invalid state of the binary data input from said storage circuit of said processing unit, the binary data input from said another processing unit, and the binary data input from said external data input terminal in accordance with a logic modification signal commonly input from an outside of said processing unit.

20. A circuit according to claim 10, wherein
for said plurality of processing units laid out in the matrix, a first control signal line is commonly connected to each column, and a second control signal line is commonly connected to each row, and
said processing unit comprises means for updating a content of said storage circuit on the basis of a combination of control signals supplied to the first and second control signal lines connected.

21. A circuit according to claim 11, wherein
for said plurality of processing units laid out in the matrix, a first control signal line is commonly connected to each column, and a second control signal line is commonly connected to each row, and
said processing unit comprises means for updating a content of said storage circuit on the basis of a combination of control signals supplied to the first and second control signal lines connected.

22. A circuit according to claim 12, wherein
for said plurality of processing units laid out in the matrix, a first control signal line is commonly connected to each column, and a second control signal line is commonly connected to each row, and
said processing unit comprises means for updating a content of said storage circuit on the basis of a combination of control signals supplied to the first and second control signal lines connected.

23. A circuit according to claim 13, wherein
for said plurality of processing units laid out in the matrix, a first control signal line is commonly connected to each column, and a second control signal line is commonly connected to each row, and
said processing unit comprises means for updating a content of said storage circuit on the basis of a combination of control signals supplied to the first and second control signal lines connected.

24. A circuit according to claim 16, wherein
for said plurality of processing units laid out in the matrix, a first control signal line is commonly connected to each column, and a second control signal line is commonly connected to each row, and
said processing unit comprises means for updating a content of said storage circuit on the basis of a combination of control signals supplied to the first and second control signal lines connected.

25. A circuit according to claim 17, wherein
for said plurality of processing units laid out in the matrix, a first control signal line is commonly connected to each column, and a second control signal line is commonly connected to each row, and
said processing unit comprises means for updating a content of said storage circuit on the basis of a combination of control signals supplied to the first and second control signal lines connected.

26. A circuit according to claim 18, wherein
for said plurality of processing units laid out in the matrix,
a first control signal line is commonly connected to each column, and a second control signal line is commonly connected to each row, and
said processing unit comprises means for updating a content of said storage circuit on the basis of a combination of control signals supplied to the first and second control signal lines connected.

27. A circuit according to claim 19, wherein
for said plurality of processing units laid out in the matrix,
a first control signal line is commonly connected to each column, and a second control signal line is commonly connected to each row, and
said processing unit comprises means for updating a content of said storage circuit on the basis of a combination of control signals supplied to the first and second control signal lines connected.

28. A circuit according to claim 1, wherein said processing unit executes morphological processing by exclusively executing the predetermined combinational logic operation and the combinational logic operation as the dual logic function of the predetermined combinational logic operation.

29. A circuit according to claim 2, wherein
said processing unit comprises
a first register which is included in said storage circuit, stores the binary data output from said combinational logic function, and outputs the stored binary data to said another processing unit,
a shift register which is included in said storage circuit and in which a plurality of registers storing binary data are cascade-connected, and an output terminal of the register at a last stage is connected to an input terminal of the register at a first stage, and
a third selection circuit which selectively connects, to an input terminal of an arbitrary one of the plurality of registers which constitute said shift register, one of an output terminal of a register immediately preceding the arbitrary register and an output terminal of said first register, and
one of the binary data stored in the plurality of registers which constitute said shift register is input to said combinational logic function.

30. A circuit according to claim 3, wherein
said processing unit comprises
a first register which is included in said storage circuit, stores the binary data output from said first logic circuit, and outputs the stored binary data to said second logic circuit,
a shift register which is included in said storage circuit and in which a plurality of registers storing binary data are cascade-connected, and an output terminal of the register at a last stage is connected to an input terminal of the register at a first stage, and
a third selection circuit which selectively connects, to an input terminal of an arbitrary one of the plurality of registers which constitute said shift register, one of an output terminal of a register immediately preceding the arbitrary register and an output terminal of said first register, and
one of the binary data stored in the plurality of registers which constitute said shift register is input to said first logic circuit.

31. A circuit according to claim 2, wherein
said processing unit comprises
a shift register which is included in said storage circuit and in which a plurality of registers storing binary data are cascade-connected, and an output terminal of the register at a last stage is connected to an input terminal of the register at a first stage,
a first register which is included in said storage circuit, stores one of the binary data stored in the plurality of registers which constitute said shift register, and outputs the stored binary data to said combinational logic function, and
a third selection circuit which selectively connects, to an input terminal of an arbitrary one of the plurality of registers which constitute said shift register, one of an output terminal of a register immediately preceding the arbitrary register and an output terminal of said combinational logic function, and
the binary data stored in the register at the last stage of the shift register is output to said another processing unit.

32. A circuit according to claim 3, wherein
said processing unit comprises
a shift register which is included in said storage circuit and in which a plurality of registers storing binary data are cascade-connected, and an output terminal of the register at a last stage is connected to an input terminal of the register at a first stage,
a first register which is included in said storage circuit, stores one of the binary data stored in the plurality of registers which constitute said shift register, and outputs the stored binary data to said first logic circuit, and
a third selection circuit which selectively connects, to an input terminal of an arbitrary one of the plurality of registers which constitute said shift register, one of an output terminal of a register immediately preceding the arbitrary register and an output terminal of said first logic circuit, and
the binary data stored in the register at the last stage of the shift register is output to said second logic circuit.

33. A circuit according to claim 2, wherein said storage circuit of said processing unit includes a RAM-type latch circuit which receives a data signal delivered to a data input terminal when an input signal is at a first level and stores the received data signal when the input signal is at a second level.

34. A circuit according to claim 33, wherein
the input signal is a first clock signal,
said storage circuit further comprises a switch circuit which electrically disconnects the data signal from said data input terminal when a second clock signal as an inversed signal of the first clock signal is input, and the second clock signal is at the second level, and connects the data signal to the data input terminal when the second clock signal is at the first level, and
when the first clock signal changes from the second level to the first level, the data signal is stored in said RAM-type latch circuit.

35. A circuit according to claim 34, wherein said switch circuit comprises
a first transistor in which a drain terminal receives an inversed signal of the data signal, a source terminal is connected to a first switch output terminal, and a gate terminal receives the second clock signal and which outputs the received inversed signal to the first switch output terminal when the second clock signal is at the first level, and
a second transistor in which a drain terminal receives the data signal, a source terminal is connected to a second switch output terminal, and a gate terminal receives the second clock signal and which outputs the received data signal to the second switch output terminal when the second clock signal is at the first level.

36. A circuit according to claim 34, wherein said switch circuit comprises
- a first transistor of a first conductivity type, in which a drain terminal receives an inversed signal of the data signal, a source terminal is connected to a first switch output terminal, and a gate terminal receives the second clock signal and which outputs the received inversed signal to the first switch output terminal when the second clock signal is at the first level,
- a second transistor of the first conductivity type, in which a drain terminal receives the data signal, a source terminal is connected to a second switch output terminal, and a gate terminal receives the second clock signal and which outputs the received data signal to the second switch output terminal when the second clock signal is at the first level,
- a third transistor of a second conductivity type, in which a drain terminal receives the inversed signal of the data signal, a source terminal is connected to the first switch output terminal, and a gate terminal receives the first clock signal and which outputs the received inversed signal to the first switch output terminal when the first clock signal is at the second level, and
- a fourth transistor of the second conductivity type, in which a drain terminal receives the data signal, a source terminal is connected to the second switch output terminal, and a gate terminal receives the first clock signal and which outputs the received data signal to the second switch output terminal when the first clock signal is at the second level.

37. A circuit according to claim 35, wherein said RAM-type latch circuit comprises
- a first inverter having an input terminal connected to a first data storage node and an output terminal connected to a second data storage node,
- a second inverter having an input terminal connected to the second data storage node and an output terminal connected to the first data storage node,
- a fifth transistor in which a gate terminal is connected to a first switch output terminal of said switch circuit, and a drain terminal is connected to the first data storage node,
- a sixth transistor in which a drain terminal is connected to a source terminal of said fifth transistor, a source terminal is grounded, and a gate terminal receives the first clock signal, and which connects the drain terminal to the source terminal when the first clock signal is at the first level,
- a seventh transistor in which a gate terminal is connected to a second switch output terminal of said switch circuit, and a drain terminal is connected to the second data storage node, and
- an eighth transistor in which a drain terminal is connected to a source terminal of said seventh transistor, a source terminal is grounded, and a gate terminal receives the first clock signal, and which connects the drain terminal to the source terminal when the first clock signal is at the first level.

38. A circuit according to claim 36, wherein said RAM-type latch circuit comprises
- a first inverter having an input terminal connected to a first data storage node and an output terminal connected to a second data storage node,
- a second inverter having an input terminal connected to the second data storage node and an output terminal connected to the first data storage node,
- a fifth transistor in which a gate terminal is connected to a first switch output terminal of said switch circuit, and a drain terminal is connected to the first data storage node,
- a sixth transistor in which a drain terminal is connected to a source terminal of said fifth transistor, a source terminal is grounded, and a gate terminal receives the first clock signal, and which connects the drain terminal to the source terminal when the first clock signal is at the first level,
- a seventh transistor in which a gate terminal is connected to a second switch output terminal of said switch circuit, and a drain terminal is connected to the second data storage node, and
- an eighth transistor in which a drain terminal is connected to a source terminal of said seventh transistor, a source terminal is grounded, and a gate terminal receives the first clock signal, and which connects the drain terminal to the source terminal when the first clock signal is at the first level.

39. A circuit according to claim 35, wherein
said RAM-type latch circuit comprises
- a first inverter having an input terminal connected to a first data storage node and an output terminal connected to a second data storage node,
- a 2-input NAND circuit having one input terminal connected to the second data storage node, the other input terminal receiving a clear signal, and an output terminal connected to the first data storage node,
- a fifth transistor in which a gate terminal is connected to a first switch output terminal of said switch circuit, and a drain terminal is connected to the first data storage node,
- a sixth transistor in which a drain terminal is connected to a source terminal of said fifth transistor, a source terminal is grounded, and a gate terminal receives the first clock signal, and which connects the drain terminal to the source terminal when the first clock signal is at the first level,
- a seventh transistor in which a gate terminal is connected to a second switch output terminal of said switch circuit, and a drain terminal is connected to the second data storage node, and
- an eighth transistor in which a drain terminal is connected to a source terminal of said seventh transistor, a source terminal is grounded, and a gate terminal receives the first clock signal, and which connects the drain terminal to the source terminal when the first clock signal is at the first level, and
- when the clear signal is set to the predetermined logic value, logic values of data stored at the first and second data storage nodes are fixed to desired values.

40. A circuit according to claim 36, wherein
said RAM-type latch circuit comprises
- a first inverter having an input terminal connected to a first data storage node and an output terminal connected to a second data storage node,
- a 2-input NAND circuit having one input terminal connected to the second data storage node, the other input terminal receiving a clear signal, and an output terminal connected to the first data storage node,
- a fifth transistor in which a gate terminal is connected to a first switch output terminal of said switch circuit, and a drain terminal is connected to the first data storage node,
- a sixth transistor in which a drain terminal is connected to a source terminal of said fifth transistor, a source terminal is grounded, and a gate terminal receives the first clock signal, and which connects the drain terminal to the source terminal when the first clock signal is at the first level, a seventh transistor in which a gate terminal is connected to a second switch output terminal of said switch circuit, and a drain terminal is connected to the second data storage node, and an eighth transistor in which a drain terminal is connected to a source terminal of said seventh transistor, a source terminal is grounded, and a gate terminal receives the first clock signal, and which connects the drain terminal to the source terminal when the first clock signal is at the first level, and when the clear signal is set to the predetermined logic value, logic values of data stored at the first and second data storage nodes are fixed to desired values.

41. A circuit according to claim 33, further comprising a clock supply circuit which is connected to an input side of said RAM-type latch circuit, receives a third clock signal, generates a pulse signal whose period at the first level is smaller than a period of the first level of the third clock signal, and supplies the pulse signal to said RAM-type latch circuit as the input signal.

42. A circuit according to claim 41, wherein said clock supply circuit includes a combinational logic function which receives the third clock signal and a signal obtained by delaying the third clock signal and outputs a different level of signal between when the two input signals have the same logic level and when the two input signals have the different logic levels.

43. A circuit according to claim 42, wherein said RAM-type latch circuit comprises a first inverter having an input terminal connected to a first data storage node and an output terminal connected to a second data storage node, a second inverter having an input terminal connected to the second data storage node and an output terminal connected to the first data storage node, a first transistor in which a gate terminal receives an inversed signal of the data signal, and a drain terminal is connected to the first data storage node, a second transistor in which a drain terminal is connected to a source terminal of said first transistor, a source terminal is grounded, and a gate terminal receives the input signal, and which connects the drain terminal to the source terminal when the input signal is at the first level, a third transistor in which a gate terminal receives the data signal, and a drain terminal is connected to the second data storage node, and a fourth transistor in which a drain terminal is connected to a source terminal of said third transistor, a source terminal is grounded, and a gate terminal receives the input signal, and which connects the drain terminal to the source terminal when the input signal is at the first level.

44. A circuit according to claim 42, wherein
said RAM-type latch circuit comprises
a first inverter having an input terminal connected to a first data storage node and an output terminal connected to a second data storage node, a 2-input NAND circuit having one input terminal connected to the second data storage node, the other input terminal receiving a clear signal, and an output terminal connected to the first data storage node, a first transistor in which a gate terminal receives an inversed signal of the data signal, and a drain terminal is connected to the first data storage node, a second transistor in which a drain terminal is connected to a source terminal of said first transistor, a source terminal is grounded, and a gate terminal receives the input signal, and which connects the drain terminal to the source terminal when the input signal is at the first level, a third transistor in which a gate terminal receives the data signal, and a drain terminal is connected to the second data storage node, and a fourth transistor in which a drain terminal is connected to a source terminal of said third transistor, a source terminal is grounded, and a gate terminal receives the input signal, and which connects the drain terminal to the source terminal when the input signal is at the first level, and when the clear signal is set to the predetermined logic value, logic values of data stored at the first and second data storage nodes are fixed to desired values.

45. A circuit according to claim 33, wherein said RAM-type latch circuit includes means for, when both the first input signal and a second input signal are at the first level, receiving a data signal input to a data input terminal, and when at least one of the first input signal and the second input signal is at the second level, storing the received data signal.

46. A circuit according to claim 45, further comprising a clock supply circuit which is connected to an input side of said RAM-type latch circuit, supplies a third clock signal to said RAM-type latch circuit as the first input signal, and supplies a fourth clock signal as a delayed inversed signal of the third clock signal to said RAM-type latch circuit as the second input signal.

47. A circuit according to claim 46, wherein said clock supply circuit includes an odd number of inverter circuits which delay and inverse the third clock signal to generate the fourth clock signal.

48. A circuit according to claim 47, wherein said RAM-type latch circuit comprises a first inverter having an input terminal connected to a first data storage node and an output terminal connected to a second data storage node, a second inverter having an input terminal connected to the second data storage node and an output terminal connected to the first data storage node, a first transistor whose gate terminal receives an inversed signal of the data signal, a second transistor in which a drain terminal is connected to a source terminal of said first transistor, a source terminal is grounded, and a gate terminal receives the third clock signal, and which connects the drain terminal to the source terminal when the third clock signal is at the first level, a fifth transistor in which a drain terminal is connected to the first data storage node, a source terminal is connected to a drain terminal of said first transistor, and a gate terminal receives the fourth clock signal, and which connects the drain terminal to the source terminal when the fourth clock signal is at the first level, a third transistor whose gate terminal receives the data signal, a fourth transistor in which a drain terminal is connected to a source terminal of said third transistor, a source terminal is grounded, and a gate terminal receives the third clock signal, and which connects the drain terminal to the source terminal when the third clock signal is at the first level, and a sixth transistor in which a drain terminal is connected to the second data storage node, a source terminal is connected to a drain terminal of said third transistor, and a gate terminal receives the fourth clock signal, and which connects the drain terminal to the source terminal when the fourth clock signal is at the first level.

49. A circuit according to claim 47, wherein
said RAM-type latch circuit comprises
a first inverter having an input terminal connected to a first data storage node and an output terminal connected to a second data storage node,
a 2-input NAND circuit having one input terminal connected to the second data storage node, the other input terminal receiving a clear signal, and an output terminal connected to the first data storage node,
a first transistor whose gate terminal receives an inversed signal of the data signal,
a second transistor in which a drain terminal is connected to a source terminal of said first transistor, a source terminal is grounded, and a gate terminal receives the third clock signal, and which connects the drain terminal to the source terminal when the third clock signal is at the first level,
a fifth transistor in which a drain terminal is connected to the first data storage node, a source terminal is connected to a drain terminal of said first transistor, and a gate terminal receives the fourth clock signal, and which connects the drain terminal to the source terminal when the fourth clock signal is at the first level,
a third transistor whose gate terminal receives the data signal,
a fourth transistor in which a drain terminal is connected to a source terminal of said third transistor, a source terminal is grounded, and a gate terminal receives the third clock signal, and which connects the drain terminal to the source terminal when the third clock signal is at the first level, and
a sixth transistor in which a drain terminal is connected to the second data storage node, a source terminal is connected to a drain terminal of said third transistor, and a gate terminal receives the fourth clock signal, and which connects the drain terminal to the source terminal when the fourth clock signal is at the first level, and
when the clear signal is set to the predetermined logic value, logic values of data stored at the first and second data storage nodes are fixed to desired values.

50. A circuit according to claim 44, further comprising first output gate that has an input terminal connected to said first data storage node and an output terminal connected to a first output terminal, and
second output gate that has an input terminal connected to said second data storage node and an output terminal connected to a second output terminal.

51. A circuit according to claim 49, further comprising first output gate that has an input terminal connected to said first data storage node and an output terminal connected to a first output terminal, and
second output gate that has an input terminal connected to said second data storage node and an output terminal connected to a second output terminal.

52. A circuit according to claim 3, wherein said storage circuit of said processing unit includes a RAM-type latch circuit which receives a data signal delivered to a data input terminal when an input signal is at a first level and stores the received data signal when the input signal is at a second level.

53. A circuit according to claim 52, wherein
the input signal is a first clock signal,
said storage circuit further comprises a switch circuit which electrically disconnects the data signal from said data input terminal when a second clock signal as an inversed signal of the first clock signal is input, and the second clock signal is at the second level, and connects the data signal to the data input terminal when the second clock signal is at the first level, and
when the first clock signal changes from the second level to the first level, the data signal is stored in said RAM-type latch circuit.

54. A circuit according to claim 53, wherein said switch circuit comprises
a first transistor in which a drain terminal receives an inversed signal of the data signal, a source terminal is connected to a first switch output terminal, and a gate terminal receives the second clock signal and which outputs the received inversed signal to the first switch output terminal when the second clock signal is at the first level, and
a second transistor in which a drain terminal receives the data signal, a source terminal is connected to a second switch output terminal, and a gate terminal receives the second clock signal and which outputs the received data signal to the second switch output terminal when the second clock signal is at the first level.

55. A circuit according to claim 53, wherein said switch circuit comprises
a first transistor of a first conductivity type, in which a drain terminal receives an inversed signal of the data signal, a source terminal is connected to a first switch output terminal, and a gate terminal receives the second clock signal and which outputs the received inversed signal to the first switch output terminal when the second clock signal is at the first level,
a second transistor of the first conductivity type, in which a drain terminal receives the data signal, a source terminal is connected to a second switch output terminal, and a gate terminal receives the second clock signal and which outputs the received data signal to the second switch output terminal when the second clock signal is at the first level,
a third transistor of a second conductivity type, in which a drain terminal receives the inversed signal of the data signal, a source terminal is connected to the first switch output terminal, and a gate terminal receives the first clock signal and which outputs the received inversed signal to the first switch output terminal when the first clock signal is at the second level, and
a fourth transistor of the second conductivity type, in which a drain terminal receives the data signal, a source terminal is connected to the second switch output terminal, and a gate terminal receives the first clock signal and which outputs the received data signal to the second switch output terminal when the first clock signal is at the second level.

56. A circuit according to claim 54, wherein said RAM-type latch circuit comprises
a first inverter having an input terminal connected to a first data storage node and an output terminal connected to a second data storage node,
a second inverter having an input terminal connected to the second data storage node and an output terminal connected to the first data storage node,
a fifth transistor in which a gate terminal is connected to a first switch output terminal of said switch circuit, and a drain terminal is connected to the first data storage node,
a sixth transistor in which a drain terminal is connected to a source terminal of said fifth transistor, a source terminal is grounded, and a gate terminal receives the first clock signal, and which connects the drain terminal to the source terminal when the first clock signal is at the first level, a seventh transistor in which a gate terminal is connected to a second switch output terminal of said switch circuit, and a drain terminal is connected to the second data storage node, and an eighth transistor in which a drain terminal is connected to a source terminal of said seventh transistor, a source terminal is grounded, and a gate terminal receives the first clock signal, and which connects the drain terminal to the source terminal when the first clock signal is at the first level.

57. A circuit according to claim 55, wherein said RAM-type latch circuit comprises a first inverter having an input terminal connected to a first data storage node and an output terminal connected to a second data storage node, a second inverter having an input terminal connected to the second data storage node and an output terminal connected to the first data storage node, a fifth transistor in which a gate terminal is connected to a first switch output terminal of said switch circuit, and a drain terminal is connected to the first data storage node, a sixth transistor in which a drain terminal is connected to a source terminal of said fifth transistor, a source terminal is grounded, and a gate terminal receives the first clock signal, and which connects the drain terminal to the source terminal when the first clock signal is at the first level, a seventh transistor in which a gate terminal is connected to a second switch output terminal of said switch circuit, and a drain terminal is connected to the second data storage node, and an eighth transistor in which a drain terminal is connected to a source terminal of said seventh transistor, a source terminal is grounded, and a gate terminal receives the first clock signal, and which connects the drain terminal to the source terminal when the first clock signal is at the first level.

58. A circuit according to claim 54, wherein said RAM-type latch circuit comprises a first inverter having an input terminal connected to a first data storage node and an output terminal connected to a second data storage node, a 2-input NAND circuit having one input terminal connected to the second data storage node, the other input terminal receiving a clear signal, and an output terminal connected to the first data storage node, a fifth transistor in which a gate terminal is connected to a first switch output terminal of said switch circuit, and a drain terminal is connected to the first data storage node, a sixth transistor in which a drain terminal is connected to a source terminal of said fifth transistor, a source terminal is grounded, and a gate terminal receives the first clock signal, and which connects the drain terminal to the source terminal when the first clock signal is at the first level, a seventh transistor in which a gate terminal is connected to a second switch output terminal of said switch circuit, and a drain terminal is connected to the second data storage node, and an eighth transistor in which a drain terminal is connected to a source terminal of said seventh transistor, a source terminal is grounded, and a gate terminal receives the first clock signal, and which connects the drain terminal to the source terminal when the first clock signal is at the first level, and when the clear signal is set to the predetermined logic value, logic values of data stored at the first and second data storage nodes are fixed to desired values.

59. A circuit according to claim 55, wherein said RAM-type latch circuit comprises a first inverter having an input terminal connected to a first data storage node and an output terminal connected to a second data storage node, a 2-input NAND circuit having one input terminal connected to the second data storage node, the other input terminal receiving a clear signal, and an output terminal connected to the first data storage node, a fifth transistor in which a gate terminal is connected to a first switch output terminal of said switch circuit, and a drain terminal is connected to the first data storage node, a sixth transistor in which a drain terminal is connected to a source terminal of said fifth transistor, a source terminal is grounded, and a gate terminal receives the first clock signal, and which connects the drain terminal to the source terminal when the first clock signal is at the first level, a seventh transistor in which a gate terminal is connected to a second switch output terminal of said switch circuit, and a drain terminal is connected to the second data storage node, and an eighth transistor in which a drain terminal is connected to a source terminal of said seventh transistor, a source terminal is grounded, and a gate terminal receives the first clock signal, and which connects the drain terminal to the source terminal when the first clock signal is at the first level, and when the clear signal set to the predetermined logic value, logic values of data stored at the first and second data storage nodes are fixed to desired values.

60. A circuit according to claim 52, further comprising a clock supply circuit which is connected to an input side of said RAM-type latch circuit, receives a third clock signal, generates a pulse signal whose period at the first level is smaller than a period of the first level of the third clock signal, and supplies the pulse signal to said RAM-type latch circuit as the input signal.

61. A circuit according to claim 60, wherein said clock supply circuit includes a combinational logic function which receives the third clock signal and a signal obtained by delaying the third clock signal and outputs a different level of signal between when the two input signals have the same logic level and when the two input signals have the different logic levels.

62. A circuit according to claim 61, wherein said RAM-type latch circuit comprises a first inverter having an input terminal connected to a first data storage node and an output terminal connected to a second data storage node, a second inverter having an input terminal connected to the second data storage node and an output terminal connected to the first data storage node, a first transistor in which a gate terminal receives an inversed signal of the data signal, and a drain terminal is connected to the first data storage node, a second transistor in which a drain terminal is connected to a source terminal of said first transistor, a source terminal is grounded, and a gate terminal receives the input signal, and which connects the drain terminal to the source terminal when the input signal is at the first level, a third transistor in which a gate terminal receives the data signal, and a drain terminal is connected to the second data storage node, and a fourth transistor in which a drain terminal is connected to a source terminal of said third transistor, a source terminal is grounded, and a gate terminal receives the input signal, and which connects the drain terminal to the source terminal when the input signal is at the first level.

63. A circuit according to claim 61, wherein
said RAM-type latch circuit comprises
a first inverter having an input terminal connected to a first data storage node and an output terminal connected to a second data storage node,
a 2-input NAND circuit having one input terminal connected to the second data storage node, the other input terminal receiving a clear signal, and an output terminal connected to the first data storage node,
a first transistor in which a gate terminal receives an inversed signal of the data signal, and a drain terminal is connected to the first data storage node,
a second transistor in which a drain terminal is connected to a source terminal of said first transistor, a source terminal is grounded, and a gate terminal receives the input signal, and which connects the drain terminal to the source terminal when the input signal is at the first level,
a third transistor in which a gate terminal receives the data signal, and a drain terminal is connected to the second data storage node, and
a fourth transistor in which a drain terminal is connected to a source terminal of said third transistor, a source terminal is grounded, and a gate terminal receives the input signal, and which connects the drain terminal to the source terminal when the input signal is at the first level, and
when the clear signal set to the predetermined logic value, logic values of data stored at the first and second data storage nodes are fixed to desired values.

64. A circuit according to claim 52, wherein said RAM-type latch circuit includes means for, when both the first input signal and a second input signal are at the first level, receiving a data signal input to a data input terminal, and when at least one of the first input signal and the second input signal is at the second level, storing the received data signal.

65. A circuit according to claim 64, further comprising a clock supply circuit which is connected to an input side of said RAM-type latch circuit, supplies a third clock signal to said RAM-type latch circuit as the first input signal, and supplies a fourth clock signal as a delayed inversed signal of the third clock signal to said RAM-type latch circuit as the second input signal.

66. A circuit according to claim 65, wherein said clock supply circuit includes an odd number of inverter circuits which delay and inverse the third clock signal to generate the fourth clock signal.

67. A circuit according to claim 66, wherein said RAM-type latch circuit comprises
a first inverter having an input terminal connected to a first data storage node and an output terminal connected to a second data storage node,
a second inverter having an input terminal connected to the second data storage node and an output terminal connected to the first data storage node,
a first transistor whose gate terminal receives an inversed signal of the data signal,
a second transistor in which a drain terminal is connected to a source terminal of said first transistor, a source terminal is grounded, and a gate terminal receives the third clock signal, and which connects the drain terminal to the source terminal when the third clock signal is at the first level,
a fifth transistor in which a drain terminal is connected to the first data storage node, a source terminal is connected to a drain terminal of said first transistor, and a gate terminal receives the fourth clock signal, and which connects the drain terminal to the source terminal when the fourth clock signal is at the first level,
a third transistor whose gate terminal receives the data signal,
a fourth transistor in which a drain terminal is connected to a source terminal of said third transistor, a source terminal is grounded, and a gate terminal receives the third clock signal, and which connects the drain terminal to the source terminal when the third clock signal is at the first level, and
a sixth transistor in which a drain terminal is connected to the second data storage node, a source terminal is connected to a drain terminal of said third transistor, and a gate terminal receives the fourth clock signal, and which connects the drain terminal to the source terminal when the fourth clock signal is at the first level.

68. A circuit according to claim 66, wherein
said RAM-type latch circuit comprises
a first inverter having an input terminal connected to a first data storage node and an output terminal connected to a second data storage node,
a 2-input NAND circuit having one input terminal connected to the second data storage node, the other input terminal receiving a clear signal, and an output terminal connected to the first data storage node,
a first transistor whose gate terminal receives an inversed signal of the data signal,
a second transistor in which a drain terminal is connected to a source terminal of said first transistor, a source terminal is grounded, and a gate terminal receives the third clock signal, and which connects the drain terminal to the source terminal when the third clock signal is at the first level,
a fifth transistor in which a drain terminal is connected to the first data storage node, a source terminal is connected to a drain terminal of said first transistor, and a gate terminal receives the fourth clock signal, and which connects the drain terminal to the source terminal when the fourth clock signal is at the first level,
a third transistor whose gate terminal receives the data signal,
a fourth transistor in which a drain terminal is connected to a source terminal of said third transistor, a source terminal is grounded, and a gate terminal receives the third clock signal, and which connects the drain terminal to the source terminal when the third clock signal is at the first level, and
a sixth transistor in which a drain terminal is connected to the second data storage node, a source terminal is connected to a drain terminal of said third transistor, and a gate terminal receives the fourth clock signal, and which connects the drain terminal to the source terminal when the fourth clock signal is at the first level, and
when the clear signal set to the predetermined logic value, logic values of data stored at the first and second data storage nodes are fixed to desired values.

69. A circuit according to claim 63, further comprising first output gate that has an input terminal connected to said first data storage node and an output terminal connected to a first output terminal, and
second output gate that has an input terminal connected to said second data storage node and an output terminal connected to a second output terminal.

70. A circuit according to claim 68, further comprising first output gate that has an input terminal connected to said first data storage node and an output terminal connected to a first output terminal, and
second output gate that has an input terminal connected to said second data storage node and an output terminal connected to a second output terminal.

* * * * *